US008837032B2

(12) United States Patent
Lam et al.

(10) Patent No.: US 8,837,032 B2
(45) Date of Patent: *Sep. 16, 2014

(54) VARIABLE TRANSMITTANCE OPTICAL FILTER AND USES THEREOF

(71) Applicant: Switch Materials, Inc., Burnaby (CA)

(72) Inventors: Duhane Lam, Vancouver (CA); Neil R. Branda, North Vancouver (CA); Andreea Spantulescu, New Westminster (CA)

(73) Assignee: Switch Materials, Inc., Burnaby, British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,215

(22) Filed: Mar. 18, 2013

(65) Prior Publication Data

US 2013/0208333 A1 Aug. 15, 2013

Related U.S. Application Data

(63) Continuation of application No. 12/813,419, filed on Jun. 10, 2010, now Pat. No. 8,441,707.

(60) Provisional application No. 61/186,069, filed on Jun. 11, 2009, provisional application No. 61/186,076, filed on Jun. 11, 2009, provisional application No. 61/186,055, filed on Jun. 11, 2009, provisional application No. 61/186,058, filed on Jun. 11, 2009.

(51) Int. Cl.
| | |
|---|---|
| *G02F 1/03* | (2006.01) |
| *G02F 1/15* | (2006.01) |
| *G02F 1/153* | (2006.01) |
| *G02B 5/23* | (2006.01) |
| *H01R 43/26* | (2006.01) |

(52) U.S. Cl.
CPC ........ *G02F 1/1533* (2013.01); *G02F 2201/086* (2013.01); *G02F 1/15* (2013.01); *G02B 5/23* (2013.01); *H01R 43/26* (2013.01)
USPC .......................................................... 359/241

(58) Field of Classification Search
USPC .......................................................... 359/241
See application file for complete search history.

(56) References Cited

U.S. PATENT DOCUMENTS

| | | | |
|---|---|---|---|
| 5,355,245 | A | 10/1994 | Lynam |
| 5,463,491 | A | 10/1995 | Check, III |
| 5,604,626 | A | 2/1997 | Teowee et al. |
| 5,838,483 | A | 11/1998 | Teowee et al. |
| 6,065,836 | A | 5/2000 | Krishnan et al. |
| 6,084,702 | A | 7/2000 | Byker et al. |
| 6,246,505 | B1 * | 6/2001 | Teowee et al. ............ 359/241 |
| 6,910,729 | B2 | 6/2005 | Kraenzler et al. |

(Continued)

FOREIGN PATENT DOCUMENTS

| | | |
|---|---|---|
| JP | 57-167009 | 10/1982 |
| JP | 08-160471 | 6/1996 |
| WO | WO 2004/015024 A1 | 2/2004 |

OTHER PUBLICATIONS

Gorodetsky, Brian. 2008. "The design of dual-mode photochromic and electrochromic 1,2-dithienylcyclopentene dyes." PhD dissertation, Simon Fraser University (Canada), Chapters 1 and 5, section 4.4.

(Continued)

*Primary Examiner* — James Jones
(74) *Attorney, Agent, or Firm* — Merchant & Gould P.C.

(57) ABSTRACT

Variable transmittance optical filters capable of transitioning from a light state to a dark state on exposure to UV radiation and from a dark state to a light state with application of an electric voltage are provided. The optical filters comprise a switching material that comprises one or more chromophores that have electrochromic and photochromic properties.

26 Claims, 34 Drawing Sheets

(56) References Cited

U.S. PATENT DOCUMENTS

| | | |
|---|---|---|
| 6,934,067 B2 | 8/2005 | Ash et al. |
| 7,300,167 B2 | 11/2007 | Fernando et al. |
| 7,459,189 B2 | 12/2008 | Tahara et al. |
| 2007/0220427 A1* | 9/2007 | Briancon et al. ............ 715/700 |
| 2008/0239452 A1 | 10/2008 | Xu et al. |
| 2009/0002802 A1 | 1/2009 | Shibuya et al. |

OTHER PUBLICATIONS

Zhang et al. "An UV photochromic memory effect in proton-based $WO_3$ electrochromic devices." *Applied Physics Letters*, 93(20):203508-1-203508-2, Nov. 2008.

International Search Report for International Application No. PCT/CA2010/000849 mailed Oct. 27, 2010.

Written Opinion of the International Searching Authority for International Application No. PCT/CA2010/000849 mailed Oct. 27, 2010.

International Preliminary Report on Patentability for International Application No. PCT/CA2010/000849 issued Dec. 12, 2011.

Office Action from Chinese Application No. 201080035776.7 mailed Mar. 26, 2014.

\* cited by examiner

VARIABLE TRANSMITTANCE OPTICAL FILTER AND USES THEREOF

CROSS REFERENCE TO RELATED APPLICATIONS

This application is a continuation of U.S. patent application Ser. No. 12/813,419, filed on Jun. 10, 2010, which claims priority from U.S. Provisional Patent Application No. 61/186,055 filed on Jun. 11, 2009, U.S. Provisional Patent Application No. 61/186,076 filed on Jun. 11, 2009, U.S. Provisional Patent Application No. 61/186,058 filed on Jun. 11, 2009, and U.S. Provisional Patent Application No. 61/186,069 filed on Jun. 11, 2009. The contents of all of the aforementioned applications are hereby specifically incorporated by reference in their entirety.

FIELD OF THE INVENTION

The present invention pertains to the field of variable transmittance optical filters, in particular to an optical filter capable of transitioning from a light state to a dark state on exposure to UV radiation and from a dark state to a light state with application of an electric voltage, devices comprising optical filters of the invention, and uses thereof.

DESCRIPTION OF THE RELATED ART

Optical filters are widely used to control visible and solar energy. Most notably, optical filters have been used as glazings in window technology to control the flow of light and heat into and out of the glazing, according to occupant comfort. Applications include, for example, windows in buildings, vehicles, aircraft, spacecraft and ships. Optical filters have also been used to regulate lighting and heating levels, for glare reduction, and energy load management. Improving the energy efficiency of buildings is a key aspect of reducing energy use and reducing $CO_2$ emissions. The United States alone consumes 100 quads of primary energy annually. Buildings consume about 39% of all energy and 68% of the electricity used in the United States. They are responsible for about 38% of all greenhouse gas (GHG) emissions. Windows are responsible for about 30% of a building's energy loss. As such, windows with improved technology for reducing heat loss and solar heat gain can offer significant benefits and cost savings.

Optical filters have also found application in ophthalmic devices to control the light impacting the eye. Applications include, for example, prescription and non-prescription glasses, goggles, sunglasses, visors, and safety eyewear.

There are a number of technologies that have been used in optical filter applications for dynamically varying the degree of visible light transmittance, including photochromics, electrochromics, liquid crystals, thermochromics, and suspended particle displays.

Photochromics

Photochromics react to light levels automatically by darkening in sunlight and certain bright light conditions, and by spontaneously going clear or less dark indoors or in low light conditions. A well-known application of photochromics is found in the eyeglass lenses made by Transitions Optical Inc. of 9251 Belcher Road, Pinellas Park, Fla., USA, 33782. These lenses employ a photochromic compound (or compounds) embedded in a rigid plastic or glass lens, or a photochromic film applied to a lens. For example, U.S. Pat. No. 6,065,836 describes a photochromic ophthalmic lens with a film adhering to the lens containing a photochromic dye.

Photochromics auto-darken in bright light to reduce the amount of visible light transmitted. Reversion of photochromics from the dark to light state, however, is slow and cannot be controlled manually. Photochromics can also be very temperature dependent and tend to break down on exposure to UV light. As such, photochromics have not proven to be a practical technology for some optical filter applications.

U.S. Pat. Nos. 5,604,626; 5,838,483, and 6,246,505, describe photochromic devices having some degree of user control through electronics. These photochromic devices are based on metal oxide photochromics requiring power to maintain the device in the dark state.

Electrochromics

Electrochromics can be used to dynamically alter the visible light transmission properties of a material through the application of electricity. Electrochromic technology involves applying thin coatings of electrochromic materials to two transparent electrodes and sandwiching an electrolyte material in between. Unlike photochromic technology, electrochromic technology typically requires the user to apply external electrical power to darken. Electrochromic technology is used in auto-dimming automobile minors (for example, those made by Gentex Corporation of Zeeland Mo.).

U.S. Pat. No. 6,934,067, describes an electrochromic rear view minor with a gelled electrochromic material formed between two glass substrates with conductive coatings and a perimeter seal. The electrochromic material darkens and lightens when electricity is applied but will not darken automatically. These electrochromic minors respond to changing light conditions by changing the light transmittance properties of the minor through the use of electronic light sensors and electronic controls. Electric power is required to cause the electrochromic material to go darker.

Another example of electrochromics is in window applications (Sage Electrochromics Inc. of Faribault, Minn.) that incorporate thin coatings applied to one of the glass layers in a window. Application of electricity with the positive lead connected to one electrode causes the window to darken, and application of electricity with the positive lead connected to the other electrode causes the window to lighten. The electrochromic coating that is applied to the glass involves the use of specialized coating processes such as sputtering and chemical vapor deposition. This often requires a specialized factory or facility requiring the glass to be shipped to one central factory for the coating process to be performed, and then shipped out to wherever they will be used. As such, windows made using electrochromic technology can be quite expensive.

Electrochromics have also been used in ophthalmic devices. For example, ChromoGenics of Uppsala, Sweden makes an "electrochromic foil" for use in motorcycle helmet visors and other products by making a multi-layer electrochromic device between two plastic films. Relatively low DC voltages are used for switching the electrochromics from one state to another but power is typically required to maintain the electrochromic device in the dark state.

Liquid Crystals

Liquid crystal filters are manufactured by sandwiching a liquid crystal material between two transparent electrodes. When an electric field is applied between the electrodes, the liquid crystals align in a certain orientation to allow light to pass through the filter. In the absence of a field, the liquid crystals have a random orientation and scatter the light, appearing translucent to an observer. Although some light is allowed to pass through in this state, the optical filter will appear translucent or almost opaque and will not be optically clear. This makes liquid crystals only useful for applications such as for privacy glass when being able to see through the optical filter in the dark state is not desirable. Relatively high voltages required for switching the liquid crystals, expensive manufacturing costs, and temperature dependency have limited the application of liquid crystal technology to indoor applications and electronic devices.

U.S. Pat. No. 7,459,189, describes a liquid crystal device that can be used in privacy windows. The technology involves a liquid crystal composite sandwiched between electrodes that permits light to pass in one state and scatters light in another state.

U.S. Pat. No. 7,300,167, describe an adjustably opaque window also based on liquid crystal technology.

Nippon Sheet Glass of Tokyo, Japan, manufactures an optical film made using liquid crystal technology that can change from a translucent to an opaque state with the application of a relatively high (e.g., 120 Volts) AC voltage.

Suspended Particle Displays

Suspended Particle Displays (SPD) involve many small particles suspended in a liquid between two sheets of glass with conducting electrodes. Like liquid crystals, a voltage applied across the electrodes causes the particles to align and light is transmitted. In the absence of a voltage, the particles are randomly distributed and scatter light. The scattering of light means that SPD devices are typically not optically clear in the dark state. SPD devices can also be expensive to manufacture and typically require that the particles be suspended in a liquid so they have sufficient mobility to move. Examples of application of this technology include, U.S. Pat. No. 5,463,491 which describes a filter for windows that comprises an "encapsulated liquid suspension". U.S. Pat. No. 6,910,729 describes a self-darkening glass based on SPD for providing increased thermal comfort in vehicles.

Thermochromics

Thermochromic filters darken and lighten in response to temperature changes, typically going darker as it gets hotter and as such cannot be manually controlled. An example of thermochromic technology is described in U.S. Pat. No. 6,084,702.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a variable transmittance optical filter. In accordance with an aspect of the present invention, there is provided an optical filter capable of transitioning from a light state to a dark state on exposure to UV radiation and from a dark state to a light state with application of an electric voltage, comprising: a) a first and second substantially transparent substrate; b) a first and second electrode disposed on the surface of at least one of said substrates; c) a switching material disposed between said first and second substrates and in contact with said first and second electrodes, said switching material comprising one or more chromophores having electrochromic and photochromic properties; and d) an electrical connection means for electrically connecting said first electrode and said second electrode to a source of electric voltage.

In accordance with another aspect of the present invention, there is provided a method for preparing an optical filter capable of transitioning from a light state to a dark state on exposure to UV radiation and from a dark state to a light state with application of an electric voltage, comprising the steps of: a) disposing a layer of a switching material between a first and second substantially transparent substrate wherein a first and second electrode is disposed on a surface of at least one of said substrates such that said switching material is in contact with each electrode; and b) providing an electrical connecting means for connecting said electrodes to a source of electric voltage.

In accordance with another aspect of the present invention, there is provided a switching material comprising one or more chromophores having electrochromic and photochromic properties and a solvent, wherein said switching material is capable of transitioning from a light state to a dark state on exposure to UV radiation and from a dark state to a light state with application of an electric voltage.

In accordance with another aspect of the present invention, there is provided a use of the optical filter of the invention in an optical device.

In accordance with another aspect of the present invention, there is provided a method of using the optical filter of the invention in an optical device comprising operatively associating the filter with at least one surface of the device.

In accordance with another aspect of the present invention, there is provided a variable transmittance window capable of transitioning from a light state to a dark state on exposure to UV radiation and from a dark state to a light state with application of an electric voltage, comprising: a) a first and second substantially transparent substrate; b) a first and second electrode disposed on the surface of at least one of said substrates; c) a switching material disposed between said first and second substrates and in contact with said first and second electrodes, said switching material comprising one or more chromophores having electrochromic and photochromic properties; and d) an electrical connection means for electrically connecting said first electrode and said second electrode to a source of electric voltage.

In accordance with another aspect of the present invention, there is provided a method for preparing a variable transmittance window capable of transitioning from a light state to a dark state on exposure to UV radiation and from a dark state to a light state with application of an electric voltage, comprising the steps of: a) disposing a layer of a switching material between a first and second substantially transparent substrate wherein a first and second electrode is disposed on a surface of at least one of said substrates such that said switching material is in contact with each electrode; and b) providing an electrical connecting means for connecting said electrodes to a source of electric voltage.

In accordance with another aspect of the present invention, there is provided a variable transmittance window capable of transitioning from a light state to a dark state on exposure to UV radiation and from a dark state to a light state with application of an electric voltage, comprising: a) a substantially transparent window substrate; and b) at least one optical filter of the invention associated with at least one surface of said substrate.

In accordance with another aspect of the present invention, there is provided a method for preparing a variable transmittance window capable of transitioning from a light state to a dark state on exposure to UV radiation and from a dark state to a light state with application of an electric voltage, comprising the steps of: a) providing the optical filter of the invention; and b) associating said optical filter with at least one substantially transparent surface of said window.

In accordance with another aspect of the present invention, there is provided an ophthalmic device capable of transitioning from a light state to a dark state on exposure to UV radiation and from a dark state to a light state with application of an electric voltage, comprising: a) a first and second substantially transparent substrate; b) a first and second electrode disposed on the surface of at least one of said substrates; c) a switching material disposed between said first and second substrates and in contact with said first and second electrodes, said switching material comprising one or more chromophores having electrochromic and photochromic properties; and d) an electrical connection means for electrically connecting said first electrode and said second electrode to a source of electric voltage.

In accordance with another aspect of the present invention, there is provided a method for preparing an ophthalmic device capable of transitioning from a light state to a dark state on exposure to UV radiation and from a dark state to a light state with application of an electric voltage, comprising the steps of: a) disposing a layer of a switching material between a first and second substantially transparent substrate wherein a first and second electrode is disposed on a surface of at least one of said substrates such that said switching material is in contact with each electrode; and b) providing an electrical connecting means for connecting said electrodes to a source of electric voltage.

In accordance with another aspect of the present invention, there is provided an ophthalmic device capable of transitioning from a light state to a dark state on exposure to UV radiation and from a dark state to a light state with application of an electric voltage, comprising: a) a substantially transparent ophthalmic substrate; and b) an optical filter of the invention associated with a surface of said substrate.

In accordance with another aspect of the present invention, there is provided a method for preparing an ophthalmic device capable of transitioning from a light state to a dark state on exposure to UV radiation and from a dark state to a light state with application of an electric voltage, comprising the steps of: a) providing the optical filter of the invention; and b) associating said optical filter with at least one surface of a substantially transparent ophthalmic substrate of said ophthalmic device.

BRIEF DESCRIPTION OF THE DRAWINGS

These and other features of the invention will become more apparent in the following detailed description in which reference is made to the appended drawings.

DETAILED DESCRIPTION OF THE PREFERRED EMBODIMENT

Figure 1:
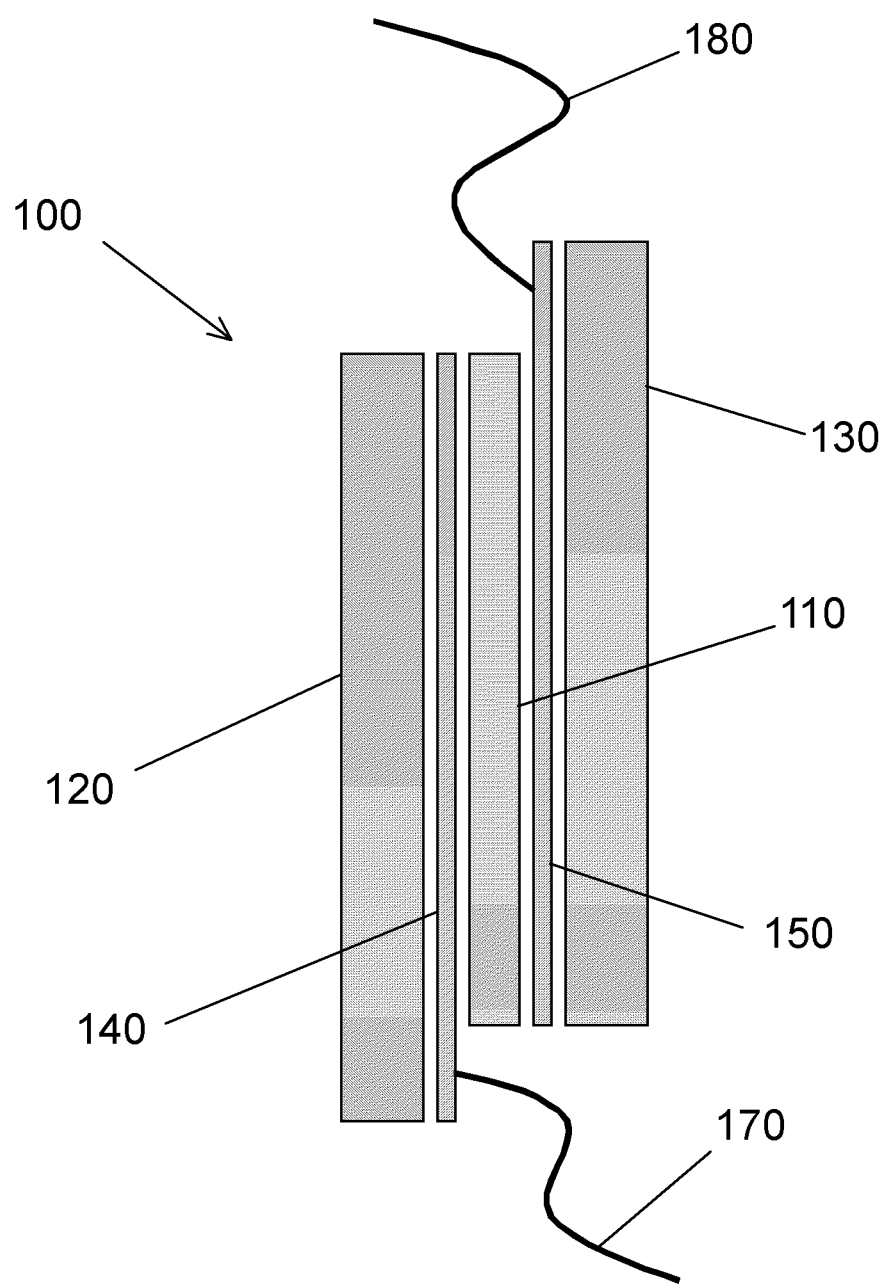
FIG. 1 is a cross-sectional schematic view of an optical filter according to an embodiment of the present invention.

The present invention relates to variable transmittance optical filters capable of transitioning from a light state to a dark state on exposure to UV radiation and from a dark state to a light state with application of an electric voltage, and their use in various devices, and to devices comprising the optical filters of the invention such as architectural smart windows, automotive smart windows, and ophthalmic devices.

The optical filters of the present invention may be employed in many different applications. Since embodiments of the optical filters of this invention require no external voltage for switching to the darkened state, they may be used in a variety of commercial applications. In further embodiments, the optical filters of the present invention have low power requirements for cycling between the dark and light states. The low power draw of the optical filters makes the optical filters of the invention commercially viable for a variety of applications such as large-area applications. Examples of such applications include architectural and automotive windows and glazings, and sunroofs for automotive applications.

In another embodiment, the optical filters of the invention display relatively rapid switching between the dark and light states. Rapid switching between states allows the optical filters of the invention to be used in applications encountering frequent changes in conditions, for example, architectural and automotive windows and ophthalmic devices.

In a further embodiment, the optical filters of the invention are temperature stable and change minimally, i.e., minimal darkening or lightening, in response to changing temperatures, therefore, allowing the optical filters of the invention to be used in applications encountering changes in temperature conditions. Examples of such applications include architectural and automotive window applications and ophthalmic devices.

Embodiments of the invention allow the user to control the visible light transmittance (VLT) of the optical filter by controlling the electric field applied to the filter. In one embodiment, lightening from a darkened state is triggered by application of a voltage to the optical filter. In another embodiment, lightening of the optical filter is adjustable by intermittent application of a voltage to the optical filter. In a further embodiment, an intermediate level of VLT is achieved by application of a voltage to the optical filter during auto-darkening. In another embodiment, an intermediate level of VLT is achieved by discontinuing application of a voltage to the optical filter during lightening. In a further embodiment, the VLT of the optical filter is maintained in a variety of environmental conditions by intermittent application of a voltage to the optical filter.

In a further embodiment, the optical filters of the present invention can be manufactured in a range of thicknesses, thereby allowing their use in a variety of applications. For example, in one embodiment, the optical filters of the invention are laminated between two sheets of glass and incorporated into a window. In another embodiment, the optical filters of the invention are applied to one side of a sheet of glass and used in a window to improve occupant comfort and reduce solar heat gain. In a further embodiment, the optical filters of the invention are applied to curved substrates such as glass or plastic to be formed into windows for application such as automotive sun roofs and ophthalmic devices.

The optical filters of the present invention lend themselves well to commercially viable manufacturing processes. In an embodiment of the invention, the optical filters comprise substrates of high sheet resistance. In another embodiment, the optical filters comprise substrates of standard materials known in the art. Optical filters of the present invention, therefore, can be manufactured using high-resistance substrates which tend to be less expensive materials. In another embodiment, the optical filters of the invention comprise substrates which are compatible with lesser expensive conductive coating materials. The optical filters of the invention, therefore, provide for low manufacturing costs.

In a further embodiment, the optical filters of the invention can be manufactured by a process of wet-coating a switching material onto a suitable substrate thereby avoiding expensive and specialized coating processes such as sputtering and chemical vapour deposition and allowing for roll-to-roll manufacturing processes.

The optical filters of the present invention are suitable for a variety of applications, for example in the architectural and automotive arts. In an embodiment of the invention, the optical filters exhibit photostability and durability suitable for use in windows. In an embodiment, the formulations are stabilized for UV to provide enhanced photostability. In another embodiment, a partial UV blocking layer is incorporated to enhance photostability. In an embodiment, the filters are durable and can be cycled back and forth between the light state and dark state many times.

DEFINITIONS

Unless defined otherwise, all technical and scientific terms used herein have the same meaning as commonly understood by one of ordinary skill in the art to which this invention pertains.

The term "visible light" as used herein, refers to the band of electromagnetic radiation with wavelengths approximately in the 400 nm to 750 nm range.

The term "ultraviolet (UV) light" as used herein, refers to electromagnetic radiation with a wavelength shorter than that of visible light in the 10 nm to 400 nm range.

The term "infrared radiation (IR)" as used herein, refers to electromagnetic radiation with a wavelength between 750 nm to 50,000 nm range. Its wavelength is longer than that of visible light.

The term "visible light transmittance (VLT)" as used herein, refers to the amount of visible light that is transmitted or passes through a substance or product, expressed as a percentage.

The term "auto-darkening" as used herein, refers to the automatic darkening and reduction or decrease in the percentage of visible light transmission when exposed to UV and/or sunlight.

The term "contrast ratio" as used herein, refers to the ratio of visible light transmitted through an optical filter in the light state compared to the visible light transmitted in the dark state of the optical filter.

The term "hybrid photo/electro dye", "hybrid photochromic/electrochromic chromophores", or "chromophores" as used herein, refers to a dye material or chromophore with a dark state and a lighter state. The dye material or chromophore is a hybrid photochromic and electrochromic material because it exhibits both photochromic and electrochromic properties: exposure to UV light will cause it to go into a darker state, and the application of electricity to the dye or chromophore will cause it to go into a lighter state.

The term "user control" or "user controlled" as used herein, refers to the controlled lightening of the optical filters of the present invention with application of an electric voltage by the user.

The term "mil" as used herein, refers to the unit of length for $1/1000$ of an inch (0.001) or 25 microns, that is used in expressing thickness of products in sheet form.

The term "ophthalmic device" or "ophthalmics" as used herein refers to a device placed in front of the eye to control the light impacting the eye. The term encompasses, for example, glasses (prescription and non-prescription), goggles, sunglasses, and visors that can be designed for recreational or industrial applications.

The term "about" refers to a +/−20% variation from the nominal value. It is to be understood that such a variation is always included in any given value provided herein, whether or not it is specifically referred to.

Optical Filter

The present invention is directed to an optical filter, uses of the optical filter, and devices comprising the optical filters of the present invention. The optical filters according to the present invention are capable of transitioning from a light state to a dark state on exposure to UV radiation and from a dark state to a light state with application of an electric voltage. Decrease in visible light transmission, i.e., darkening, of the optical filter is automatic upon exposure to UV and/or solar radiation. Increase in visible light transmission, i.e., lightening, of the optical filter occurs with application of an electric voltage which may be controlled by a user.

The optical filter of the present invention comprises two substrates and a switching material contained between the substrates. The switching material will darken automatically when exposed to UV or sunlight and will lighten through application of an electric charge. When the switching material is exposed to UV or sunlight, the percentage visible light transmittance (VLT) of the filter is reduced. This helps to reduce glare and improve occupant comfort in bright light if the filter is installed in a product such as a fenestration unit. The optical filter further comprises two electrodes that are in contact with the switching material. In one embodiment, each electrode is disposed on opposing surfaces of each respective substrate. In another embodiment, both electrodes are disposed on the surface of the same substrate. Leads are connected to each electrode in order to apply a voltage to the switching material. When an electric voltage is applied to the switching material when it is in its dark state, the switching material lightens and transmits a greater percentage of incident visible light until it reaches a light state. Control electronics allow a user to control when and how much voltage to apply to the filter. In this manner, the components of the optical filter of the present invention provide for an optical filter that can be in a light state or a dark state, that can automatically go into its dark state when exposed to UV light from the sun but can be switched back to a lighter state through application of an electric voltage when desired.

Embodiments of the invention include optical filters that can also reduce transmission of light in the UV portion of the spectrum, i.e., 100 to 400 nm. In one embodiment, UV light transmittance of the optical filter of the invention is less than 30%. In another embodiment of the invention, the UV light transmittance of the optical filter is less than 20%. In a further embodiment of the invention, the UV light transmittance of the optical filter is less than 10%. In another embodiment of the invention, the UV light transmittance of the optical filter is less than 5%.

The optical filter of the present invention allows the user to control the visible light transmittance of the optical filter, i.e., electromagnetic radiation in the 400 to 750 nm spectrum range. The optical filter of the present invention switches between dark and light states wherein each state of the optical filter achieves a different amount of visible light transmittance. In the light state, a relatively high visible light transmittance is achieved. In one embodiment, the optical filter of the present invention has a visible light transmittance of about 50% or greater when in its light state. In another embodiment, the optical filter of the invention has a visible light transmittance of about 60% or greater when in its light state. In a further embodiment, the optical filter has a visible light transmittance of about 70% or greater when in its light state. In another embodiment, the optical filter has a visible light transmittance of 80% or greater when in its light state.

The dark state allows a relatively low visible light transmittance. In one embodiment, the optical filter of the invention has a visible light transmittance of less than about 30% when in its dark state. In another embodiment, the optical filter of the invention has a visible light transmittance of less than about 20% when in its dark state. In another embodiment, the optical filter has a visible light transmittance of less than about 15% when in its dark state. In a further embodiment, the optical filter has a visible light transmittance of less than about 10% when in its dark state. In a further embodiment, the optical filter has a visible light transmittance of less than about 5% when in its dark state.

The variance in the visible light transmittance between the light and dark state of the optical filter provides for a wide range of contrast ratios which provide for a range of intermediate states of visible light transmittance. In one embodiment of the invention, the contrast ratio of the optical filter is greater than about 2. In another embodiment of the invention, the contrast ratio of the optical filter is greater than about 3. In a further embodiment of the invention, the contrast ratio of the optical filter is greater than about 4. In another embodiment of the invention, the contrast ratio of the optical filter is greater than about 5. In certain applications, such as in ophthalmic devices, higher contrast ratios may be desired. In one embodiment of the invention, the contrast ratio of the optical filter is between about 1 and about 10. In another embodiment, the contrast ratio of the optical filter is between about 2 and about 12.

In one embodiment, the visible light transmittance of the optical filter of the present invention is controllable throughout the range of intermediate states by a combination of solar radiation and electric voltage. The dark state is achieved automatically in response to UV or solar radiation. Once the dark state is achieved, it is maintained until lightening is triggered by application of an electric voltage. The duration that the voltage is applied will depend on the amount of lightening that is desired. Once the desired lightened state is achieved, the electric voltage may be discontinued and reapplied as needed. Continued application of electric voltage is not required to maintain the desired state of visible light transmittance once achieved, in the absence of exposure to UV or solar radiation. In the presence of UV or solar radiation, the optical filter of the invention can still be switched to its lightened state and maintained by controlled intermittent application of the electric voltage. Intermediate states can be achieved by interrupting or disconnecting the electric voltage during the lightening process or intermittently applying the electric voltage during the darkening process until the desired state is achieved.

The optical filters of the present invention require only a low electric voltage to be applied to effect the lightening process. In one embodiment of the invention, the minimum amount of voltage required to trigger lightening from the dark state is less than about 42 Volts DC. In another embodiment of the invention, the minimum amount of voltage required to trigger lightening from the dark state is less than about 12 Volts. In a further embodiment of the invention, the minimum amount of voltage required to trigger lightening from the dark state is less than about 6 Volts. In another embodiment of the invention, the minimum amount of voltage required to trigger lightening from the dark state is less than about 3 Volts. In another embodiment of the invention, the minimum amount of voltage required to trigger lightening from the dark state is less than about 2 Volts. In a further embodiment of the invention, the minimum amount of voltage required to trigger lightening from the dark state is about 1.8 Volts.

In other embodiments of the invention, the amount of voltage required to trigger lightening from the dark state is between about 1 to about 10 Volts. In another embodiment of the invention, the amount of voltage required to trigger lightening from the dark state is between about 0.1 to about 42 Volts. In a further embodiment of the invention, the amount of voltage required to trigger lightening from the dark state is between about 1.2 to about 2.1 Volts.

As discussed, minimal electric voltage is required and only to effect lightening of the optical filter of the invention. Maintaining the optical filter in a stable state does not require constant application of voltage. Rather, any lightening required to adjust for auto-darkening, when in the presence of UV or solar radiation, can be made by intermittent application of voltage to maintain a constant light state, or by applying a reduced amount of voltage. In this way, the amount of power consumed by the optical filter is minimized. In addition, the minimal voltage requirements of the optical filters of the invention make them amenable to sheet materials having a wide range of sheet resistances. Optical filters of the present invention are amenable to sheet resistances ranging between about 1 Ohms/square to about 10,000,000 Ohms/square. In one embodiment, the optical filters of the invention are amenable to sheet resistances ranging between about 10 Ohms/square to about 1000 Ohms/square. In another embodiment, the optical filters of the invention are amenable to sheet resistances ranging between about 20 Ohms/square to about 500 Ohms/square. In another embodiment, the optical filters of the invention are amenable to sheet resistances ranging between about 100 Ohms/square to about 1,000 Ohms/square. In a further embodiment, the optical filters of the invention are amenable to sheet resistances ranging between about 1,000 Ohms/square to about 10,000 Ohms/square. In another embodiment of the invention, the optical filters are amenable to sheet resistances ranging from about 10,000 Ohms/square to about 1,000,000 Ohms/square. In a further embodiment, the optical filters of the invention are amenable to sheet resistances ranging from about 1,000,000 Ohms/square to about 5,000,000 Ohms/square. In another embodiment, the optical filters of the invention are amenable to sheet resistances ranging from about 5,000,000 to about 10,000,000 Ohms/square.

The speed at which the optical filters of the present invention switch between dark and light states will depend on its final form, however, generally the optical filters of the present invention will have a darkening time of between about 1 second and 30 minutes to reach within 10% of the dark state from the lightened state and a lightening time of between about 1 second and 30 minutes to reach 90% of the light state from the darkened state. In one embodiment of the invention, the optical filter will have a darkening time and a lightening time of about 1 minute to about five minutes. In one embodiment of the invention, the optical filter will have a darkening time of about three minutes. In another embodiment of the invention, the optical filter will have a lightening time of about three minutes. In a further embodiment, the optical filter will have a darkening time of less than five minutes and a lightening time of less than five minutes.

Clarity in optical filters can be caused by transmission haze due to cloudiness caused by scattering of light. Light may be scattered by particles that are suspended in the substance. In its final form, the optical filters of the present invention are transparent and optical clarity is maintained in all states of visible light transmittance, e.g., light, dark and intermediate states. In one embodiment of the invention, the optical filter has a haze transmission of 5.0% or less. In another embodiment of the invention, the optical filter has a haze transmission of 3.0% or less. In a further embodiment of the invention, the optical filter has a haze transmission of 2.0% or less. In another embodiment of the invention, the optical filter has a haze transmission of 1.5% or less. In a further embodiment of the invention, the optical filter has a haze transmission of 1.0% or less.

The optical filters according to the present invention are suitable for various applications. One skilled in the art will appreciate that each optical filter can be prepared in accordance with the requirements of the particular application. For example, the thickness of the optical filter can vary. Thinner filters provide greater flexibility and faster fade times, while thicker filters can offer darker colour and greater rigidity. In accordance with one embodiment, the thickness of the optical filter is between about 0.5 mil and about 40 mil. In another embodiment, the thickness of the optical filter is between about 1 mil and about 10 mil. In a further embodiment of the invention, the thickness of the optical filter is between about 1 mil and 5 mil.

FIG. 1 illustrates one embodiment of an optical filter 100 of the present invention designed to go into a darker state (lower VLT) automatically in the presence of UV or sunlight, and to go to a lighter state (higher VLT) with the application of an electric voltage. A substrate 120 is coated or deposited with a transparent conductive layer 140 disposed on the inner facing surface of the first substrate 120. A second substrate 130 is coated or deposited with a second conductive layer 150 disposed on the inner facing surface of the second substrate 130. The first substrate 120 and second substrate 130 are arranged opposing each other such that the respective transparent conductive layers 140 and 150 face inwards to each other. A switching material 110 is sandwiched between and in contact with each conductive layer 140 and 150. An electrical connection means is provided, for electrically connecting to the two conductive layers 140 and 150. In one embodiment the electrical connection means is a lead 170 connected to transparent conductive layer 140, and a second electrical lead 180 connected to second transparent conductive layer 150.

1. The Substrate

The substrate of the optical filter of the present invention provides sufficient structural integrity to support the switching material. Rigid or flexible substrates can be used to be applicable to a broad range of applications as discussed below. For example, optical filters of the invention that are made with a rigid substrate can operate alone in a particular application, such as a window application. Alternatively, optical filters of the invention that are made with a flexible substrate can operate as an optical film that can be laminated, for example, on the selected application. Examples of suitable materials that can be used as a substrate in the present invention include, but are not limited to, glass and thermoplastic polymers. Suitable thermoplastic polymers include polyethylene terephthalate (PET), polyethene (PE), polypropylene (PP), polybutylene terephthalate (PBT), polycarbonate and combinations thereof. In one embodiment of the invention, the substrate material is glass. In one embodiment of the invention, the substrate material is PET. In one embodiment of the invention, the substrate is heat-stabilized PET. In a further embodiment of the invention, at least one of the substrates incorporates a UV blocker in the substrate.

One skilled in the art will appreciate that the thickness of the selected substrate should allow for sufficient structural integrity to support the switching material while providing sufficient rigidity or flexibility for the particular application of use. Determination of an appropriate material and thickness is considered to be within the ordinary skills of a worker in the art. In one embodiment of the invention, the substrate material has a thickness of between about 0.012 mm and about 10 mm. In one embodiment, the substrate material is rigid and has a thickness of between about 0.5 mm and 10 mm. In another embodiment, the substrate material is rigid and has a thickness between about 1 mm and 5 mm. In one embodiment, the substrate material is flexible and has a thickness of between about 0.024 mm and about 0.6 mm. In another embodiment, the substrate material is flexible and has a thickness of between about 0.051 mm (2 mil) to about 0.178 mm (7 mil).

Combinations of substrate materials and thicknesses are also contemplated for use in the optical filter of the present invention. In one embodiment, an optical filter of the present invention comprises substrates wherein only the first substrate comprises a UV blocker material. In another embodiment, an optical filter of the present invention comprises a first substrate that is rigid and a second substrate that is flexible. In a further embodiment, an optical filter of the present invention comprises a first substrate having a thickness of 5 mil and a second substrate having a thickness of 2 mil.

One skilled in the art will appreciate that the sheet resistance of the substrate materials must enable substantially even charge injection through the optical filter in order to effect lightening. In one embodiment of the invention, the optical filter of the invention will comprise a substrate material having a sheet resistance of up to about 100 Ohms/square. In a further embodiment of the invention, the optical filter of the invention will comprise a substrate material having a sheet resistance of up to about 1000 Ohms/square. In another embodiment of the invention, the optical filter of the invention will comprise a substrate material having a sheet resistance of up to about 100,000 Ohms/square. In another embodiment of the invention, the optical filter of the invention will comprise a substrate material having a sheet resistance of up to about 1,000,000 Ohms/square.

The substrates can optionally include additives such as base colour tints to provide a darker overall range or colour to the optical filter, and/or UV blocking compounds to block certain wavelengths of electromagnetic radiation. In one embodiment the optical filter of the present invention comprises a substrate having a barrier coating to block moisture. In another embodiment, the substrate has an anti-reflective coating. In another embodiment, the substrate has a scratch resistant coating. In a further embodiment, the substrate has a pressure-sensitive adhesive coating for laminating the optical filter onto glass.

2. Electrodes

The electrodes can be made of any electrically conductive material that can be adhered in a layer to the substrate. Suitable materials for the conductive layers are well-known to those skilled in the art and include, for example, metal oxides, carbon nanotubes, and fine wire meshes. Exemplary conductive materials include layers of doped indium tin oxide, doped tin oxide, doped zinc oxide, as well as thin, substantially transparent metallic layers such as gold, silver, aluminium, and nickel alloy.

Methods of applying the electrically conductive material to the substrate to form suitable conductive layers are well known in the art. For example, substrate materials pre-coated with indium tin oxide (ITO) are available from a number of suppliers, including CP Films of St. Louis, Mo. and Southwall Technologies Inc. of Palo Alto, Calif. One skilled in the art will recognize that multiple layers of conductive materials can also be employed in the optical filter of the present invention.

The conductive layers are disposed on the substrate as a coating. The conductive layer is coated or deposited onto the substrate to a thickness that provides adequate conductance for the optical filter, and which does not appreciably interfere with the required transmission of light. In one embodiment, the thickness of the conductive layer ranges from about 1 nanometer to about 90 microns. In another embodiment, the thickness of the conductive layer ranges from about 10 nanometers to about 10 microns.

In one embodiment, the substrate is coated with a conductive layer and has a VLT of greater than 70%. In another embodiment of the invention, the coated substrate has a VLT of greater than 80%. In a further embodiment of the invention, the substrate coated with a conductive layer has a VLT of greater than 85%. In another embodiment of the invention, the coated substrate has a VLT of greater than 90%.

3. Switching Material

As indicated above, the optical filter of the invention comprises a switching material that is both photochromic and electrochromic. This hybrid photo/electrochromic property of the switching material provides an optical filter that will automatically darken when exposed to UV light and/or solar radiation, and lighten when exposed to an electric charge. The switching material is also known as an auto-darkening material due to the ability of the switching material to auto-darken when exposed to UV light or solar radiation.

The switching material can be incorporated in the optical filter of the present invention in a liquid form, a solid form or in a viscous gelled form. In one embodiment the switching material is a liquid. In another embodiment of the invention, the switching material is a gel.

The thickness of the switching material will affect the transmittance of the optical filter of the invention and can be adjusted depending on the particular application desired. For example, a thicker layer with the same concentration of switching material will result in a lower percentage visible light transmission in the dark state. In one embodiment of the invention, the switching material is between about 1 and about 50 microns thick. In another embodiment of the invention, the switching material is between about 0.1 microns and 10 microns thick. In a further embodiment of the invention, the switching material is between about 0.5 microns and 5 microns thick. Typically, uniform thickness of the switching material will be desired in most applications; however, it is contemplated that an optical filter of the invention can comprise a non-uniform thickness of the switching material for applications where some darker regions and some lighter regions are desired.

The switching material comprises 1) a chromophore; and 2) a solvent component. In certain embodiments, additional components may optionally be included in the switching material. For example, the switching material may further comprise 3) a supporting electrolyte component; 4) a polymer component; 5) a charge compensator; 6) a charge carrier; 7) a UV stabilizing agent; 8) a UV blocking agent; and 9) a tinting agent. One skilled in the art will recognize that certain compounds may be able to fill dual roles in the switching material, for example, certain chromophores can self-polymerize and fulfill the role of both chromophore and polymer. Conversely, in some embodiments, a given component may be made up of several individual compounds, e.g., the polymer component may be a co-polymer comprising different monomeric units. Accordingly, as discussed in detail below, the switching material may comprise one or more optional components.

In one embodiment, the switching material of the invention comprises a chromophore and a solvent. In another embodiment, the switching material of the invention comprises a chromophore, a solvent, and at least one optional component selected from the group consisting of: a) a supporting electrolyte component; b) a polymer component; c) a charge compensator; d) a charge carrier; e) a UV stabilizing agent; f) a UV blocking agent; and g) a tinting agent.

3.1 Chromophore

The switching material according to the present invention comprises one or more chromophores that exhibit both photochromic and electrochromic characteristics. These dual mode compounds are capable of reversibly switching between two distinct forms when stimulated electrically and by light. The hybrid photochromic/electrochromic chromophores that can be used in the present invention include classes of compounds from the hexatriene family, for example, the class of compounds known in the art as diarylethenes, dithienylcyclopentenes, and fulgides.

According to one embodiment of the invention, the switching material comprises one or more chromophores from the class of compounds known as diarylethenes.

Among the chromophores suitable for switching materials of the invention are derivatives of 1,2-dithienylcyclopentene as described in International Patent Publication No. WO 2004/015024, having the general structure of Formula 1 below:

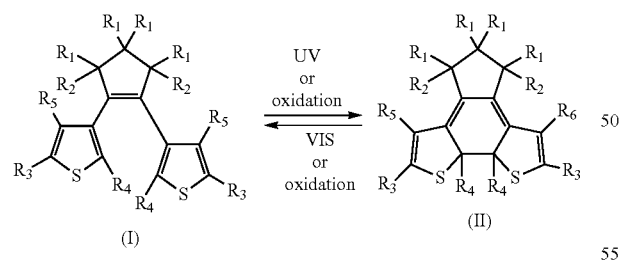

wherein each $R_1$ is independently H or a halogen; wherein each $R_2$ is independently H, a halogen, or both $R_2$ when taken together form CH.dbd.CH, or when in polymeric form $R_2$ is CH.dbd.CH and forms part of a polymer backbone; wherein each $R_3$ is independently alkyl, aryl, H, a halogen or $CO_2Y$ (Y=H, Na, alkyl, aryl); wherein $R_4$ is aryl; and wherein each $R_5$ is independently H, alkyl or aryl.

Preparation of exemplary fluorinated dithienylcyclopentene derivatives that may be incorporated in the switching materials of the invention follows the general methodology of Scheme 1 below:

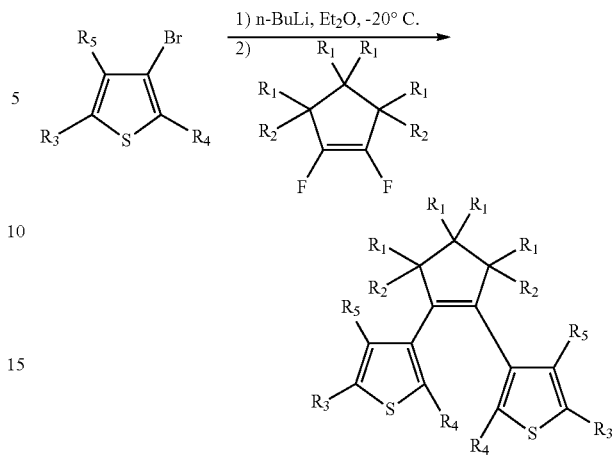

In one embodiment of the invention, the switching material comprises compounds of Formula 1 wherein $R_1$ and $R_2$ are F, $R_3$ and $R_4$ are

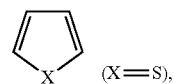

$R_5$ is H. In another embodiment of the invention, the switching material comprises compounds of Formula 1 wherein $R_1$ and $R_2$ are F, $R_3$ is H, $R_4$ is

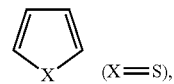

and $R_5$ is H. In a further embodiment of the invention, the switching material comprises compounds of Formula 1 wherein $R_1$ and $R_2$ are F, $R_3$ and $R_4$ are

and $R_5$ is H. In another embodiment of the invention, the switching material comprises compounds of Formula 1 wherein $R_1$ and $R_2$ are F, $R_3$ is H, $R_4$ is

and $R_5$ is H. In a further embodiment of the invention, the switching material comprises compounds of Formula 1 wherein $R_1$ and $R_2$ are F, $R_3$ is

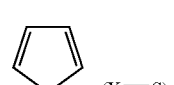

$R_4$ is $CH_3$, and $R_5$ is H. In another embodiment of the invention, the switching material comprises compounds of Formula 1 wherein $R_1$ and $R_2$ are F, $R_3$ is

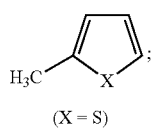

$R_4$ is $CH_3$, and $R_5$ is H.

The chromophores can be incorporated into the switching material in monomeric or polymeric forms depending on the functional demands required. The compounds of Formula 1 may be incorporated in polymeric form as part of the polymer backbone or as a pendant group. For example, fluorinated compounds may be polymerized using ring-opening metathesis polymerization in accordance with Scheme 2 below:

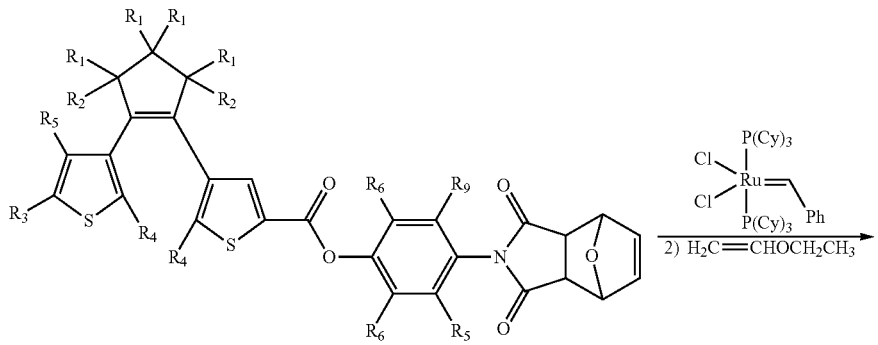

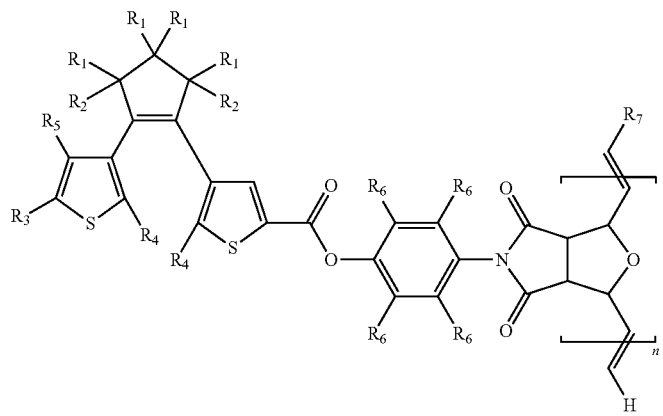

Exemplary non-fluorinated dithienylalkene derivatives that may be incorporated in the switching materials of the invention can be prepared in accordance with the general methodology of Scheme 3 below:

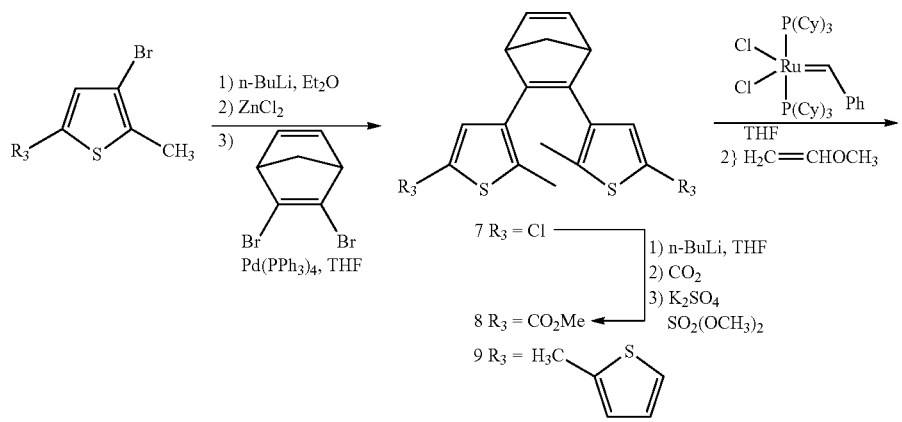

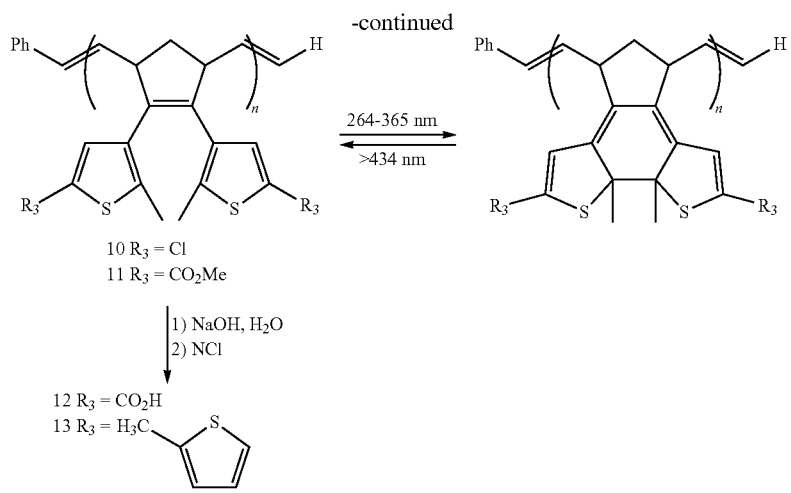

10 $R_3$ = Cl
11 $R_3$ = $CO_2Me$

1) NaOH, $H_2O$
2) NCl

12 $R_3$ = $CO_2H$
13 $R_3$ = $H_3C$—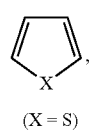

In one embodiment of the invention, the switching material comprises a compound of Formula 1 wherein $R_1$ is H, $R_2$ is CH.dbd.CH, $R_3$ is Cl, $R_4$ is $CH_3$, and $R_5$ is H. In another embodiment of the invention, the switching material comprises a compound of Formula 1 wherein $R_1$ is H, $R_2$ is CH.dbd.CH, $R_3$ is $CO_2CH_3$, $R_4$ is $CH_3$, and $R_5$ is H. In a further embodiment of the invention, the switching material comprises a compound of Formula 1 wherein $R_1$ is H, $R_2$ is CH.dbd.CH, $R_3$ is

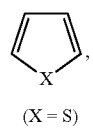

(X = S)

$R_4$ is $CH_3$, and $R_5$ is H.

In other embodiments of the invention, the switching material comprises a compound of Formula 1 wherein the compound forms part of a polymer. In one embodiment of the invention, $R_1$ is H, $R_2$ is CH.dbd.CH and forms part of the polymer backbone, $R_3$ is Cl, $R_4$ is $CH_3$, and $R_5$ is H. In a further embodiment of the invention, the switching material comprises a compound of Formula 1 wherein $R_1$ is H, $R_2$ is CH.dbd.CH and forms part of the polymer backbone, $R_3$ is $CO_2CH_3$, $R_4$ is $CH_3$, and $R_5$ is H. In another embodiment of the invention, the switching material comprises a compound of Formula 1 wherein $R_1$ is H, $R_2$ is CH.dbd.CH and forms part of the polymer backbone, $R_3$ is $CO_2H$, $R_4$ is $CH_3$, and $R_5$ is H. In another embodiment of the invention, the switching material comprises a compound of Formula 1 wherein $R_1$ is H, $R_2$ is CH.dbd.CH and forms part of the polymer backbone, $R_3$ is

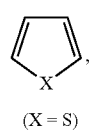

(X = S)

$R_4$ is $CH_3$, and $R_5$ is H.

An example of a suitable chromophore for inclusion in the switching material is one that exhibits both photostability as well as electrochemical durability. The photostability of a compound, i.e., the resistance of the chromophore to light induced degradation, can be measured by the amount of time it takes for the compound to degrade to a certain point under constant light exposure. For example, in one embodiment the compound can be measured in its dark state and its light state to determine its contrast ratio prior to testing. During testing, the contrast ratio is monitored periodically to determine degradation. Failure can be determined to occur when the contrast ratio falls below a certain level, or when the contrast ratio falls below 50% of the original contrast ratio. Other methods for testing are within the knowledge of persons skilled in the art.

The photostability of embodiments of the invention can be tested using a QUV testing unit made by Q-Lab of Cleveland, Ohio. In one embodiment, the switching material of the invention comprises a chromophore having a photostability in the range of about 1000 hours to about 5000 hours of constant light exposure. In another embodiment the switching material of the invention comprises a chromophore having a photostability of over about 5,000 hours of constant light exposure.

The electrochemical durability of a suitable chromophore is measured as the number of cycles that the chromophore can maintain its switching activity between the light and dark state. In one embodiment, the switching material of the invention comprises a chromophore having an electrochemical durability in the range of about 1000 to about 5,000 cycles. In another embodiment the switching material of the invention comprises a chromophore having an electrochemical durability of over 5,000 electrochemical cycles.

Typically, the switching material according to the present invention contains about 1% to about 30% by weight of the one or more chromophores. In another embodiment of the invention, the switching material contains about 2% to about 7% by weight of the one or more chromophores. In another embodiment of the invention, the switching material contains greater than 5% by weight of the one or more chromophores. In a further embodiment of the invention, the switching material contains about 3% by weight of the one or more chromophores. In another embodiment of the invention, the switching material contains about 6% by weight of the one or more chromophores. In another embodiment of the invention, the switching material contains about 5% by weight of the one or more chromophores.

3.2 Solvent Component

The primary role of the solvent component of the switching material is to dissolve, intersperse and diffuse the one or more chromophores and other components throughout the switching material. The solvent used in the preparation of the switching material is typically inert, i.e., photochemically and electrochemically inactive, and colourless, and has a sufficiently high boiling point to prevent solvent loss under typical operating conditions. Examples of suitable solvents include, but are not limited to, triglyme, dichloroethane, tetraglyme, propylene carbonate, ethylene carbonate, water, butyrolactone, cyclopentanone and mixtures thereof. In one embodiment of the present invention, the solvent component comprises triglyme.

Typically, the switching material according to the present invention contains about 50% to about 90% by weight of the solvent component. In another embodiment of the invention, the switching material contains about 60% to about 80% by weight of the solvent component. In a further embodiment of the invention, the switching material contains about 70% to about 75% by weight of the solvent component.

3.3 Optional Components

The switching material can optionally contain other components such as supporting electrolyte components, additional polymer components, tinting agents, UV-stabilizing agents or blockers, charge carriers and charge compensators. It will be apparent that optional components for inclusion in the switching material should be selected such that they do not adversely affect the properties of the optical filter.

Supporting Electrolyte Component

The supporting electrolyte component of the switching material is inert and electrically conductive and consists of, or any combination of, substances known in the art. Examples of such substances include alkali metal salts and tetraalkylammonium salts. Specific non-limiting examples of the electrolyte component of the present invention include, tetrabutylammonium hexafluorophosphate, tetrabutylammonium tetrafluoroborate, tetrabutylammonium perchlorate, lithium perchlorate, lithium bis(trifluoromethanesulfonimide), lithium triflate, and combinations thereof. In one embodiment of the present invention, the electrolyte component comprises lithium perchlorate. In another embodiment of the present invention, the electrolyte component comprises tetrabutylammonium tetrafluoroborate.

Typically, the switching material according to the present invention contains up to about 2% by weight of the supporting electrolyte component. In another embodiment of the invention, the switching material contains up to about 1% by weight of the supporting electrolyte component. In a further embodiment of the invention, the switching material contains up to about 0.5% by weight of the supporting electrolyte component.

Polymer Component

As discussed above, the one or more chromophores incorporated in the switching material of the present invention can be in polymeric form. In other embodiments of the invention, additional polymers can be added to the switching material. One skilled in the art will appreciate that commercially available polymers can be used in the preparation of the switching material. Examples of polymers that can be used in the present invention include, without limitation, polyvinyl butyral (PVB), poly(methyl methacrylate) (PMMA), polyvinylpyrrolidone (PVP), polyvinylidene fluoride (PVdF), poly(dimethyl siloxane) (PDMS), poly(ethyl methacrylate) (PEMA), Polydimethylsiloxane (PDMS), and combinations thereof.

In one embodiment, the switching material according to the present invention contains up to 50% by weight of the polymer component. In another embodiment, the switching material according to the present invention contains between about 5% and about 40% by weight of the polymer component. In a further embodiment, the switching material according to the present invention contains between about 15% and about 30% by weight of the polymer component. In another embodiment, the switching material according to the present invention contains between about 20% and about 25% by weight of the polymer component. In a further embodiment, the switching material according to the present invention contains less than about 60% by weight of the polymer component. In another embodiment, the switching material according to the present invention contains between about 10% and about 30% by weight of the polymer component. In another embodiment of the invention, the switching material contains between about 10% and about 25% by weight of the polymer component. In a further embodiment of the invention, the switching material contains between about 15% and 25% by weight of the polymer component.

Charge Compensator

The primary role of the charge compensator component is to balance the redox chemistry of the switching material and consists of, or any combination of, substances known in the art to be suitable charge compensator materials. The charge compensator used in the preparation of the switching material is typically a cathodic material to redox balance the anodic chromophore and is sufficiently stable in both the reduced and oxidized forms.

Examples of suitable charge compensators include, but are not limited to Prussian Blue, ferrocenium tetrafluoroborate, ferrocenium hexafluorophosphate, tetracyanoquinodimethane, tetrafluoro-tetracyanoquinodimethane, 1,4-dicyanobenzene, 1,2,4,5-tetracyanobenzene, pyrene, tetracene and pentacene.

The switching material according to the present invention typically contains about 0.1% to about 10% by weight of the charge compensator component.

Charge Carrier

The primary role of the charge carrier component is to facilitate transport of the electrons and holes between the two electrodes and consists of, or any combination of, substances known in the art to be suitable charge carrier materials. The charge carrier used in the preparation of the switching material is typically redox active in the electrochemical potential range required to trigger colour lightening of the switching material. Examples of suitable charge carriers include, but are not limited to tris(4-bromophenyl)amine, tris(4-chlorophenyl)amine, 10-methylphenothiazine, 9,9-(N,N,N',N'-tetrabipheyl-N,N'-diphenyl)flourene, 4,4'-di(N-carbozolyl)biphenyl, 1-(N-carabozolyl)-4-diphenylaminobenzene, and 1-(N-Carbozolyl-4-N'-.alpha.-naphthyl-N'-phenylamine, N,N,N'N'-tetraphenylbenzidine.

The switching material according to the present invention typically contains about 0.1% to about 10% by weight of the charge carrier component.

UV Stabilizer

The primary role of the UV stabilizer is to inhibit photodegradation of the switching material by scavenging radical intermediates formed in photodecomposition processes and consists of, or any combination of, substances known in the art to be suitable UV stabilizing materials. Examples of suitable UV stabilizers include, but are not limited to the class of compounds known in the art as hindered amine light stabilizers (HALS).

The switching material according to the present invention typically contains about 0.1% to about 10% by weight of the UV stabilizer component.

UV Blocker

The primary role of the UV blocker (or UV absorber) is to prevent photodegradation of the auto-darkening material by including a component of the material that absorbs higher energy UV light and dissipates the energy thermally preventing photodecomposition and consists of, or any combination of, substances known in the art to be suitable UV blocking materials. Examples of suitable UV blockers include, but are not limited to benzotriazoles, benzophenones and related classes of compounds.

The switching material according to the present invention typically contains about 0.1% to about 10% by weight of the UV blocker component.

Tinting Agent

The primary role of the tinting agent is to achieve a desired colour and, in some embodiments, to adjust the VLT in the light state of the switching material by including a dye compound that does not interfere with the photochemistry or electrochemistry of the switching material. Examples of suitable dye compounds are commercially available and known to those skilled in the art.

4. Control Circuit

To be operated, the optical filter of the present invention is connected to a power source capable of establishing a potential difference (voltage) between the electrodes of the optical filter. A control circuit can be used to switch the electrical voltage on or off based on input from a user or some other input, and can also be used to modulate the voltage to the correct level. The power for turning the optical filter on or off can come from a variety of sources, including grid power and battery power. In one embodiment, the power comes from AC line voltage in a house. In another embodiment, the power comes from a battery. The power source is connected to the optical filter through the control circuit. The control circuit comprises a switch that opens and closes the circuit between the power source and the electrodes in the optical filter. The control circuit can also include a DC-DC converter for converting the voltage from the power source to an appropriate voltage to cause the chromophore to go into its light state. A DC-DC regulator can also be used to regulate the voltage. The control circuit can also comprise circuitry elements for applying electric voltage to the optical filter for a fixed period of time following the receipt of input from the user.

Figure 6:
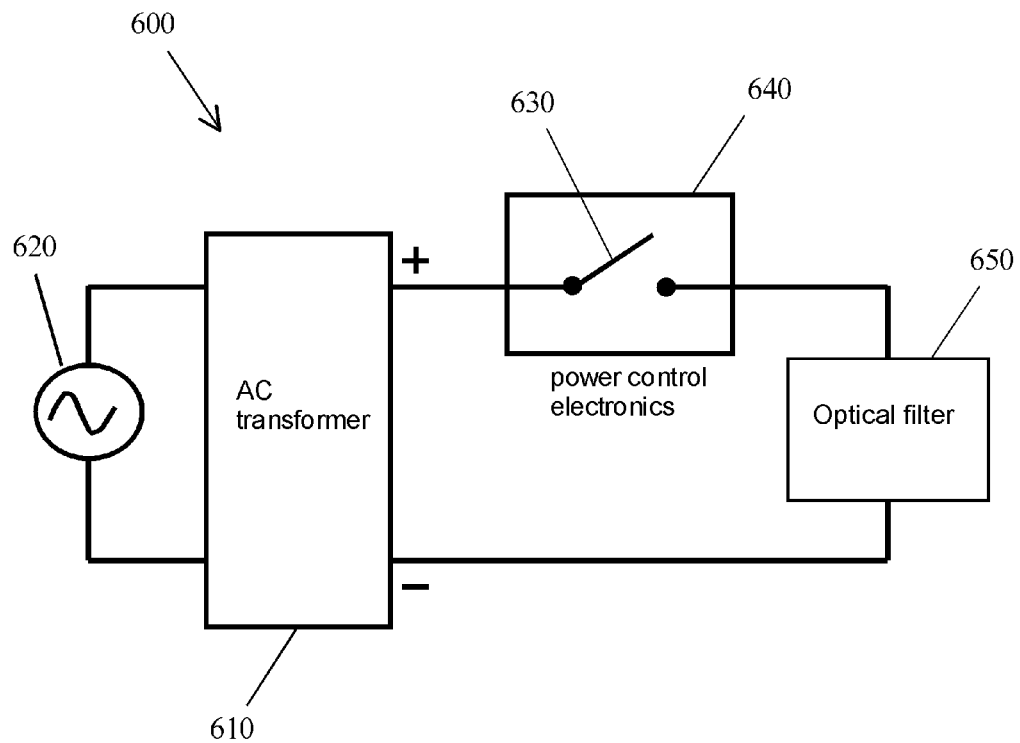
FIG. 6 illustrates a control circuit configuration for use with an optical filter according to an embodiment of the presenting invention.

Referring to FIG. 6, in one embodiment, a control circuit 600 is used to apply a voltage to the electrodes of the optical filter in order to cause lightening. A power source 620 supplies electric power to the circuit. In one embodiment, the power source 620 is an AC line voltage typically found in a home or commercial building. In other embodiments, the power source 620 is a battery or some other DC power source. An AC transformer 610 can be used to transform the AC voltage into a DC voltage for use in the control circuit. A switch 630 can be used to connect and disconnect the DC voltage from the optical filter 650 of the invention.

Embodiments of the invention include switches that can be user activated, activated by control electronics automatically or in response to input from the user, or it can be activated by a sensor such as a light sensor. In one embodiment, the power control electronics is a user-activated switch that passes the DC voltage from the power source straight into the optical filter. The user-activated switch can be a normally-open push button, or some other type of switch. The DC voltage from the AC adapter is matched to the voltage required by the optical filter in order to trigger lightening. The voltage that can be applied for lightening of the optical filter will depend on factors such as the switching material and the resistivity of the electrodes. In one embodiment, the voltage applied ranges from between about 1 to about 10 volts DC. In another embodiment, the voltage applied ranges from about 0.1 to about 42 volts DC. In a further embodiment, the optical filter of the invention lightens with the application of approximately 1.8 volts.

In one embodiment of the invention, power control electronics 640 can be used to control the voltage being applied to the optical filter 650 of the present invention as well as for controlling the duration that the voltage is applied. In one embodiment, control electronics may include a DC-DC converter for converting and/or regulating the voltage from AC transformer 610. For example, AC transformer 610 may output a 12 Volt DC voltage. A DC-DC converter can be used to step the 12 Volt DC voltage down to a lower voltage. In one embodiment, the optical filter of the present invention uses a voltage in the range of 1.2 Volts to 2.1 Volts to lighten.

In another embodiment, the power control electronics 640 controls switch 630. In this embodiment, the power control electronics 640 close switch 630 in response to user input or input from an electronic device such as a sensor. The user presses a button connected to a normally open momentary switch to provide an input signal to power control electronics 640. The power control electronics 640 then closes switch 630 for a fixed period of time. The fixed period of time can be preset and built into the power control electronics by using a standard timing circuit familiar to those skilled in the art of electronic circuits. The fixed period of time would be preset to be the amount of time required for the optical filter 650 to lighten.

A light sensor can also be incorporated into power control electronics 640 to sense when it is bright outside. If it is bright outside and the user presses the button, the power control electronics can maintain a voltage on the optical filter 650 in order to maintain the lightened state. Maintaining a voltage on optical filter 650 can serve to over-ride the auto-darkening feature of the optical filter and keep it in a light state even when it is exposed to UV light. In one embodiment, the user returns the optical filter to its normal auto-darkening state by pressing the button again, or by pressing a second button. In another embodiment, power control electronics 640 is used to apply a square wave signal to the optical filter 650 in order to provide for faster lightening times and longer lifetimes.

In a further embodiment, switch 630 is a multi-state control device such as a potentiostat or a multi-position switch that allows the user to select various different states to lighten the optical filter 650. For example, the user could select an intermediate state to indicate that a state part way between fully dark and fully light is desired. Power control electronics 640 can then apply the voltage to the optical filter 650 for a sufficient duration to achieve this intermediate state. Other methods of causing the optical filters of the invention to reach an intermediate state, such as applying a reduced amount of voltage, may also be possible.

Power control electronics 640 can also include a voltage or current sensor that can sense when the lightening process is completed in the optical filter 650. When power control electronics 640 sense that the lightening process is completed, it will open switch 630 in order to conserve power. Other functions and features that can be built into power control electronics 640 are also contemplated.

Control electronics 640 can also include electronic circuitry to apply a pulsed or alternating waveform to the optical filter 650 instead of a constant DC voltage. The waveform can be in the form of a square wave, a sawtooth wave, a sinusoidal wave, or some other waveform. The amplitude of the wave can vary. In one embodiment, a square wave can be applied to the electrodes of the optical filter 650 by control electronics 640. The square wave can range from amplitude of about −2 Volts to about +2 Volts. When one of the transparent electrodes is at +2 Volts, the other transparent electrode is at −2 Volts. In one embodiment, the waveform varies from 0 to a positive voltage at one electrode and the other electrode varies from 0 to a corresponding negative voltage. In another embodiment, the waveform varies from about 0 to about 2 Volts at one electrode and from about 0 to about 2 Volts at the other electrode. Applying the voltage to the electrodes as a square wave may reduce the lightening time and/or increase the cycle life of the optical filter 650. In one embodiment, the frequency of the waveform is 100 Hz. In a further embodiment of the invention, waveform frequencies range between about 0.1 Hz to about 1,000 Hz. In another embodiment, waveform frequencies range between about 0.001 Hz to about 100 KHz.

5. Optional Components of the Optical Filter

As discussed, the optical filter of the invention requires UV radiation in order to transition to its dark state, however, as is appreciated by persons of skill in the art, chromophores, particularly organic ones, can degrade in UV light. To counter the UV-light-induced degradation of the chromophores, one or more UV blockers can be used to block some or a substantial amount of the UV light that the optical filter of the invention is exposed to. The purpose of the UV blocker is to block a substantial amount of the UV light from reaching the switching material while allowing sufficient levels of UV radiation exposure to effect auto-darkening.

The UV blocker may be incorporated in the substrate or applied as a layer on the substrate. If present as a UV blocking layer on the optical filter, it may comprise a film or layer of inorganic material, organic material or a combination of the two. Examples of inorganic materials are titanium dioxide, zinc oxide, cadmium oxide, tungsten trioxide and mixed oxides combining two or more of such materials. An inorganic UV blocking layer can be applied to the substrate by a variety of means such as chemical vapor deposition, physical vapor deposition, (e.g. sputtering, electron beam evaporation, and ion plating), plasma spray techniques or sol-gel processes. A UV blocker can be provided by a stack of thin film materials, (dichroic stack), with thickness and index of refraction chosen so as to reflect or absorb UV light. An organic UV blocker may be made up of a layer of polymer material that is inherently absorbing of the wavelength of light of interest or contains light absorber or stabilizer materials mixed, (dissolved or interspersed) into the polymer material or covalently bonded to the polymer itself.

Examples of polymer materials include polyethylenes, polypropylenes, polybutylenes, epoxies, acrylics, urethanes, vinyls including polyvinyl chloride, poly(vinyl butyral)s, poly(vinyl alcohol)s, acetates, polystyrenes, polyimides, polyamides, fluorocarbon polymers, polyesters, polycarbonates, poly(methyl methacrylate), poly(ethyl methacrylate), poly(vinyl acetate), co-polymers of the aforementioned, and polymer blends of the aforementioned polymers.

A large number of light absorbers and/or stabilizer materials are known in the art and particularly useful ones include benzotriazoles, benzophenones, cyanoacrylates, hindered amines, oxalanilides and substituted triazines.

The concentration of UV light absorbers in the UV blocking layer and the thickness of the UV blocking layer are chosen so as to provide stability against sunlight degradation of the switching material layer beyond the UV blocking layer(s), while allowing sufficient levels of UV light exposure to effect auto-darkening. In one embodiment, a UV blocking film is positioned in front of the light exposed surface of the optical filter and transmits about 8% to 10% of the incident UV light between 250 and 400 nm. In another embodiment, the UV blocker transmits between 5% and 25% of the UV light. In another example, the UV blocker transmits between 1% and 50% of the UV light between 250 and 400 nm.

In one embodiment, the UV blocking film blocks more of the UV light below a certain wavelength. The UV blocking film blocks out the damaging high-energy UV at lower wavelengths, while allowing more of the lower-energy UV light to pass through. The lower-energy UV light can be used to cause the auto-darkening. In one embodiment, the UV blocking film blocks most of the UV light below about 350 nm, but allows UV light between 350 nm to 400 nm to pass through.

Format of the Optical Filter

The present invention contemplates various formats for the optical filters. In one embodiment, the optical filters of the invention comprise a substrate coated with a transparent conductive layer disposed on the inner facing surface of the first substrate. A second substrate is coated with a second conductive layer disposed on the inner facing surface of the second substrate. The first substrate and second substrate are arranged opposing each other such that the respective transparent conductive layers face inwards to each other creating an electrochemical cell. A switching material is sandwiched between and in contact with each conductive layer. Seals may be required to keep the switching material sandwiched between the substrates as well as to bond the two substrates together, however, in some embodiments the switching material can function as the adhesive between the substrates thereby foregoing the need for seals. Spacer elements can be incorporated between the electrodes in order to maintain a constant distance between the electrodes. The spacer elements can be attached to the electrodes or the spacer elements can be free floating.

Figure 2:
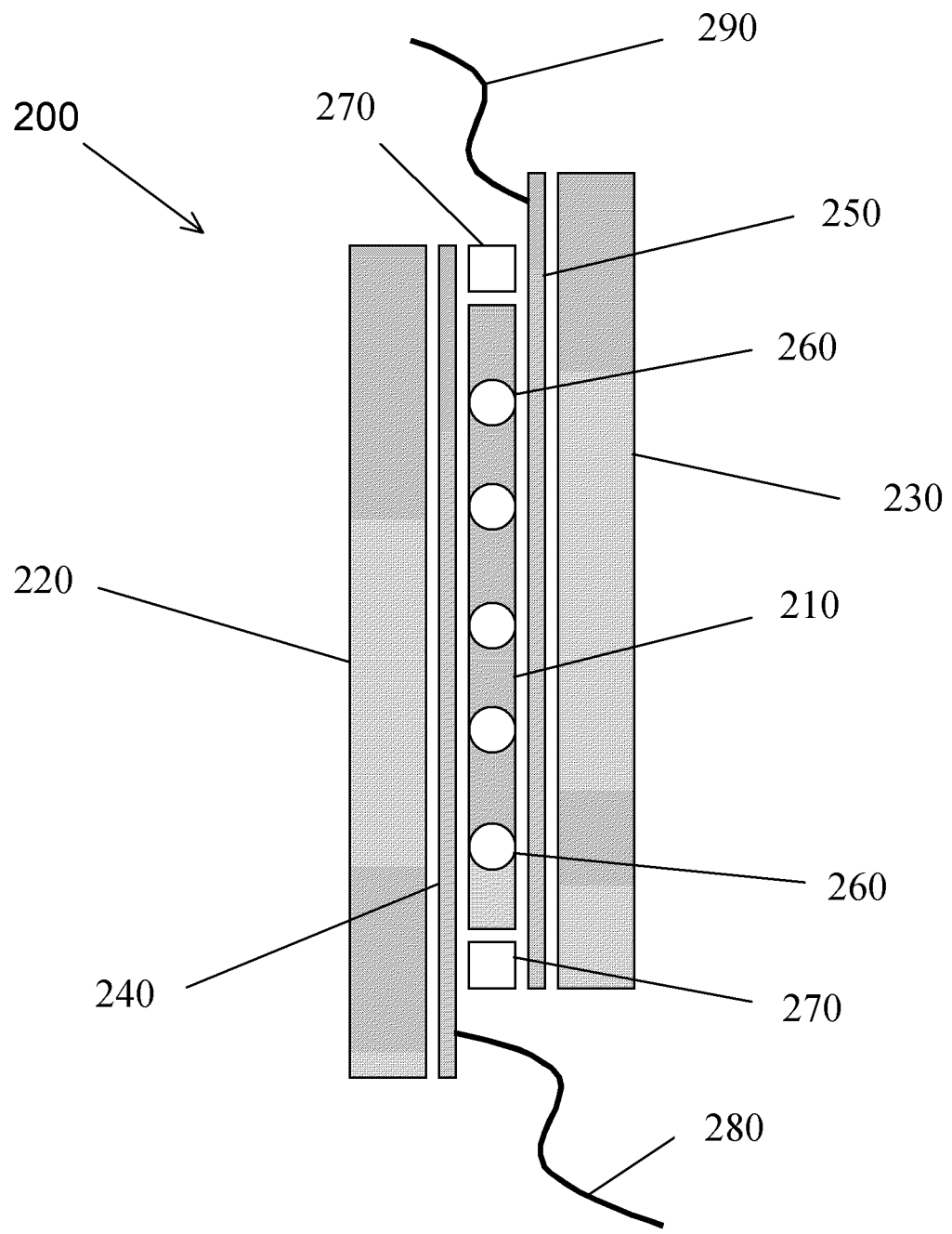
FIG. 2 is a cross-sectional schematic view of an optical filter comprising spacer elements according to an embodiment of the present invention.

According to one embodiment of the present invention, and referring to FIG. 2, optical filter 200 comprises a first substrate 220 and a second substrate 230 coated with transparent conductive electrodes 240 and 250, respectively. Switching material 210 comprises at least two spacer elements 260 to maintain a consistent distance between a first conductive electrode 240 and a second conductive electrode 250. In one embodiment the spacer elements are glass or plastic beads that have a diameter or thickness about equal to the desired gap between conductive electrodes 240 and 250. Gap thicknesses can range between about 1 nm up to about 1 mm, depending on the desired characteristics of the optical filter. In one embodiment, the desired gap is about 25 microns. In another embodiment, the desired gap is about 60 microns. A perimeter seal 270 interposed between the two conductive electrodes 240 and 250 and the two substrates 220 and 230 can be used around the outside of the optical filter 200 to prevent leakage or evaporation of solvent from the switching material 210. Spacer elements 260 can also be adhered to one of the substrates. Electrical lead 280 is connected to conductive electrode 240, and lead 290 is connected to conductive electrode 250.

Figure 3:
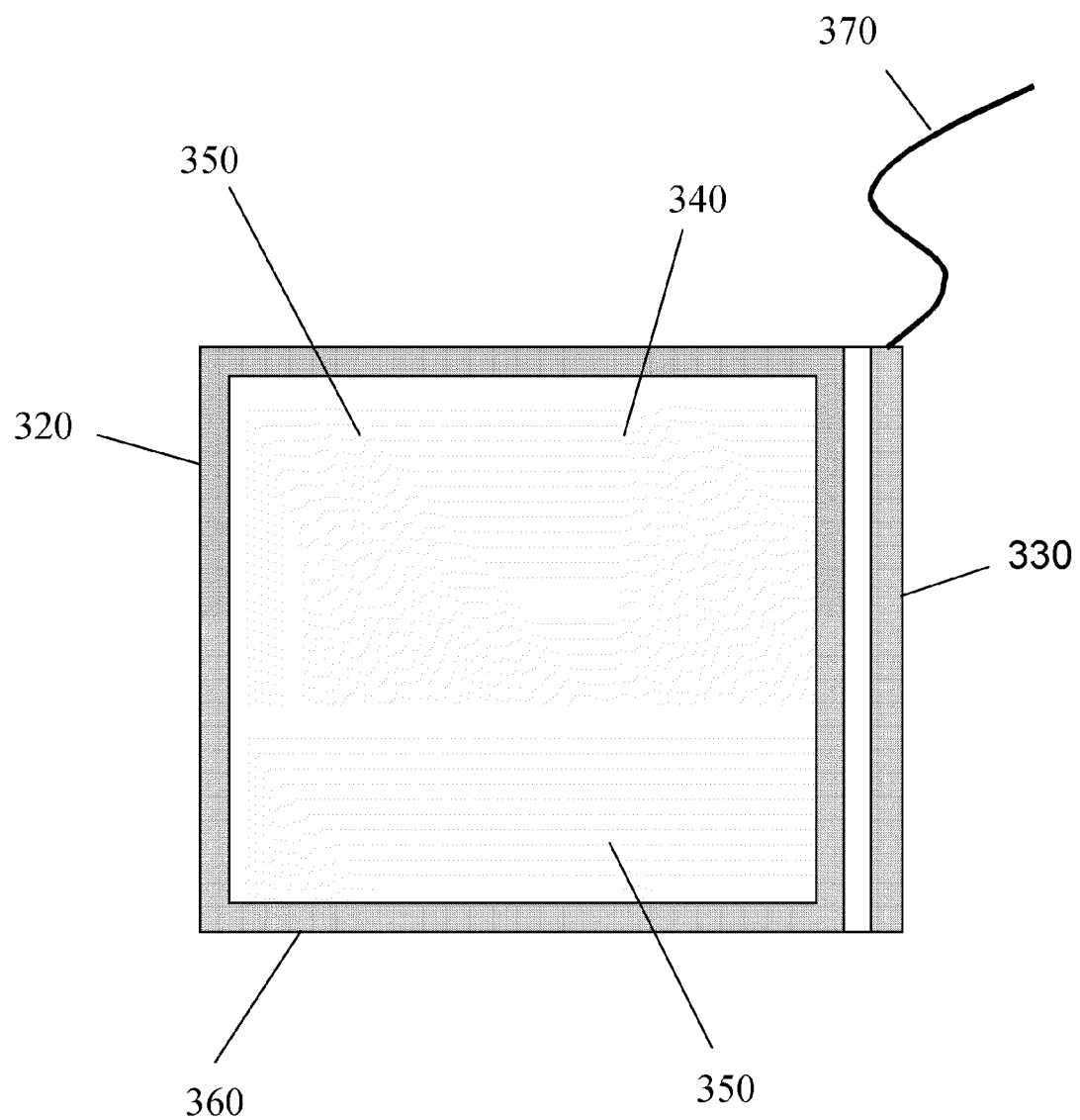
FIG. 3 is a plan view of a substrate with spacer dots according to an embodiment of the present invention.

According to another embodiment of the invention and referring to FIG. 3, a substrate 320 of the optical filter can be printed with a pattern of spacer elements 350. Substrate 320 can be made of material such as PET. A transparent conductive coating 340 such as ITO can be coated onto the substrate. Spacer elements 350 can then be applied to the substrate prior to assembling into the optical filter laminate. In one embodiment, spacer elements 350 are printed onto the substrate using a screen printing technique. Other methods of applying the spacer elements to the substrate are known to those skilled in the art. The spacer elements 350 can be formed using a material such as the Acheson ElectroDAG PD-038 UV Curable Dielectric Dot Spacer material available from Henkel Corporation of Dusseldorf, Germany. Other materials are also contemplated for use to form the spacer dots. Spacer elements 350 should be spaced as far apart as possible to reduce their impact on the optical properties of the filter, but should be sufficiently close together to maintain the desired consistent gap between the two electrodes. In one embodiment, spacer elements are spaced about 3 mm apart and are about 40 microns in diameter. In another embodiment, the spacer elements are spaced between about 0.1 mm and about 100 mm apart. In another embodiment, the spacer elements are between about 10 and about 500 microns in diameter. A perimeter seal 360 can be applied around the perimeter of substrate 320. Perimeter seal 360 can be a material such as an epoxy or other adhesive, or it can be formed from a sheet material and laminated onto substrate 320. If the material used for perimeter seal 360 is a liquid material, it can also be screen printed on. Bus bar 330 can be applied to one edge of substrate 320 in order to provide an electrical connection to conductive coating 340. Bus bar 330 can be formed from some conducting material such as copper, aluminum, silver, gold, or other conductive materials. Bus bar 330 can be printed on using for example a silver epoxy or silver ink material. Bus bar 330 can also be formed using copper tape with conductive adhesive. Electrical lead 370 can be attached to bus bar 330.

Figure 4:
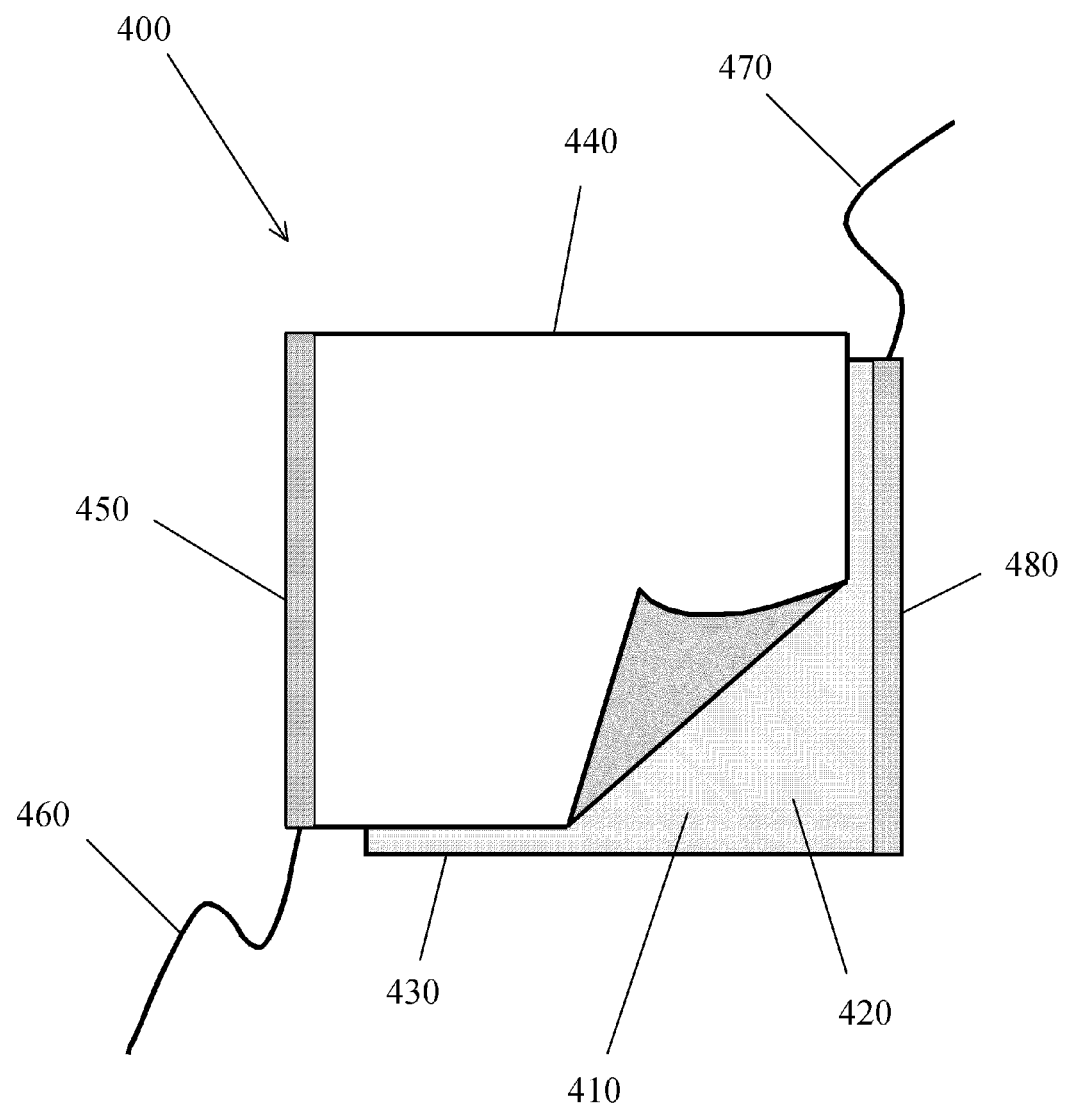
FIG. 4 is a general view of an optical filter comprising a spacer element pattern according to an embodiment of the present invention.

An additional embodiment of the present invention is depicted in FIG. 4 wherein the switching material 410 of the optical filter 400 is sealed into individual cells formed by a spacer element pattern 420. Spacer element pattern 420 can be applied to a substrate 430. Substrate 430 can be precoated with a conductive material such as ITO. Spacer element pattern 420 encloses and seals a pocket of switching material 410. In addition to providing a consistent gap between substrates 440 and 430, spacer element pattern 420 can also bond substrates 440 and 430 together and provide seals for each individual cell filled with switching material 410 to prevent loss of switching material through leakage or evaporation. In one embodiment, spacer element pattern 420 is a honeycomb pattern. In another embodiment, the spacer element pattern 420 is a square pattern, or some other type of closed pattern. Bus bar 450 is attached to substrate 440, and lead 460 is attached to bus bar 450. A second bus bar 480 is attached to substrate 430, and electrical lead 470 is attached to bus bar 480.

Process for Preparing the Optical Filter

The optical filters of the present invention are amenable to a variety of processing methods. In particular, the present invention contemplates roll-to-roll processing methods for making the optical filter and generally comprises the steps of providing a flexible transparent substrate, having a transparent conductive material coated or deposited on one side of the flexible transparent substrate to form at least one electrode, and coating or depositing the conductive side of the flexible substrate with a switching material. The method further comprises the steps of providing a second flexible substrate which may also be similarly coated or deposited with a transparent conductive material to form a second electrode as needed, and applying it on top of the switching material to form a sandwich structure with the switching material in contact with the two transparent conductive electrodes.

Figure 7:
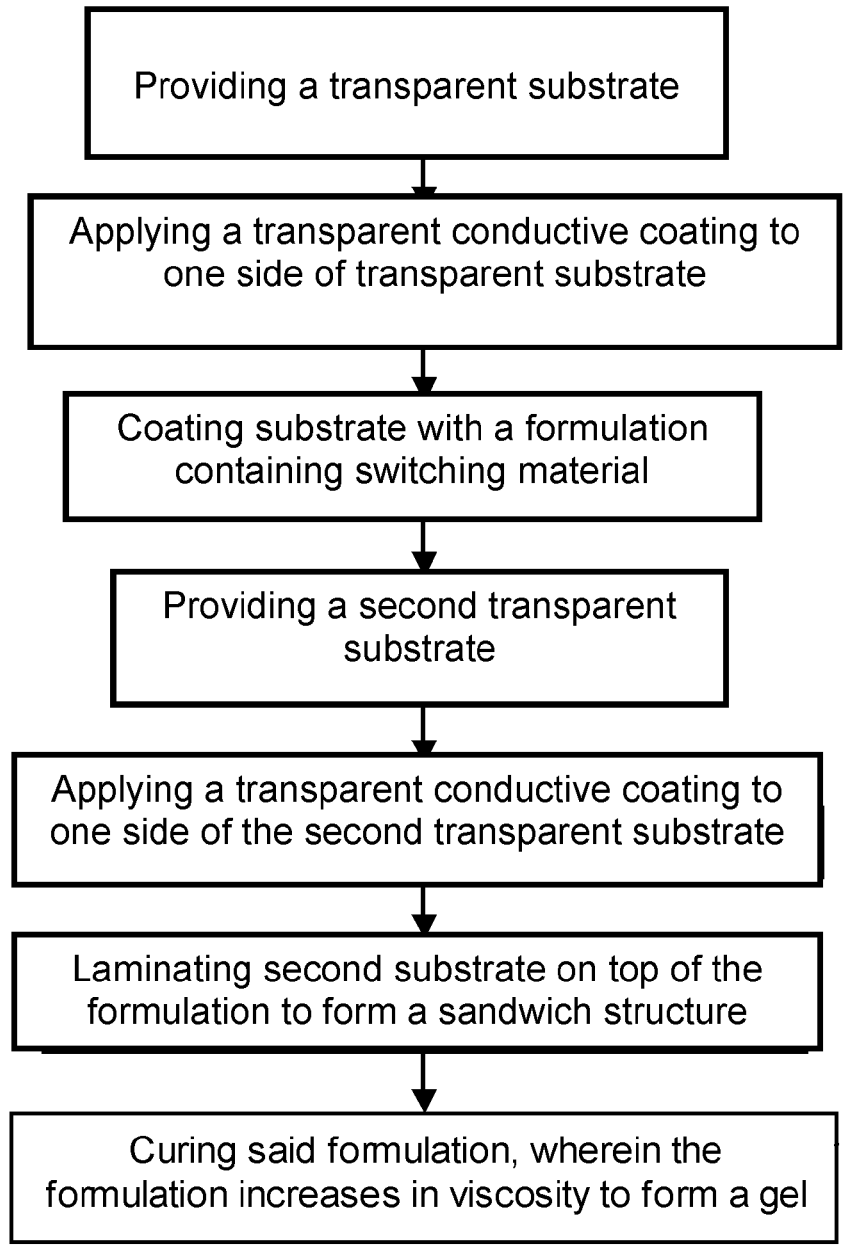
FIG. 7 is a flow chart illustrating a process of manufacturing an optical filter according to an embodiment of the present invention.

Referring to FIG. 7, a method of making an optical filter according to one embodiment of the present invention, comprises providing a transparent substrate. The transparent substrate can be glass or a transparent PET material or some other polymer, applying a substantially transparent conductive coating to one side of the transparent substrate in order to form an electrode, coating the substrate with a formulation comprising a switching material, and laminating a second similarly prepared substrate coated with conductive coating on top of the switching material to form a sandwich structure.

In one embodiment, the switching material has a high viscosity at room temperature and is made into a lower-viscosity liquid by heating to allow it to be applied or coated onto the substrates. In one embodiment, the switching material is heated to about 100° C. and pressed between the substrates. According to another embodiment of the invention, the switching material is first cast as a liquid and then further treated to increase the viscosity of the material to form a gel. For example, the switching material can be dried wherein the solvent or co-solvent is evaporated from the switching material. In other embodiments, the switching material is cured to increase the viscosity to form a gel. Curing the switching material may be accomplished with UV light. A photoinitiator may be added to the switching material which, when exposed to UV light, can help to cross-link the formulation to increase its viscosity. Other methods of curing such as with heat or exposure to electron beams may be possible with different formulations. One skilled in the art will appreciate that this polymerization and/or cross-linking can be initiated by chemical-, thermal-, or photo-type initiators. A common method of UV curing can be accomplished by adding a constituent that, when exposed to UV light, will form a radical to initiate polymerization and/or cross-linking. Suitable polymerization initiators are known in the art and include, for example, heat sensitive initiators such as AIBN, photo-initiators such as DAROCUR 4265. The gelled switching material can then adhere to both substrates to form an integral structure.

Once the filter has been made, it can be cut to size, sealed around the perimeter if necessary, and an electrical connection can be made to the electrodes. The electrical connection can be made by printing bus bars onto the substrates in contact with the transparent conductive coating. Electrical leads can then be attached to the bus bars. The optical filter when completed will darken automatically in the presence of UV light and allow the user to return it to a lighter state when an appropriate electrical charge is applied to the electrodes.

Testing the Optical Filter

The performance efficacy of the optical filters of the present invention can be tested by conducting studies using standard techniques in the art including, for example, measuring the visible light transmittance, haze, switching speed, photostability, cycling, and voltage requirements of the optical filter.

1. Photostability

The photostability of the optical filters of the invention to UV light can be determined by testing using artificial accelerated testing methods or by outdoor testing methods known to those of skill in the art. Photostability testing is typically done under controlled conditions, where the exposure light, temperature, and sometimes humidity can be controlled.

UV weathering testing can be performed, for example, on a QUV instrument at 50° C. and ambient humidity. In one embodiment, the % degradation of the optical filter is less than 50% over a period of 700 hours. In another embodiment, the % degradation of the optical filter is less than 50% over a period of 1400 hours or greater. In a further embodiment, the % degradation of the optical filter is less than 50% over a period of 2100 hours or greater. In another embodiment, the % degradation of the optical filter is less than 50% over a period of 3500 hours or greater. In a further embodiment, the % degradation of the optical filter is less than 50% over a period of 7000 hours or greater.

UV weathering testing can also be performed on a Solar Light 16S accelerated weathering test instrument. The Solar Light uses a xenon-arc lamp that can be filtered to provide a small concentrated beam of UV light for greatly accelerated weathering testing. In one embodiment, the % degradation of the optical filter is less than 50% over a period of 100 hours or greater on the Solar Light instrument. In another embodiment, the % degradation of the optical filter is less than 50% over a period of 250 hours or greater. In a further embodiment, the % degradation of the optical filter is less than 50% over a period of 500 hours or greater. In another embodiment, the % degradation of the optical filter is less than 50% over a period of 750 hours or greater. In a further embodiment, the % degradation of the optical filter is less than 50% over a period of 1000 hours or greater.

2. Cycling Durability

Cycling durability, or switching durability, measures the cyclic switching ability of an optical filter of the invention. Cycling durability measures the number of cyclic switches between light and dark states that an optical filter can undergo before it fails. Cycling durability of the optical filters of the invention can be determined by analytical techniques wherein the optical filter is continuously cycled between its dark and light state in accordance with a user controlled cycling profile. For example, and in one embodiment, cycling durability is measured as the number of cycles achieved between the limits of 10% VLT and 90% VLT, by the optical filter before the contrast ratio decreases to 50% of the initial contrast ratio of the optical filter, i.e., 50% degradation, when the optical filter is said to have failed. In one embodiment, the cycling durability of the optical filter is greater than about 100 cycles. In another embodiment, the cycling durability of the optical filter is greater than about 500 cycles. In a further embodiment, the cycling durability of the optical filter is greater than 1,000 cycles. In another embodiment, the cycling durability of the optical filter is greater than 10,000 cycles. In a further embodiment, the cycling durability of the optical filter is greater than 40,000 cycles.

3. Visible Light Transmittance (VLT)

The VLT can be measured using an Ocean Optics Photospectrometer, available from Ocean Optics of Dunedin, Fla., USA. The VLT is an average of the transmittance over the visible portion of the electromagnetic spectrum. In one embodiment, the VLT in the dark state of the optical filter is between 1% and 40%. In another embodiment, the VLT in the dark state is between 2% and 20%. In a further embodiment, the VLT in the dark state is between 5% and 15%. In another embodiment, the VLT in the light state of the optical filter is between 50% and 90%. In another embodiment, the VLT in the light state is between 60% and 80%. In a further embodiment, the VLT in the light state is between 65% and 75%.

4. % Haze

The scattering of light as it passes through the optical filter of the invention, or % haze, can be measured using methods known in the art, for example using a XL-211 Hazemeter from BYK-Gardner. In one embodiment, the % haze is below 10%. In another embodiment, the % haze is below about 5%. In a further embodiment, the % haze is below about 2%. In another embodiment, the % haze is below about 1%.

5. Switching Speed

Switching speed is measured as the time it takes to transition between the light and the dark states, and also between the dark and the light states. In one embodiment, the switching speed is the time required to transition from between 90% of the original VLT in the light state and 10% of the original VLT in the dark states.

Use of the Optical Filter

The optical filters of the present invention can be incorporated into a variety of applications. In particular, optical filters of the invention are especially applicable in systems where it is desirable to dynamically control and filter light. The optical filters of the invention can be used as-is or can be laminated onto another substrate such as glass or polycarbonate.

1. Variable Transmittance Windows

Optical filters of the present invention can be incorporated into a variety of window systems to confer controllable variable transmittance functionality on the window system. In one embodiment, a variable transmittance window of the present invention comprises the switching material described herein and a transparent substrate such as a sheet of glass or transparent polymer. Glass is the most typical transparent substrate used in window applications, but transparent polymer materials and other materials can also be used. As previously described, the switching material will darken automatically when exposed to UV or sunlight and will lighten through application of an electric charge. When the switching material is exposed to UV or sunlight, the VLT of the window is reduced. This helps to reduce glare and improve occupant comfort. The variable transmittance window further comprises electrodes located in contact with the switching material. In one embodiment, the electrodes are disposed on the same surface of a substrate and are in contact with the switching material. In another embodiment, the switching material is sandwiched between a first and second substrate and in contact with the electrodes disposed on each opposing surface of the respective substrates. Leads are connected to the electrodes in order to apply a voltage to the switching material. When an electric voltage is applied to the switching material, the switching material lightens and transmits a greater percentage of incident visible light. Control electronics allow the user to control when a voltage is applied to the filter. For example, the user may push a button to indicate to the control electronics to apply a voltage to the electrodes in order to lighten the switching material. The power control electronics can also include a voltage converter to convert the DC voltage available on board a vehicle to a DC voltage suitable for use in lightening the switching material. In this manner, the variable transmittance windows of the present invention can automatically switch to a darker state when exposed to UV light and can be switched to a lighter state through application of an electric voltage when desired.

Figure 8:
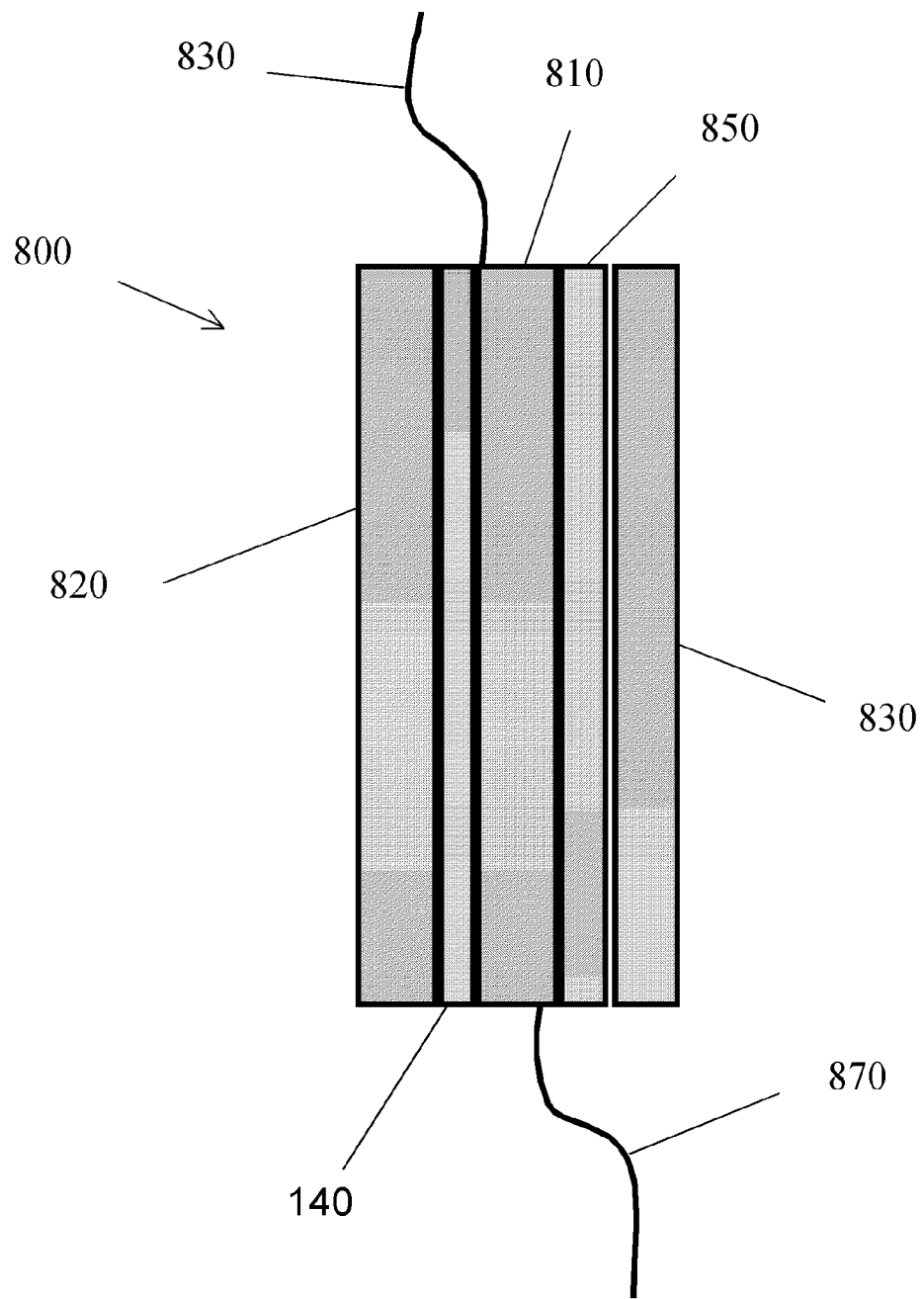
FIG. 8 is a cross-sectional schematic view of a variable transmittance window according to an embodiment of the present invention.

FIG. 8 illustrates one embodiment of a variable transmittance window of the present invention. As described, the optical filter of the invention 810 can be made using a flexible substrate material and function as a film which can be laminated between transparent window substrate 820 and transparent window substrate 830 with adhesive 840 and adhesive 850 respectively. Transparent window substrate 820 can be a sheet of float glass. In one embodiment, the transparent window substrate is 3 mm thick clear float glass (for example, available from PPG Industries of Pittsburgh, Pa.). Other materials such as polycarbonate and other transparent polymer materials can also be used for transparent window substrate 820. Transparent window substrate 830 can be the same material or could be a different material from transparent window substrate 820. The optical filter 810 can be laminated between transparent window substrate 820 and transparent window substrate 830 using adhesive layer 840 and adhesive layer 850 respectively. An example of an optically clear transparent adhesive can be found in part number 8172 from 3M of St. Paul Minn. Other adhesives can also be used, and not using any adhesive is also possible. Electrical leads 860 and 870 are connected to the electrodes in the optical filter. The electrodes are in contact with the switching material and when a voltage is applied to the electrodes the switching material lightens from the darkened state.

In another embodiment, the window is manufactured comprising transparent conductive coatings applied directly to the inside of the transparent window substrates 820 and 830. As discussed above, the transparent conductive coating can be ITO or some other transparent conductive coating. Switching material is sandwiched directly between the transparent conductive coatings and the electrical leads 860 and 870 are attached to the transparent conductive coatings on transparent window substrate 820 and transparent window substrate 830, respectively. The switching material can be applied as a liquid to the ITO-coated transparent window substrate or the switching material can undergo curing to form a high viscosity gel. In one embodiment, the switching material comprises a photo-initiator such as DUROCUR (CIBA Specialty Chemicals of Basel Switzerland) and is cured using UV light to form a semi-liquid high viscosity gel or solid that is adhered to both transparent window substrates. Other compounds and methods of curing to form a high viscosity liquid or a gel may also be possible.

Figure 9:
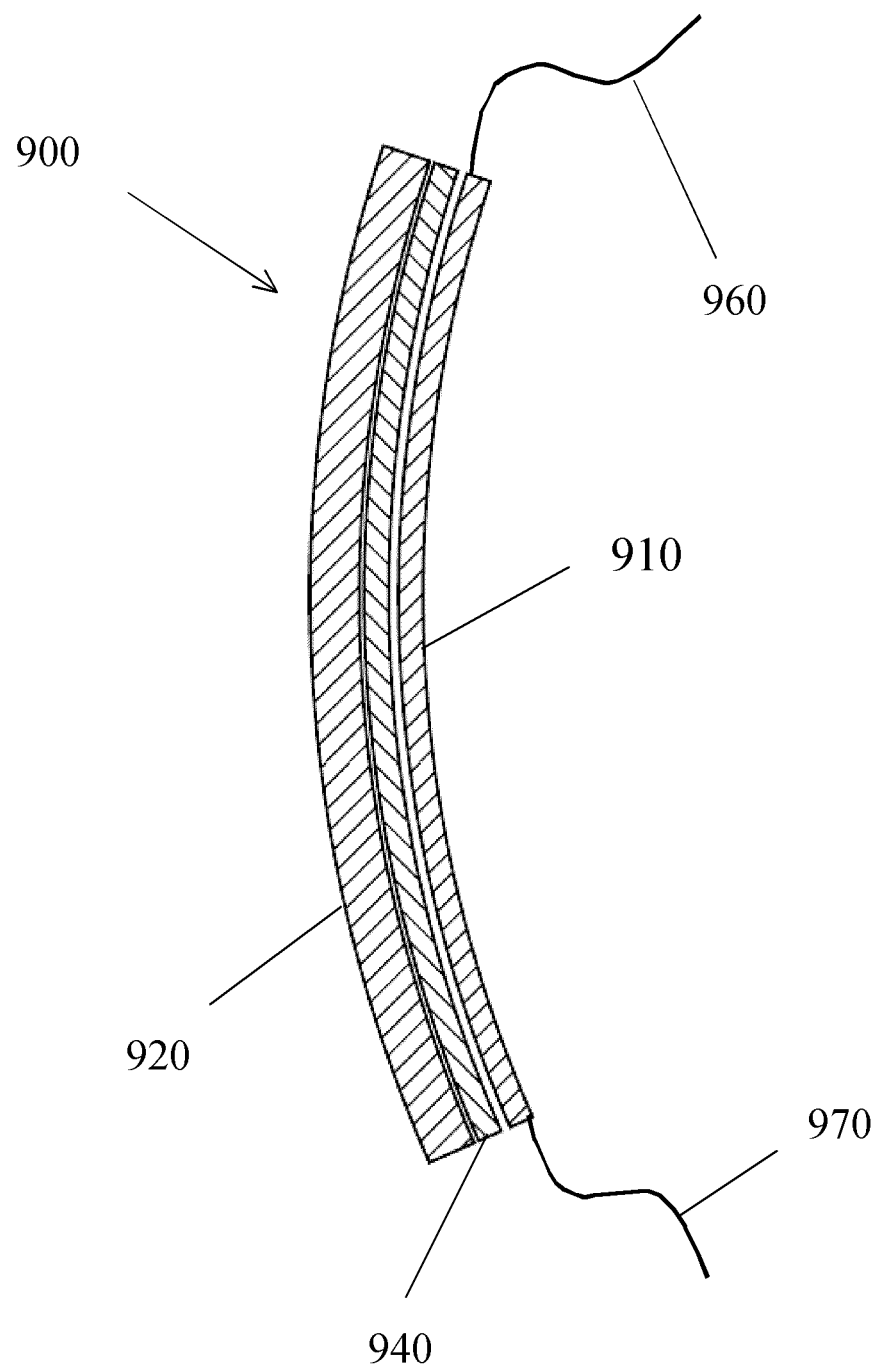
FIG. 9 is a cross-sectional schematic view of a curved variable transmittance window according to an embodiment of the present invention.

The optical filter of the present invention can also be incorporated into non-planar window systems as illustrated in one embodiment in FIG. 9. A flexible optical filter 910 of the invention is attached to a non-planar transparent substrate 920 with adhesive 940. Electrical leads 940 and 960 are attached to electrodes in the optical filter 910. The non-planar transparent substrate 920 can be a curved sheet of transparent material such as glass or other transparent materials such as polycarbonate or other polymers. In one embodiment, the optical filter 910 is incorporated into the window system by laminating the optical filter of the invention to one transparent substrate. In another embodiment, the optical filter 910 of the invention is incorporated into the window system by laminating the optical filter of the invention between two curved transparent substrates.

1.1 Architectural Smart Window

Smart windows have a dynamic glazing that can darken and lighten according to an external stimulus integrated into the design. Instead of being fixed, the visible light transmittance of the smart window is variable. In this way, smart windows can achieve reduced glare and solar heat gain to improve both occupant comfort as well as the energy efficiency of the building.

Optical filters of the present invention can be incorporated into a variety of architectural window systems to achieve smart window functionality. For example, a window can be manufactured comprising the switching material and control circuit of the present invention. In alternative embodiments, an optical filter of the invention can be laminated between two sheets of glass and used as a single pane window. Further embodiments include incorporating the optical filter of the invention into an Insulated Glass Unit (IGU) or into a privacy or curtain wall. Optical filters of the invention can be incorporated in flat or curved window systems.

Optical filters of the present invention can also be incorporated into insulating glass units (IGU). IGUs are made from two sheets of glass sealed together around the outside by a perimeter spacer and seal. The sealed gap between the two sheets of glass can be filled with air, evacuated, or it can be filled with an inert gas such as argon to reduce the rate of transfer of heat from one side of the window to the other. A variable transmittance insulating glass unit of the present invention comprises at least two sheets of glass or some other transparent material along with one or more sealed gaps in order to slow down the conduction of heat from one side of the IGU to the other. The variable transmittance insulating glass unit further comprises an optical filter of the invention comprising a switching material that darkens when exposed to UV light and lightens when an electrical voltage is applied. In one embodiment, the optical filter of the invention is laminated to one of the sheets of glass on the inside or the outside pane of the IGU. In another embodiment, the optical filter of the invention is laminated next to the sealed gap. In a further embodiment, the optical filter of the invention is laminated on the surface of the glass sheet that is not in contact with the sealed gap. In a further embodiment, the optical filter of the invention is laminated between two sheets of glass that form one pane of the IGU. In another embodiment, the optical filter of the invention is suspended in the sealed gap between two sheets of glass. A variable transmittance insulating glass unit of the invention can also comprise more than two sheets of glass and more than one sealed gap. In one embodiment, a triple-paned variable transmittance IGU comprises three sheets of glass with two perimeter seals defining two sealed gaps wherein the optical filter of the invention is laminated to one of the sheets of glass to provide the variable transmittance functionality. At least one electrical lead is connected to at least one electrode in contact with the switching material of the optical filter. When an electrical voltage is applied to the electrode or electrodes, the switching material lightens until it reaches its light state.

Figure 10:
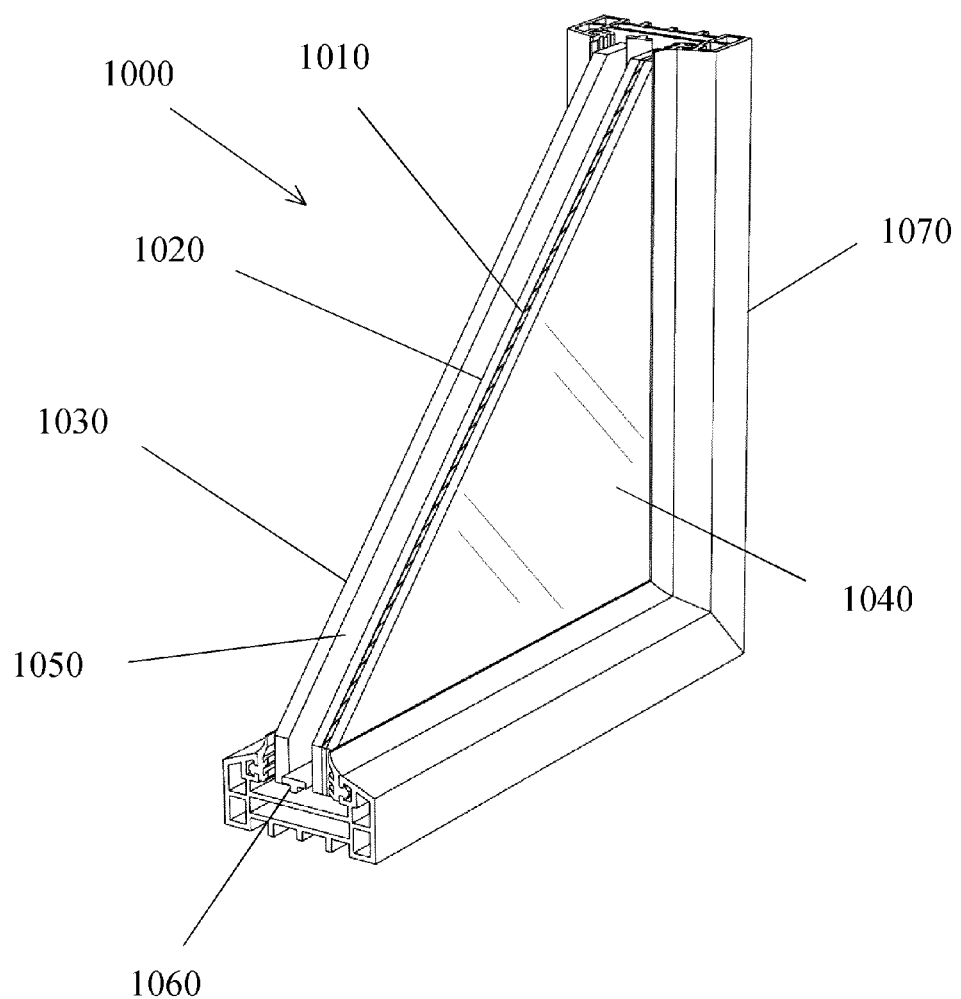
FIG. 10 is a general cut-away view of a variable transmittance window according to an embodiment of the present invention.

FIG. 10 illustrates one embodiment of a variable transmittance IGU of the present invention. An insulated glass unit 1000 comprises an optical filter of the invention 1010 laminated onto a sheet of glass 1020. A second sheet of glass 1030 is attached to glass 1020 via a perimeter seal 1060. Perimeter spacer and seal 1060 defines a sealed space 1050 between glass sheet 1020 and glass sheet 1030. Sealed space 1050 can be filled with air, argon, or some other gas, or it may be a vacuum. A third sheet of glass 1040 is laminated to the other side of optical filter 1010 forming a sandwich structure with optical filter 1010 in the middle. A frame 1070 is located around the perimeter of insulated glass unit 1000 and facilitates installation of the variable transmittance window into a building. Sheet of glass 1020 and sheet of glass 1030 can comprise coatings applied to their surfaces. Examples of such coatings include anti-glare coatings, anti-reflective coatings, IR-reflective coatings, low-emissivity coatings, and also films for partially blocking UV. Low-emissivity coatings serve to reduce emission of heat from the inside surface of a sheet of glass to the other sheet of glass through the sealed gap.

Figure 11:
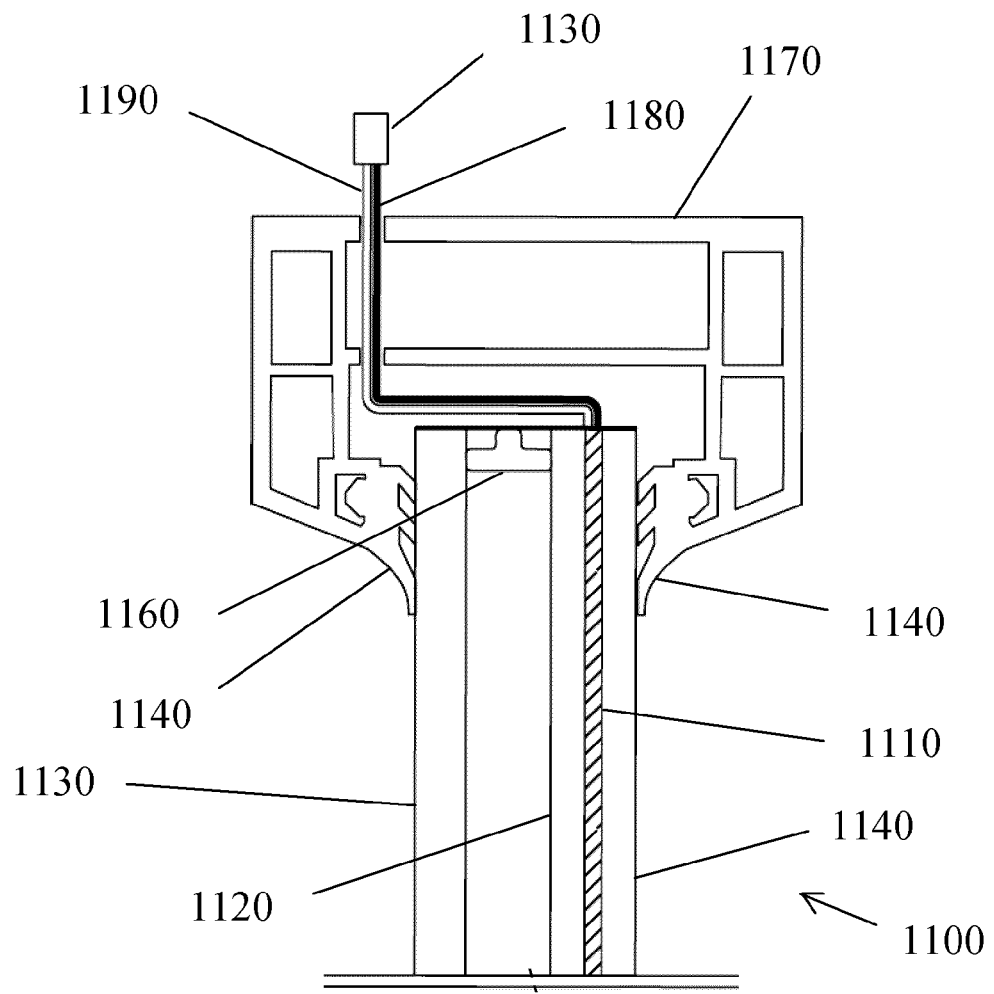
FIG. 11 is a cross-sectional schematic view of a variable transmittance window according to an embodiment of the present invention.

FIG. 11 illustrates another embodiment of a variable transmittance IGU of the present invention. Insulated glass unit 1100 is shown mounted in a frame 1170. Insulated glass unit comprises an optical filter of the invention 1110 laminated onto glass sheet 1120. A perimeter spacer and seal 1160 defines a sealed space between glass sheet 1120 and glass sheet 1130. Another sheet of glass 1140 is laminated on the other side of optical filter 1110. Other transparent materials such as polycarbonate or other transparent polymers may be used in place of the glass sheets. Optical filter 1110 comprises two electrodes for applying a voltage across a switching material. Wire 1180 is connected to one of the electrodes and wire 1190 is connected to the other electrode. An electrical connector 1130 facilitates connection to a control box and voltage source (not shown). Seals 1140 can be used to hold insulating glass unit 1100 in frame 1170. When insulating glass unit 1100 is exposed to UV light, optical filter 310 darkens automatically and the percent transmittance of insulating glass unit 300 in the visible light spectrum is reduced until it reaches its dark state. This can help to reduce solar heat gain on a bright day. When a voltage is applied to the switching material through wire 1180 and wire 1190, the optical filter will lighten and the percent transmittance of insulating glass unit 1100 in the visible light spectrum is increased until it reaches its light state.

Figure 12:
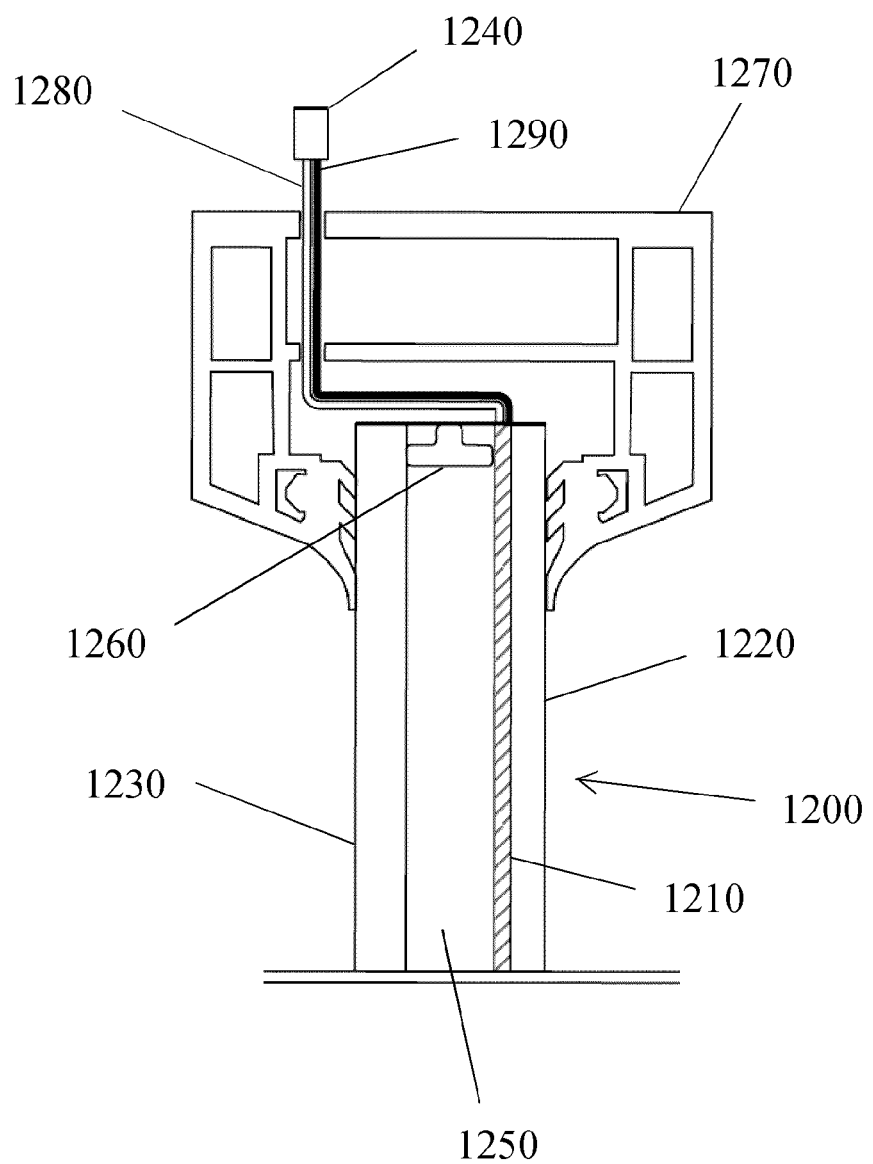
FIG. 12 is a cross-sectional schematic view of a variable transmittance window according to an embodiment of the present invention.

FIG. 12 illustrates a further embodiment of a variable transmittance IGU of the present invention. In this embodiment, insulating glass unit 1200 comprises glass sheet 1220 and glass sheet 1230. Optical filter of the invention 1210 is laminated onto the inside of glass sheet 1220 in contact with sealed gap 1250. Packer and seal 1260 spaces glass sheet 1220 and glass sheet 1230 apart and provide the seal to create sealed gap 1250. Insulating glass unit 1200 can be mounted in frame 1270. Wire 1280 and wire 1290 are connected to electrodes in contact with the optical filter as described above.

Figure 13:
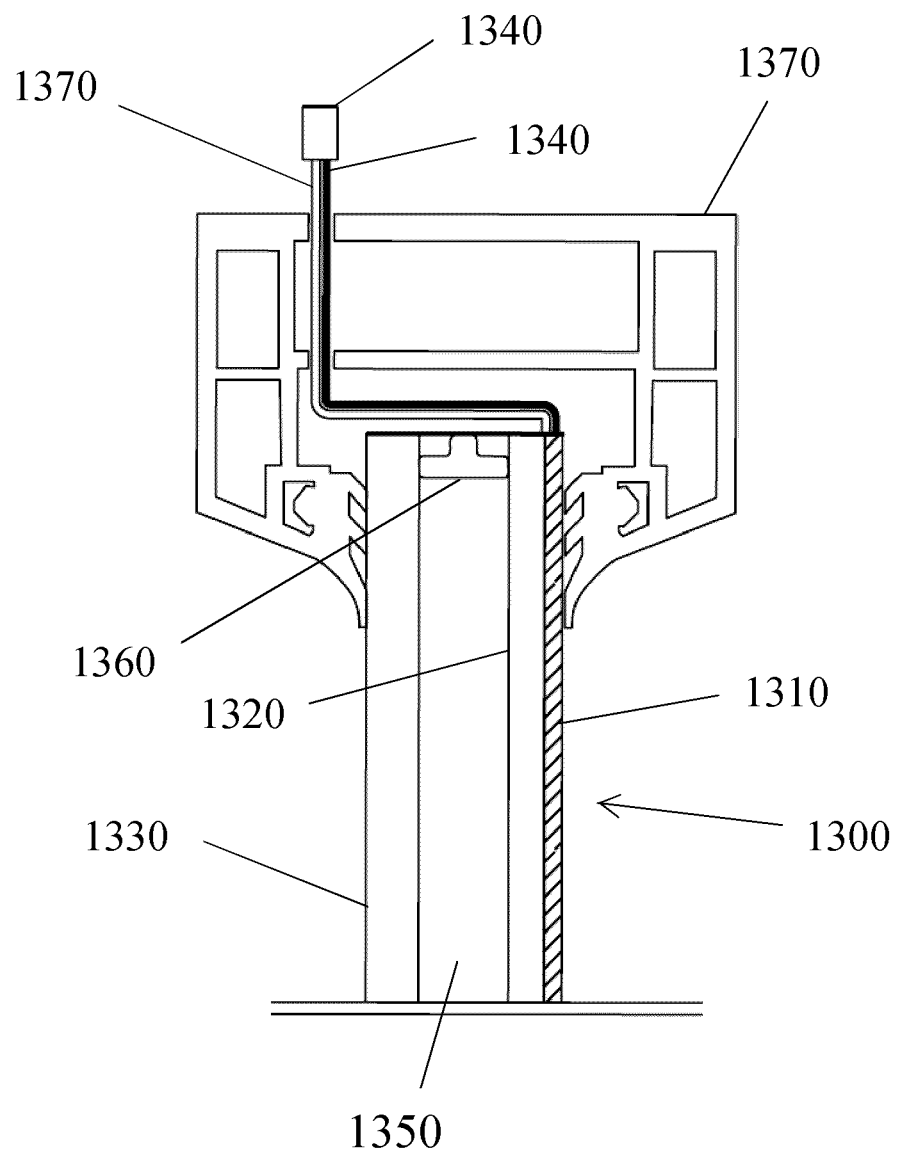
FIG. 13 is a cross-sectional schematic view of a variable transmittance window according to an embodiment of the present invention.

FIG. 13 illustrates another embodiment of a variable transmittance IGU of the present invention. In this embodiment, insulating glass unit 1300 comprises glass sheet 1320 and glass sheet 1330. Optical filter of the invention 1310 is laminated onto the outside of glass sheet 1320 and is not in contact with sealed gap 1350. Spacer and seal 1360 provides the seal to create sealed gap 1350. Insulating glass unit 1300 can be mounted in frame 1370. Wire 1380 and wire 1390 are connected to electrodes in contact with the optical filter as described above.

Figure 14:
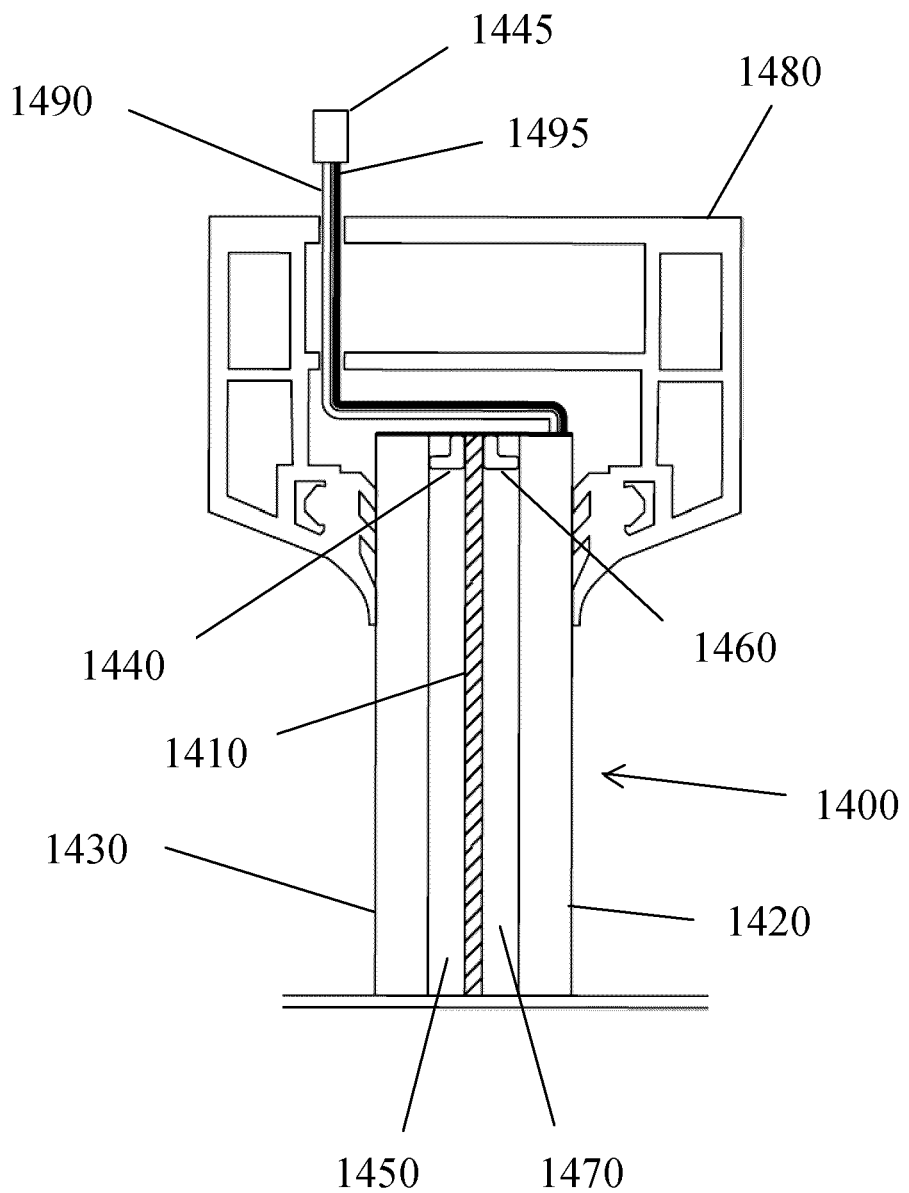
FIG. 14 is a cross-sectional schematic view of a variable transmittance window according to an embodiment of the present invention.

FIG. 14 illustrates another embodiment of a variable transmittance IGU of the present invention. In this embodiment, insulating glass unit 1400 comprises glass sheet 1420 and glass sheet 1430. Optical filter of the invention 1410 is suspended between glass sheet 1420 and glass sheet 1430. Perimeter spacer and seal 1440 creates a sealed space 1450 between glass sheet 1430 and optical filter 1410. Perimeter spacer and seal 1460 creates a sealed space 1470 between glass sheet 1420 and optical filter 1410. The embodiment shown in FIG. 14 has two separate sealed spaces 1470 and 1450 on either side of optical filter 1410, rather than just one sealed space as with most double-paned IGUs. Sealed space 1495 and sealed space 1450 can reduce the conduction of heat through insulating glass unit 1400 and thereby improve the insulating capacity of the variable transmittance window. Insulating glass unit 700 can be mounted in frame 1480. Wire 1490 and wire 1495 are connected to electrodes in contact with the optical filter as described above. A connector 1445 allows for connection to an external control circuit and power source.

Figure 15:
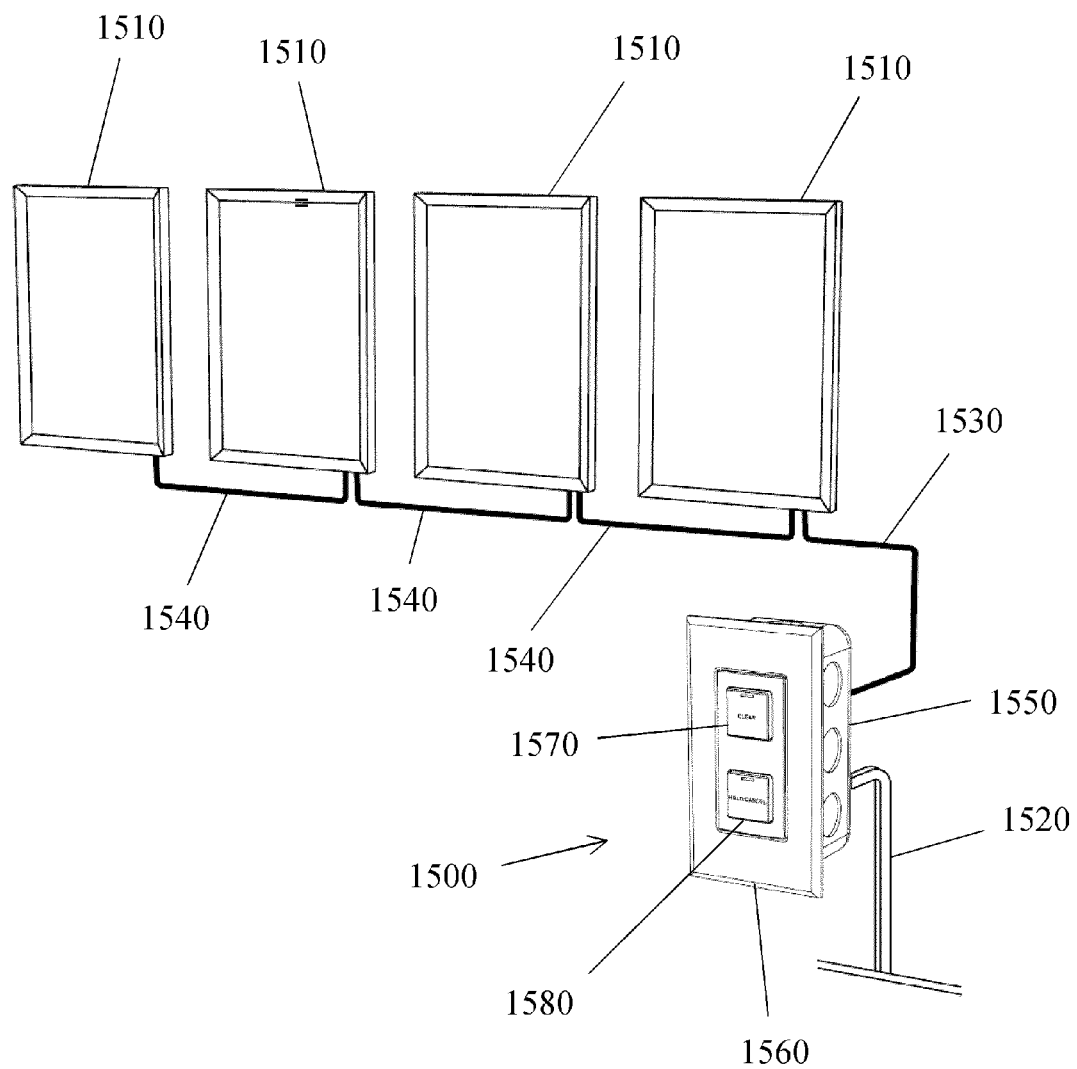
FIG. 15 is a general view of a control box connected to multiple variable transmittance windows according to an embodiment of the present invention.

To control the operation of the variable transmittance windows of the present invention, the window is connected to a control circuit as described. A single variable transmittance window can be connected to one control circuit, or multiple variable transmittance windows can be connected to a single control circuit. FIG. 15 illustrates one configuration of a power control unit connected to multiple variable transmittance windows in accordance with an embodiment of the present invention. Power control electronics 1500 are connected to multiple variable transmittance windows through wire 1530. AC power is supplied from regular house power through wire 1520. The AC power can be the standard 120 Volt 60 Hz electricity found in North America. In Europe or other places the AC power could be in the form of 220 Volts AC. Other voltages and frequencies are possible. Power control electronics 1500 are mounted in an electrical box 1550. Electrical box 1550 can be a standard electrical box found in most residential and commercial installations. In one embodiment, electrical box 1550 can be mounted in the wall of a house. Cover plate 1560 is used to cover up electrical box 1550. Electrical wire 1520 can run through the walls. In another embodiment, control electronics 1500 is mounted in a box designed to be located outside of a wall. The power could be supplied from a standard power cord plugged into a standard pronged power outlet. Variable transmittance windows 1510 are connected together in parallel with wires 1540. Alternatively, variable transmittance windows 1510 can each have their own wire running back to control box 1550. In this embodiment, button 1570 and button 1580 allow the user to control the variable transmittance windows. Button 1570 is pushed when the user wants to lighten the variable transmittance window. In one embodiment, button 1570 is labelled "CLEAR". When button 1570 is pushed, power control electronics 1500 will apply a voltage to variable transmittance windows 1510 for a fixed period of time in order to lighten them. In one embodiment, a voltage is applied for about 10 seconds to about 5 minutes to fade variable transmittance windows 1510. After the voltage is applied, variable transmittance windows 1510 will stay in the light state if they are not being exposed to UV light. However, if variable transmittance windows 1510 are being exposed to UV light they will begin to darken again automatically as soon as the power control electronics 1500 opens the switch and is no longer applying a voltage to variable transmittance windows 1510. Button 1580 can be used if the user desires that variable transmittance windows 1510 stay in the light state even in the presence of UV light. In one embodiment, button 1580 is labelled "HOLD/CANCEL". Pressing button 1580 will cause control electronics to apply a voltage to variable transmittance windows 1510 and maintain that voltage over a longer period of time. In one embodiment, power control electronics 1500 maintain voltage on variable transmittance windows for eight hours. In a further embodiment, power control electronics 1500 are designed such that pressing button 1580 while a voltage is being applied serves to open the circuit and stop applying a voltage to variable transmittance windows 1510. Light emitting diodes or other indicator lights can be used in button 1570 and button 1580 to indicate to the user when voltage is being applied to variable transmittance windows 1510. Other control schemes can be used to provide input for power control electronics 1500, and different types and numbers of switches and buttons can also be used. In a further embodiment, button 1570 and button 1580 are replaced with a three position knob.

Figure 17:
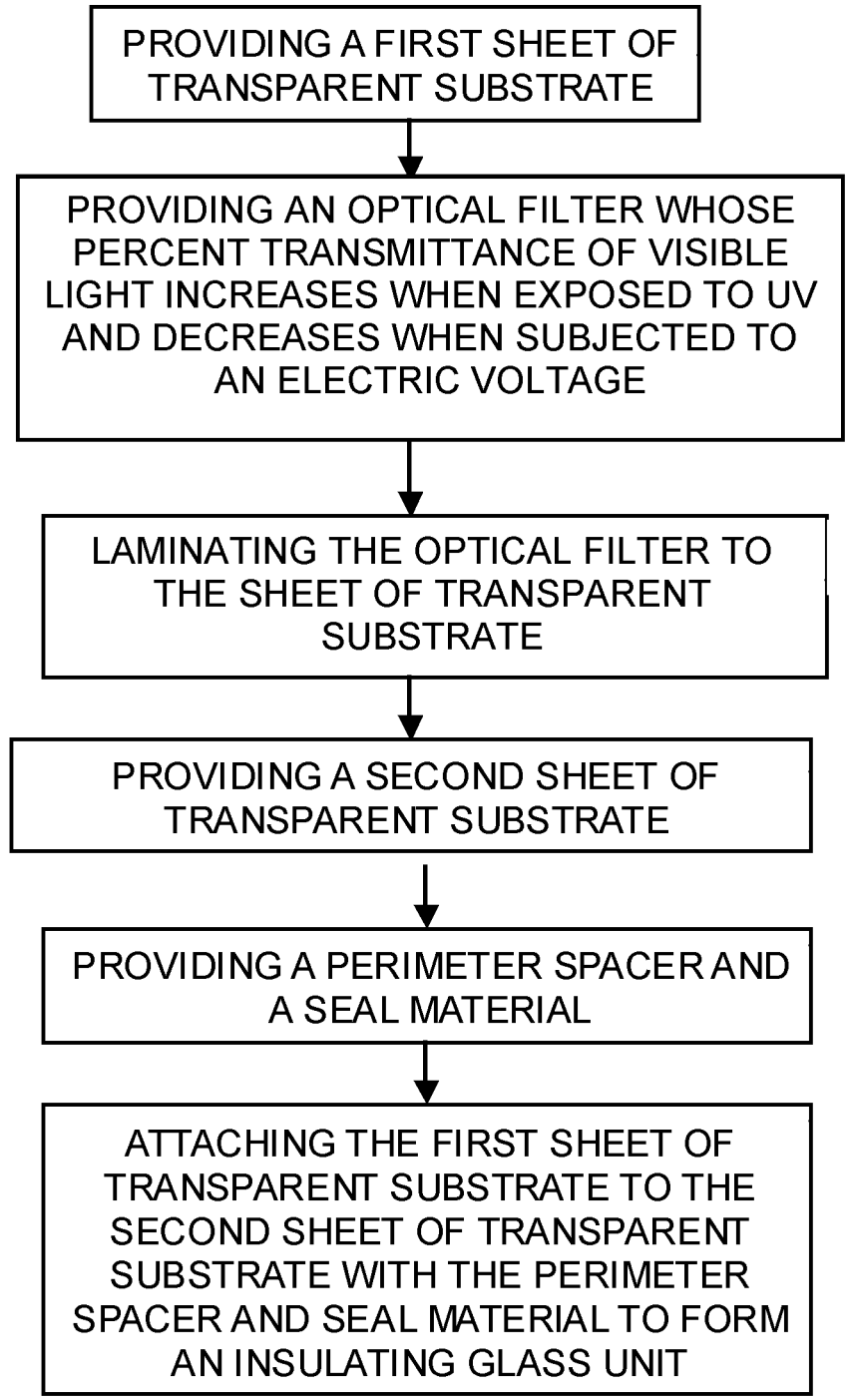
FIG. 17 is a flow chart showing steps for fabricating a variable transmittance window according to an embodiment of the present invention.

FIG. 17 illustrates one embodiment of a process for manufacturing a variable transmittance IGU of the present invention. The process comprises providing a first sheet of glass, or other form of transparent window substrate such as polycarbonate. An optical filter according to the present invention is provided and laminated onto the first sheet of window transparent substrate. A second sheet of transparent window substrate is then attached to the first sheet of transparent window substrate with a perimeter spacer and seal material to form the insulated glass unit. The sealed space can be filled with a gas such as argon or some other gas. In some embodiments, the process further comprises applying coatings to one or more of the transparent window substrates. These coatings could for example be low-emission coatings for reducing the radiation of heat from one transparent substrate to the other transparent window substrate through the sealed space.

1.2 Variable Tint Window for Vehicles

Tinted windows or tinted window films are commonly used in vehicle applications such as sunroofs and the side windows of cars, buses, trains, planes, boats, ferries and other vehicles. Tinted windows reduce heating in a vehicle on a sunny day, which can be a significant problem particularly in warm climates. Tinted windows can also increase occupant comfort, particularly on bright days when direct sunlight can cause glare, and provide added privacy.

Optical filters of the present invention can be incorporated in window systems to provide variable tint functionality. Such functionality is particularly desirable in vehicle window applications. The variable tint window can be used in a variety of vehicle applications. For example, it can be used for sunroofs, side windows, and rear windows in cars. It can be used for the passenger windows in buses and trains, and it can also be used for the windows in airplanes and boats. Variable tint windows of the present invention can be manufactured comprising the auto-darkening material and control circuit of the present invention. In alternative embodiments, an optical filter of the invention can be laminated between two sheets of glass or it can be attached to one side of a sheet of glass. Additionally, the variable tint window can be flat or it can also be used for curved windows.

Figure 18A:
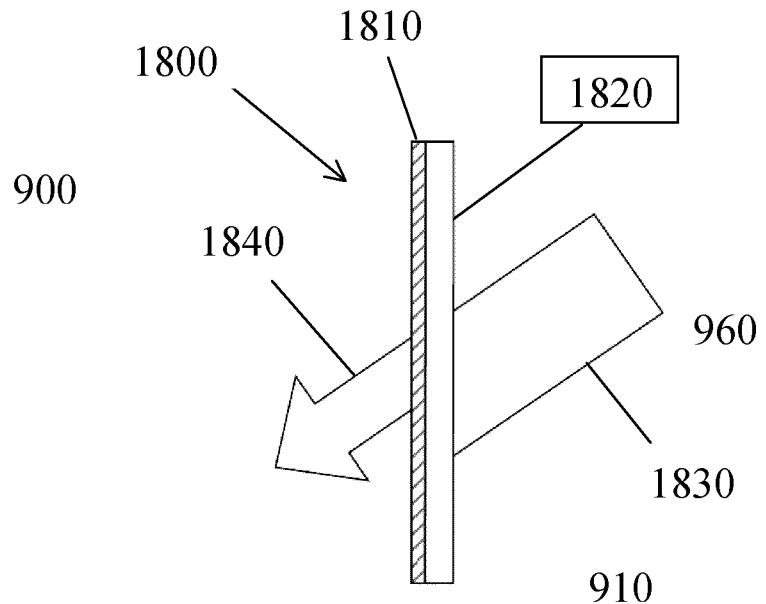
FIG. 18A is a diagrammatic view showing the transmission of light through a variable tint window in its dark state, according to an embodiment of the present invention.
Figure 18B:
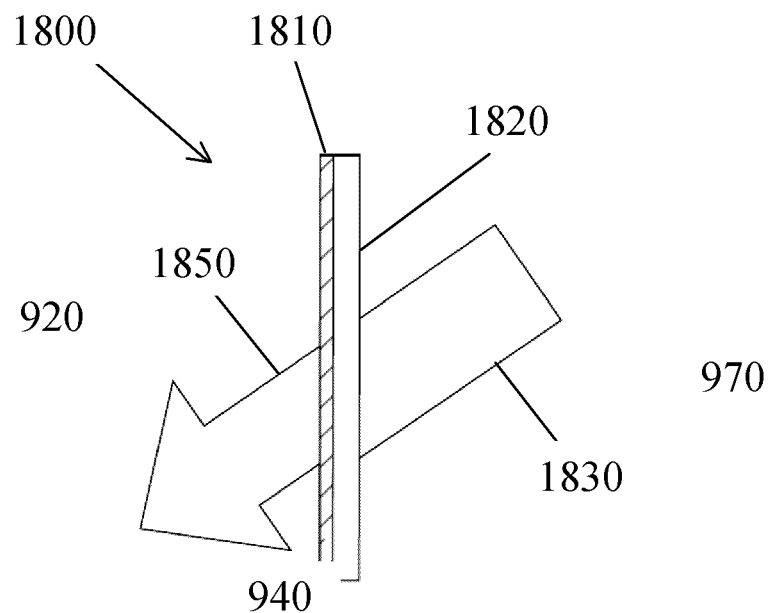
FIG. 18B is a diagrammatic view showing the transmission of light through a variable tint window in its light state, according to an embodiment of the present invention.

FIGS. 18A and 18B illustrate the transmission of light through a variable tint window in two different tint states, according to an embodiment of the present invention. FIG. 18A shows a variable tint window 1800 in a darker tint state. The variable tint window comprises an optical filter of the invention 1810 laminated onto a sheet of glass 1820. This could be for example a side window in an automobile. In another embodiment, the variable tint window 1800 includes a laminate such as an adhesive resin and a second sheet of glass to prevent shattering and improve safety. Incident light 1830 from the sun includes visible light in the range from 400 to 750 nm. The variable tint window in its tinted state will absorb or reflect a significant portion of the visible light. Only a percentage of the visible light will be transmitted through the variable tint window in the form of transmitted light 1840. In one embodiment, the variable tint window transmits about 5% to 30% of the light in its dark tint state. On a bright day, this would provide the vehicle occupants with reduced glare, increased privacy, and reduced solar heat gain inside the vehicle. Other dark tint levels are possible and different tint levels can be achieved by making the optical filter thinner or thicker, or by changing the switching material used. Different colours can also be achieved with different switching materials that absorb different wavelengths of visible light.

FIG. 18B shows variable tint window 1800 in a lighter tint or clear state. On a dark day, the tint on variable tint window 1800 can be lightened or removed by application of an electric charge to the variable tint window. Specifically, application of an electric charge would cause the switching material in optical filter 1810 to change its light absorption properties by going into a different state. In FIG. 18B, transmitted light 1850 now comprises a higher percentage of incident light 1830 than in the dark tint state, as shown in FIG. 18A. The lighter tint affords the vehicle occupants a better view of the outside and increases safety in low light or night time conditions. In its clear or lighter-tint state, in accordance with one embodiment of the invention, variable tint window 1800 transmits about 45% to 90% of incident light 1830. Transparent window substrate 1820 will absorb a small percentage of incident light 1830 and optical filter 1810 will also absorb a small percentage of incident light even in its clear state so the highest percent visible light transmission possible even in the light tint state will be less than 100% transmission. Intermediate tint levels can also be achieved by controlling the duration of time the voltage is applied to variable tint window 1800 when going from the dark tint state to the light tint state, or by using a sensor and electronic controls.

Variable tint window can also be designed to block electromagnetic radiation in the ultra-violet (UV) range or to absorb or reflect infra-red (IR) radiation by incorporating certain compounds in the switching material, or by addition of coatings or other materials to the variable tint window. Examples of such coatings include anti-glare coatings, anti-reflective coatings, IR-reflective coatings, and also films for partially blocking UV light. Other coatings are also contemplated. The transparent electrodes used for the optical filter also contribute to IR reflection. About 50% of the energy from the solar spectrum is in the form of IR and about 50% is in the form of visible light. Blocking IR light can help to reduce the solar heat gain inside the vehicle. However, the best solar heat gain reductions can be achieved by preventing the transmission of both visible and IR light into the vehicle. In one embodiment, the variable tint window of the invention allows maximum solar heat gain reductions on bright days while still providing good visibility outside on low light days and at night. This allows for darker tints to be used than with tinted windows that are not variable, further improving solar heat gain reduction on bright days.

Figure 19:
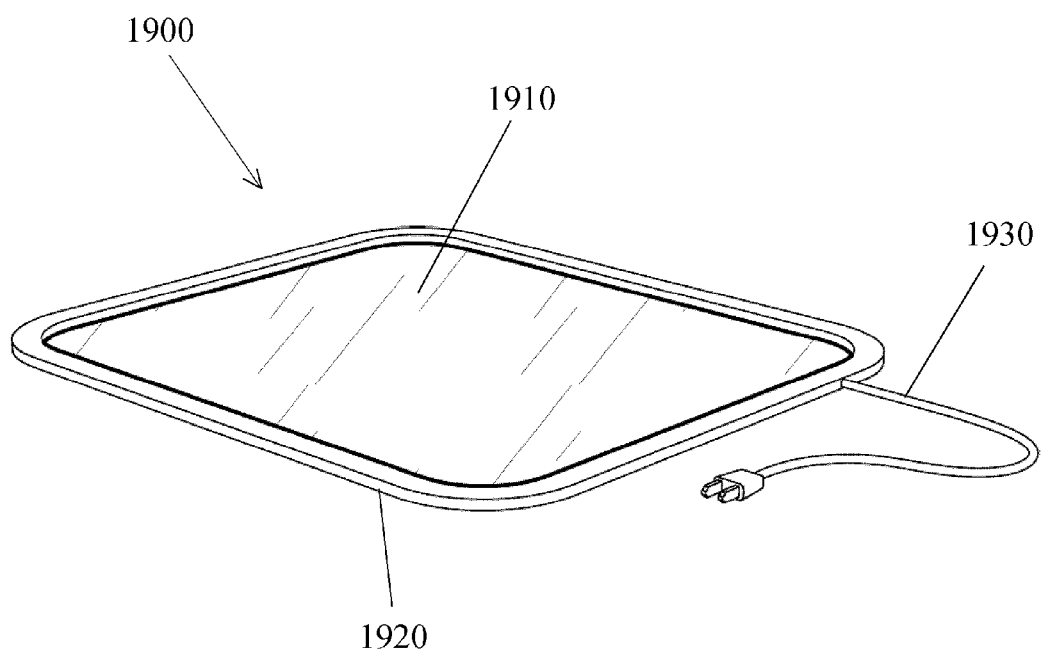
FIG. 19 is a general view of a variable tint window for vehicles according to an embodiment of the present invention.

FIG. 19 illustrates application of the variable tint window of the invention in a vehicle, according to an embodiment of the present invention. Variable tint window 1900 is designed for mounting in the roof of a car to provide a sunroof or a moonroof with variable tinting. An optical filter of the invention 1910 is laminated onto a curved transparent substrate. In the presence of sunlight variable tint window 1900 will darken automatically. An electrical connection 1930 is connected through control electronics to the DC voltage supplied by the vehicle battery and alternator. Control electronics can comprise a button or switch for connecting and disconnecting the voltage to variable tint window 1900. Control electronics can also include a DC-DC converter or regulator for converting the 12 Volts DC typically available in a car to an appropriate voltage for the switching material. When a driver or a passenger in the vehicle pushes a button or activates a switch, power control electronics applies a DC voltage through electrical connection 1930 to the switching material in optical filter 1910 in order to cause the variable tint window to go to a lighter tint or clear state. A sunroof with variable tinting can provide a significant benefit in reducing solar heat gain inside the car and preventing the inside of the car from being too bright on sunny days. Variable tint window 1900 can eliminate the need for an opaque blind commonly used to block off the sunroof on bright days. In one embodiment, the variable tint window of the invention provides for reduced light transmission on bright days while still allowing vehicle occupants to see out, something they would not be able to do if the sunroof was covered with an opaque blind. This can be especially important with the new panoramic sunroofs on automobiles that cover a significant portion of the vehicle's roof.

Figure 20:
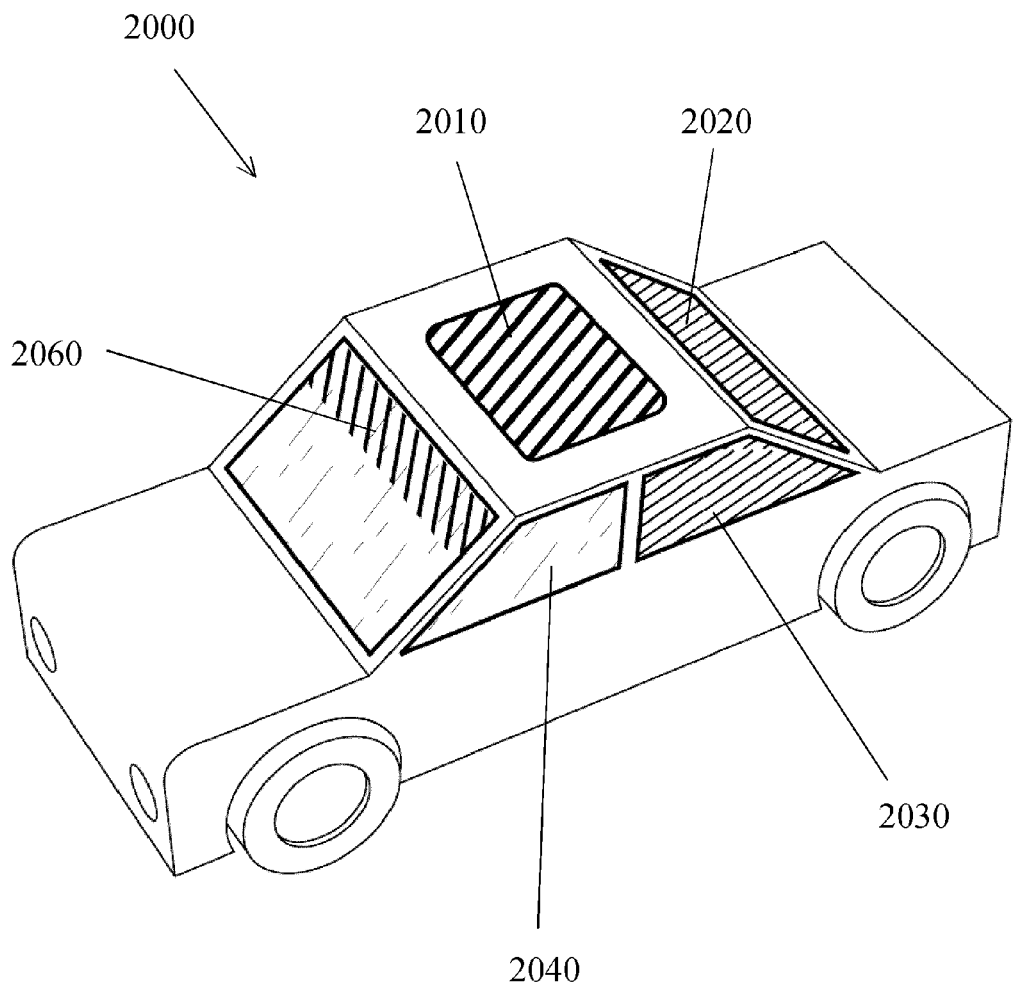
FIG. 20 is a general view of multiple variable tint windows in an automobile according to an embodiment of the present invention.

FIG. 20 shows a general view of an automobile with variable tint windows, according to an embodiment of the present invention. Vehicle 2000 comprises a sunroof 2010, a rear window 2020, a rear side window 2030, and a front side window 2040. Sunroof 2010 can comprise a variable tint window that has a tint range that is fairly dark, even in the lighter tint state. Maintaining a fairly dark tint even in the light state can be beneficial for maintaining low solar heat gain inside the vehicle. This can be particularly important in hot climates, and can also help to increase the energy efficiency of the vehicle by reducing the need for air-conditioning use. In one embodiment, sunroof 2010 has a variable tint range that allows a percent visible light transmittance of about 10% in the dark tint state, and about 30% in the light tint state. This provides a contrast ratio of about 3:1 (percent visible light transmittance in the light state divided by the percent visible light transmittance in the dark state).

Rear window 2020 and rear side window 2030 can comprise variable tint windows with the same tint range as sunroof 2010 or with a different tint range. In one embodiment, rear window 2020 and rear side window 2030 have different variable tint ranges that allow a percent visible light transmittance of about 15% in the dark tint state, and about 60% in the light tint state, providing a contrast ratio of 4:1. This higher contrast ratio provides increased visibility, particularly in the light tint state. This may be desirable to provide vehicle passengers with a better view outside. Solar heat gain through rear window 2020 and side window 2030 is not as critical as in sunroof 2010 because they are not as directly in the path of an overhead sun as is sunroof 2010. Front side window 2040 comprises a variable tint window with even higher visible light transmittance in both the dark tint state and the light tint state to provide even better visibility for the driver of the vehicle. In one embodiment, front side window has a visible light transmittance of 20% in the dark state and 80% in the light state. In some jurisdictions, laws prescribe a minimum percent visible light transmittance for windshields of vehicles. This can preclude the use of a tinted windshield. However, a portion of the windshield can sometimes be tinted, to shield the driver from the direct glare of the sun. In a further embodiment, the top part of the windshield comprises a variable tint window that will tint automatically when driving into the sun or in bright light conditions, and can be cleared by the driver by the application of electricity in low light or night conditions. The variable tint windows as embodied in vehicle 2000 can be controlled as a group through one control, or they can be controlled independently through separate controls.

Figure 21:
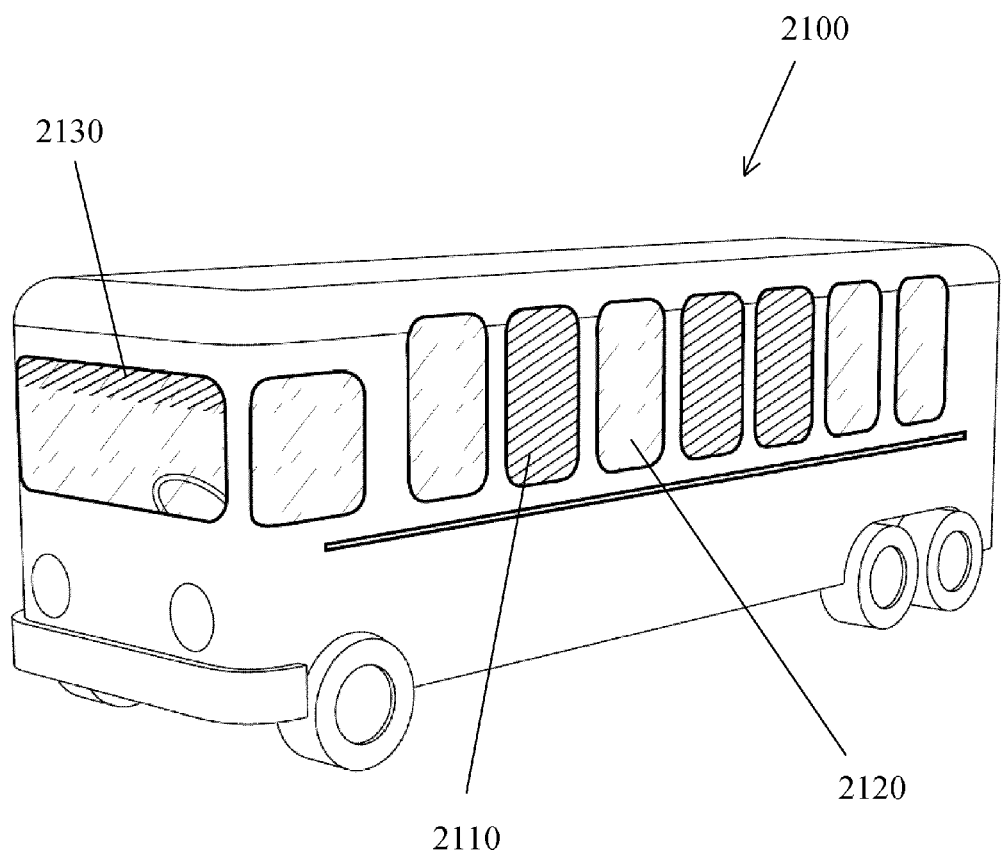
FIG. 21 is a general view of variable tint windows in a bus according to an embodiment of the present invention.

FIG. 21 shows a general view of a passenger bus with variable tint windows, according to an embodiment of the present invention. Passenger bus 2100 comprises side passenger windows that are variable tint windows according to the present invention. The variable tint windows will darken automatically in the presence of UV light or sunlight, and they can be lightened or cleared by the application of electricity. Side passenger windows on bus 2100 can be controlled as a group, or they can be controlled individually by the individual passenger. In one embodiment the windows are controlled separately such that side passenger window 2110 is in the dark tinted state, and side passenger window 2120 is in its light state. In another embodiment, windshield 2140 comprises a variable tint window on a portion of the windshield (e.g., the upper portion) to help shield the driver from direct light, particularly when driving towards the sun, while still maintaining full visibility ahead.

Figure 22:
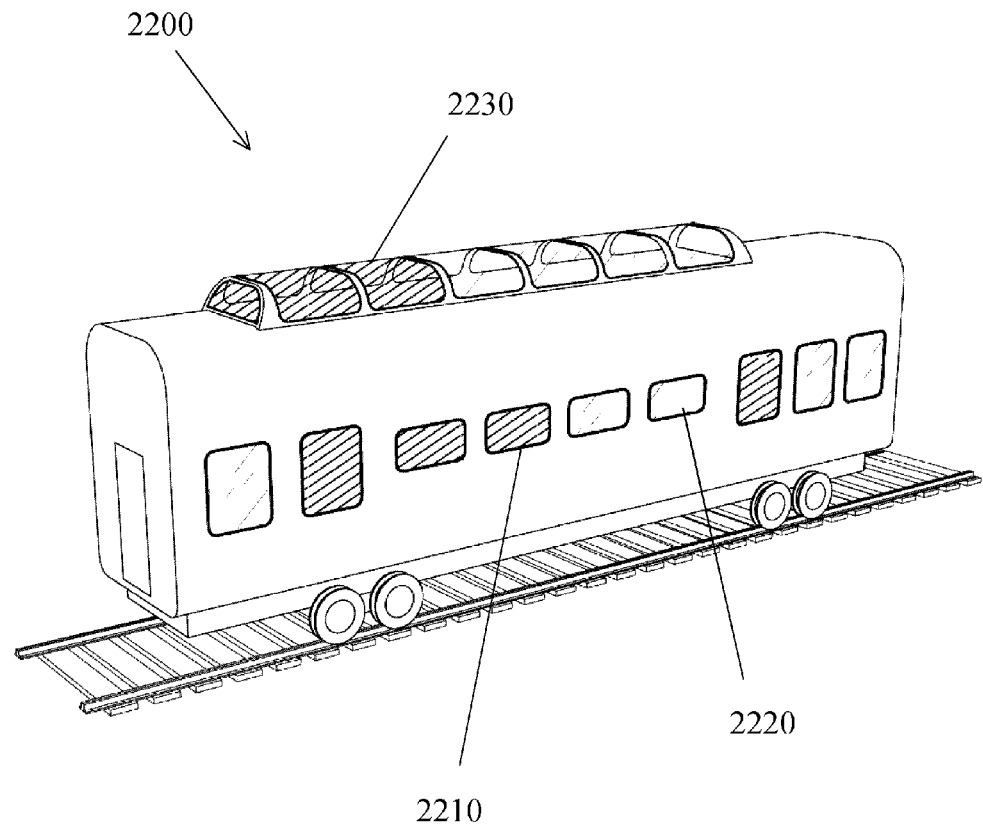
FIG. 22 is a general view of variable tint windows in a train according to an embodiment of the present invention.

FIG. 22 shows a general view of a train with variable tint windows, according to an embodiment of the present invention. The variable tint windows on train 2200 can be controlled as a group, or they can be controlled individually by each passenger. In one embodiment, variable tint windows are controlled separately and allow window 2210 to be in the dark tinted state, and variable tint window 2220 to be in its light state. Train 2200 further comprises a car with a dome 2230 for passengers. Dome cars are commonly used on passenger trains, particularly on scenic routes. In one embodiment, dome 2230 comprises a variable tint window that will automatically darken on bright sunny days. This can provide for increased passenger comfort and reduce the solar heat gain inside the dome. Electronic controls can be used to lighten dome 2230 in low light conditions or if enhanced visibility is desired (e.g., in areas of particularly beautiful scenery). In one embodiment, dome 2230 comprises variable tint windows that are curved. In another embodiment, dome 2230 comprises numerous flat windows joined together to form dome 2230.

As discussed, the variable tint window of the invention lightens upon application of an electric voltage to the electrode or electrodes of the optical filter. A control circuit can be used to switch the electrical voltage on or off based on input from a user or some other input, and can also be used to modulate the voltage to the correct level. The power for turning the variable tint window, in a vehicle application, on or off can come from a variety of sources, including an alternator, a battery, and an auxiliary power unit. In one embodiment, the power comes from the 12-Volt battery in an automobile. The power source is connected to the variable tint window through the control circuit. The control circuit comprises a switch that opens and closes the circuit between the power source and the electrodes in the variable tint window. The control circuit can also include a voltage converter to provide an appropriate voltage to cause the variable tint window to go into its light state. A voltage regulator can also be used to regulate the voltage. The control circuit can also comprise circuitry elements for applying electric voltage to the variable tint window for a fixed period of time following the receipt of input from the user. A single variable tint window can be connected to one control circuit, or multiple variable tint windows can be connected to one control circuit.

Figure 23:
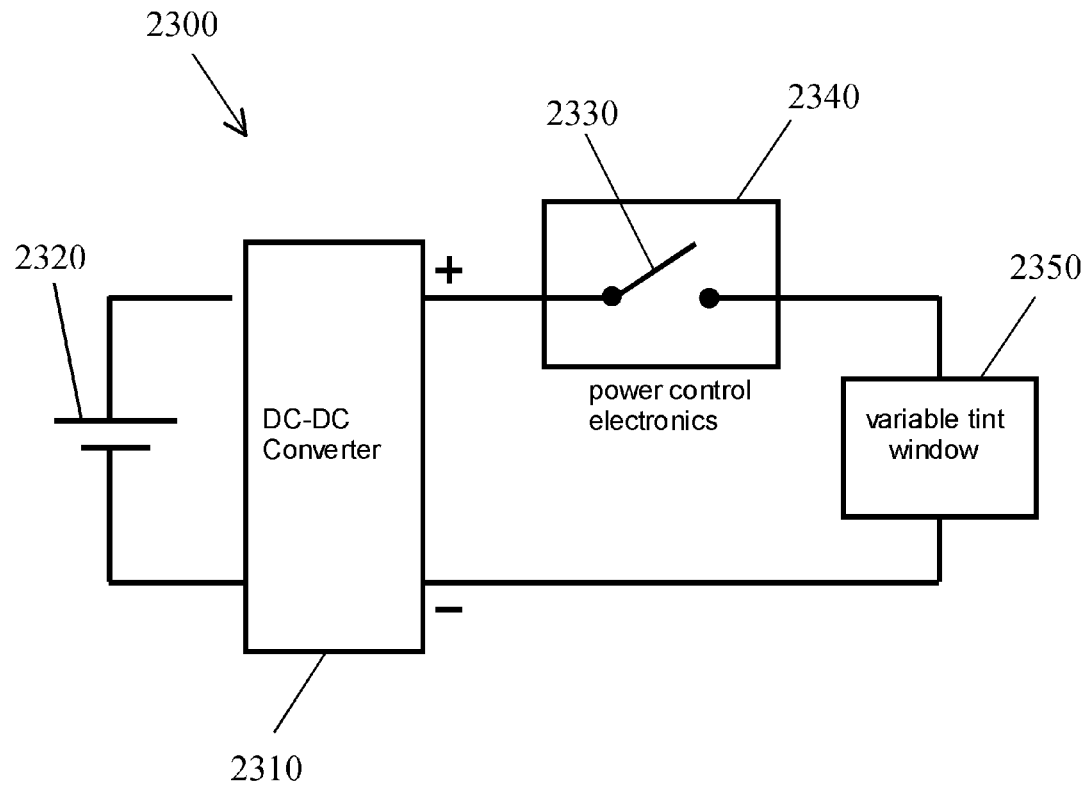
FIG. 23 is a schematic view of a control circuit for a variable tint window according to an embodiment of the present invention.

FIG. 23 illustrates a control circuit 2300 used to control a variable tint window in a vehicle, according to one embodiment of the present invention. Control circuit 2300 can be used to control one or more variable tint windows. Variable tint window 2350 can, for example, be the sunroof of an automobile. A power source 2320 supplies electric power to the circuit. In one embodiment, the power source 2320 is the 12-Volt battery typically found in an automobile. In another embodiment, the power source 2320 is the alternator in an automobile. In a further embodiment, the power source is an auxiliary power unit. In some embodiments, a DC-DC converter 2310 is used to transform the 12 Volts from the power source down to a lower voltage suitable for causing variable tint window 2350 to lighten.

A switch 2330 is used to connect and disconnect the DC voltage from variable tint window 2350. Switch 2330 can be user activated, activated by control electronics 2340 automatically or in response to input from the user, or it can be activated by a sensor such as a light sensor. In one embodiment, power control electronics 2340 may just be a user-activated switch that simply passes the DC voltage output from DC-DC converter 2310 directly into variable tint window 2350. The user-activated switch can be a normally-open push button, or some other type of switch. In another embodiment, the output of the DC-DC converter 2310 is regulated to the voltage required by variable tint window 2350 in order to lighten. In one embodiment, the variable tint window 2350 lightens with the application of about 1.8 volts. In another embodiment, the required voltage ranges from about 1 to about 10 Volts DC. In a further embodiment, the required voltage ranges from about 0.1 to about 42 volts DC.

Power control electronics 2340 can be used to control the voltage being applied to variable tint window 2350 as well as for controlling the duration that the voltage is applied for. In one embodiment, power control electronics 2340 closes switch 2330 in response to user input or input from an electronic device such as a sensor. The user presses a button connected to a normally open momentary switch to provide an input signal to power control electronics 2340. The power control electronics 2340 then closes switch 2330 for a fixed period of time. The fixed period of time can be preset and built into power control electronics 2340 by using a standard timing circuit familiar to those skilled in the art of electronic circuits. In one embodiment, the fixed period of time is preset to be the amount of time required for variable tint window 2350 to lighten.

A light sensor can also be incorporated into power control electronics 2340 to sense when it is bright outside. If it is bright outside and the user presses the button, power control electronics 2340 can maintain a voltage on variable tint window 2350 in order to maintain variable tint window 2350 in its light state. Maintaining a voltage on variable tint window 2350 can serve to over-ride the auto-darkening feature of the variable tint window and keep it in a light state even when it is exposed to UV light. In one embodiment, the user returns variable tint window 2350 to its normal auto-darkening state by pressing the button again, or by pressing a second button. In another embodiment, power control electronics 840 is used to apply a square wave signal to variable tint window 2350 in order to provide for faster lightening times and longer lifetimes. If variable tint window 2350 comprises two electrodes, power control electronics 2340 could also be used to switch the polarities of the electrodes from cycle to cycle. Power control electronics 2340 can also be used to short out the two electrodes between cycles in order to dissipate any built-up charge.

Switch 2330 can also be a multi-state control device such as a potentiostat or a multi-position switch that would allow the user to select various different intermediate values of tint for variable tint window 2350. In one embodiment, the user selects an intermediate state to indicate that an intermediate state, between fully dark tint and fully light tint, is desired. Power control electronics 2340 then applies the voltage to variable tint window 2350 for an appropriate amount of time to achieve this intermediate state. Other methods of causing variable tint window 2350 to reach an intermediate state, such as applying a reduced amount of voltage, may also be possible.

Power control electronics 2340 can also include a current sensor that can sense when the lightening process is completed in variable tint window 2350. In one embodiment, when power control electronics 2340 sense that the lightening process is completed, it will open switch 2330 in order to conserve power. Other examples of functions and features that can be built into power control electronics 2340 are possible and will be evident to one skilled in the art.

Control electronics 2340 can also include electronic circuitry to apply a pulsed or alternating waveform to variable tint window 2350 instead of a constant DC voltage. The waveform can be in the form of a square wave, a sawtooth wave, a sinusoidal wave, or some other waveform. The amplitude of the wave can vary. In one embodiment, a square wave is applied to the electrodes of variable tint window 2350 by control electronics 2340. In one embodiment, the square wave ranges from amplitude of about −2 Volts to about +2 Volts.

Figure 24:
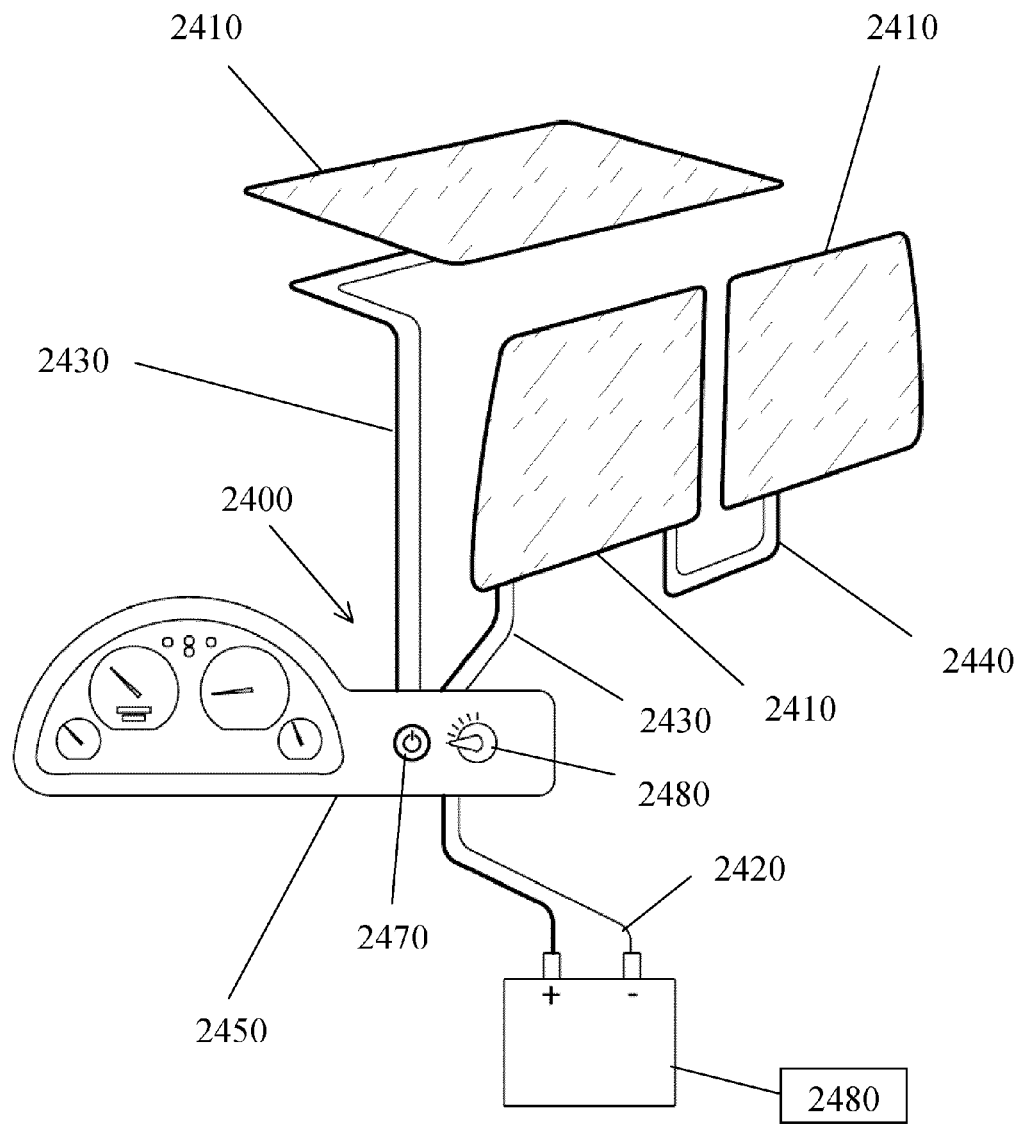
FIG. 24 is a general view of a control circuit connected to multiple variable tint windows according to an embodiment of the present invention.

FIG. 24 shows a general view of a power control unit connected to multiple variable tint windows, according to an embodiment of the present invention. Power control electronics 2400 are connected to multiple variable tint windows through wires 2430. Variable tint windows 2410 can for example be the rear window and side windows of an automobile. Electrical power is supplied from a battery 2480 through wire 2420. In one embodiment, the battery 2480 is a standard 12-Volt battery such as the type found in most automobiles. Batteries with other voltages and other power sources are also contemplated. Power control electronics 2400 are mounted in the dash 2450 of a vehicle. Electrical wire 2420 can be routed from the battery to the dash. Variable tint windows 2410 can be connected directly to power control electronics 2400 using wire 2430, or they can be connected together in parallel with wires 2440. Button 2470 and dial 2480 allow the user to control the variable tint windows. Button 2470 can be pushed when the user wants to lighten the variable tint window. When button 2470 is pushed, power control electronics 2400 will apply a voltage to variable tint windows 2410 for a fixed period of time in order to lighten them. In one embodiment, a voltage is applied in the range of about 10 seconds to about 5 minutes to fade variable tint windows 2410. After the voltage is applied, variable tint windows 2410 will stay in the light state if they are not being exposed to UV light. However, if variable tint windows 2410 are being exposed to UV light they will begin to darken again automatically as soon as the power control electronics 2400 opens the switch and is no longer applying a voltage to variable tint windows 2410.

Control electronics 2400 can be used to maintain a voltage on variable tint windows 2410 to keep them in the light state even if UV light is present. This can be done by pressing and holding button 2470 for more than a few seconds. Pressing and holding button 2470 for several seconds causes control electronics to apply a voltage to variable tint windows 2410 and maintains that voltage over a longer period of time. In one embodiment, power control electronics 2400 maintains voltage on variable tint windows 2410 for one hour. Pressing button 2470 again while a voltage is being applied to variable tint windows 910 can serve to cancel the lightening and allow variable tint windows 2410 to darken again in the presence of UV light. Dial 2480 can be used to indicate that an intermediate level of tint is desired. Setting the dial at an intermediate level of tint can cause control electronics to shorten the amount of time a voltage is applied to variable tint windows when button 2470 is pressed. In one embodiment, variable tint windows require two minutes to fully lighten and dial 2470 is set to indicate that an intermediate level of tint half way between the light and the dark state is desired. Power control electronics apply a voltage to variable tint windows 2410 for only one minute so the lightening process is stopped when variable tint window is half way between its dark tint state and its light tint state. Light emitting diodes or other indicating lights can be used in button 2470 to indicate to the user when voltage is being applied to variable tint windows 2410. Other control schemes can be used to provide input for power control electronics 2400, and different types and numbers of switches and buttons can also be used.

Figure 25:
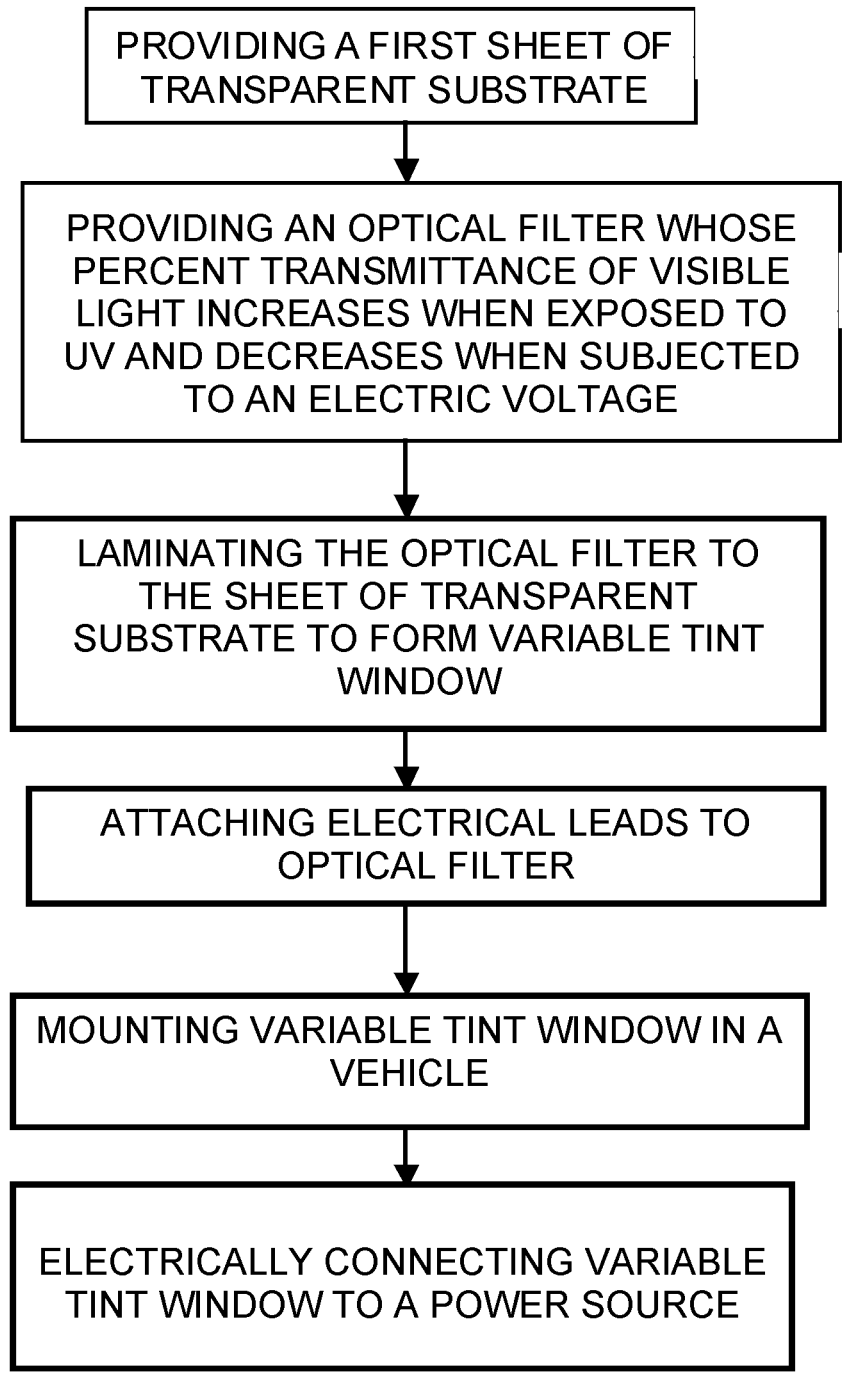
FIG. 25 is a flow chart showing steps for fabricating a variable tint window according to an embodiment of the present invention.

FIG. 25 illustrates a process for manufacturing a variable tint window according to an embodiment of the present invention. The process comprises providing a first transparent window substrate and laminating an optical filter of the present invention to the sheet of transparent window substrate to form a variable tint window. The transparent window substrate can be a sheet of glass, or a sheet of other transparent material such as polycarbonate. Electrical leads are then attached to the optical filter and the variable tint window is mounted in a vehicle. The variable tint window is then connected to a power source such that application of electricity through the leads to the switching material in the optical filter causes the variable tint window to lighten to its light tint state. Exposure to UV light (without the application of electricity) causes the variable tint window to darken to its dark tint state.

2. Variable Transmittance Ophthalmic Device

Optical filters of the present invention can be incorporated as a variable transmittance lens in a variety of ophthalmic devices. Variable transmittance ophthalmic devices of the invention will darken automatically when exposed to UV or sunlight and will lighten through application of an electric charge. For example, the optical filters of the invention can be incorporated as a variable transmittance lens in sunglasses, sports eyewear such as ski goggles and cycling glasses, industrial uses such as safety eyewear, and others.

Figure 26:
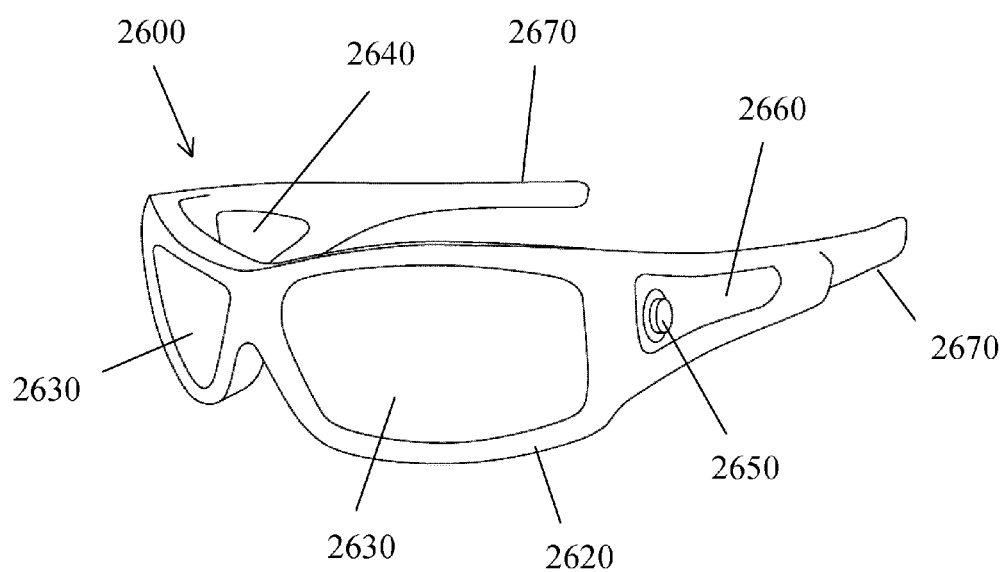
FIG. 26 is a general view of an ophthalmic device according to an embodiment of the present invention.

According to one embodiment of the present invention, FIG. 26 illustrates the application of an optical filter of the invention as a variable transmittance lens in sunglasses. Variable transmittance lens 2630 is positioned in front of the eyes, and frame 2620 has arms 2670 designed to hold frame 2620 on the head. Incorporated into the frame are a power source 2640, a switch 2650, and control electronics 2660. When the user activates switch 2650, an electric voltage is applied to the variable transmittance lens 2630. In response to the electrical voltage, variable transmittance lens 2630 will lighten and allow a greater percentage of visible light to pass through. Frame 2620 can be made out of metal, plastic, or other materials. Variable transmittance lens 2630 can also be made out of plastic, glass, or other transparent materials. Variable transmittance lens 2630 can be prescription (corrective) or non-prescription.

Figure 27:
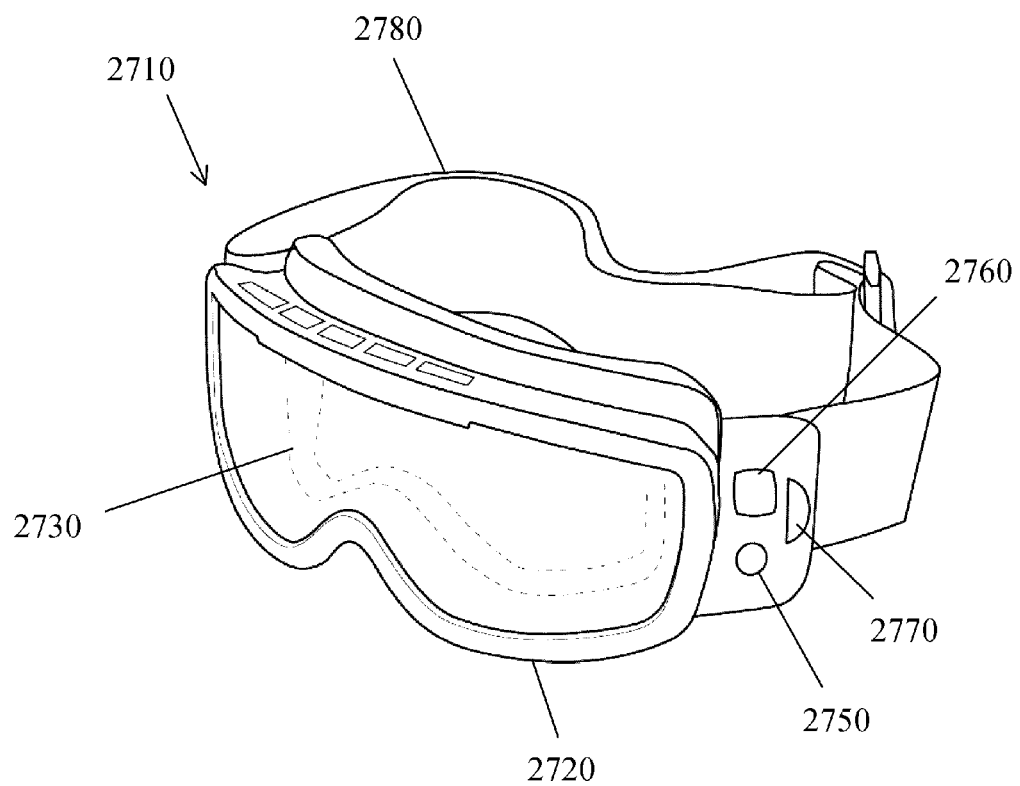
FIG. 27 is a general view of an ophthalmic device according to an embodiment of the present invention.

According to another embodiment of the present invention, and referring to FIG. 27, the optical filter of the invention can be incorporated as a variable transmittance lens in sports eyewear such as ski goggles and cycling eyewear. A variable transmittance lens 2730 is held in a frame 2720 and positioned in front of the eyes. A strap 2780 is designed to hold the frame onto the head. A compartment in the frame contains a power source 2760, for example a battery. To reduce the darkness of the variable transmittance lens, the user can press button 2750. This sends a signal to the control electronics 2770 that connects the power source 2760 to the variable transmittance lens 2730. The variable transmittance lens 2730 then transitions into its less dark state.

Figure 28:
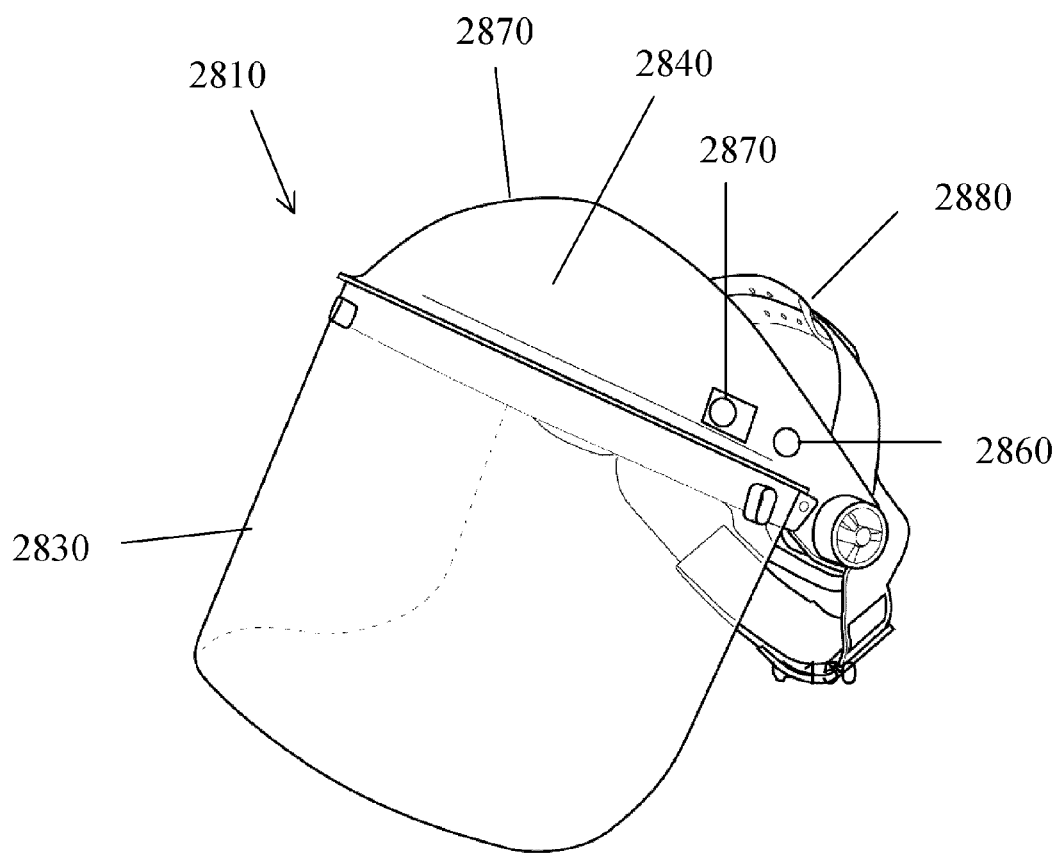
FIG. 28 is a general view of an ophthalmic device according to an embodiment of the present invention.

According to another embodiment of the present invention, the optical filter of the invention is incorporated as a variable transmittance lens in a safety ophthalmic device. As illustrated in FIG. 28, a variable transmittance lens 2830 is worn in front of the eyes to protect the eyes from flying debris. The variable transmittance lens can darken automatically in bright light or UV light to provide greater comfort for the user. A frame 2820 supports the variable transmittance lens 2830 and is held on the users head by band 2880. If the user would like to reduce the darkness of the variable transmittance lens, they can do so by pressing control button 2870. This sends a signal to electronics 2840 housed in the frame 2820 of the device. Control electronics 2840 will then apply an electric voltage to variable transmittance lens 2830 in order to reduce the darkness of the lens. The electric voltage is supplied by power source 2860, for example a battery. Variable transmittance lens 2830 can also be designed to be shatter-proof and chemical proof in order to provide the user with safety protection.

The optical filter of the invention can be incorporated into ophthalmic devices in a variety of ways. In one embodiment, the optical filter itself is made into the variable transmittance lens. In another embodiment, the optical filter is attached to the lens of an ophthalmic device.

Figure 29:
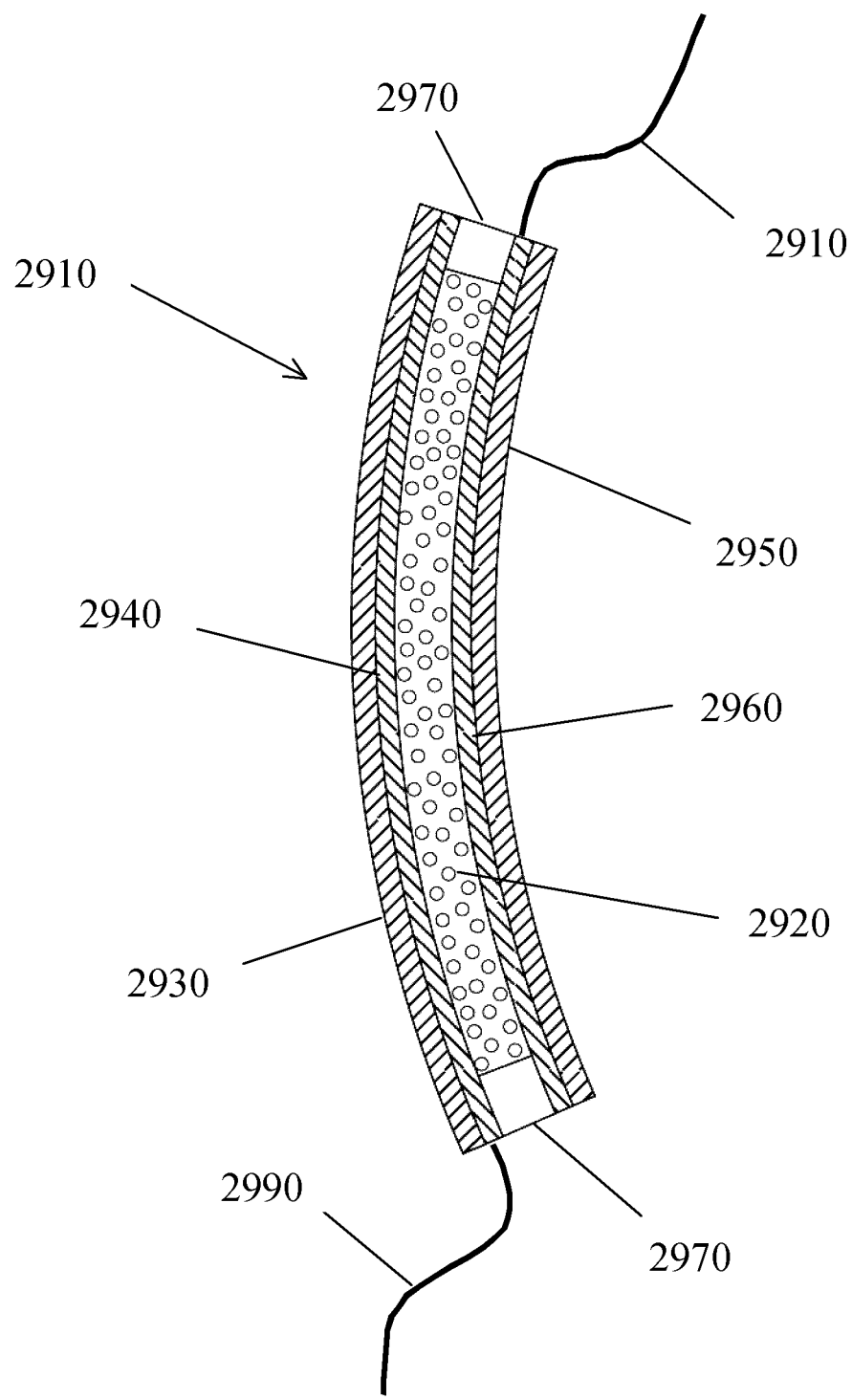
FIG. 29 is a schematic view of a variable transmittance lens according to an embodiment of the present invention.

FIG. 29 is a schematic diagram showing one embodiment of the optical filter of the present invention applied as a variable transmittance lens. Variable transmittance lens 2910 comprises a substantially optically transparent substrate 2930 and a conductive layer 2940 applied to its inside surface. The substantially optically transparent material could for example be glass, plastic, or some other material. The transparent material could be clear, or it could have some colour or tint in it. The colour or tint would reduce the percentage transmittance of visible light in the substrate, and this may be desirable in some applications. A wire 2990 can be used to connect electrically to conductive layer 2940. A switching material 2920 is located in contact with conductive layer 2940.

Switching material 2920 can be a liquid, a gel, or a solid matrix. A second substrate 2950 with conductive coating 2960 forms a sandwich structure around switching material 2920. A wire 2980 is used to connect electrically to coating 2960. Conductive coating 2960 is located in contact with the other side of switching material 2920. Seals 2970 may be required to keep switching material 2920 sandwiched in between substrate 2930 and substrate 2950 and to bond the two substrates together. However, switching material 2920 can also act as the adhesive between substrate 2930 and substrate 2950. In this embodiment, the thickness of switching material 2920 is constant in order to provide for uniform light transmission across the variable transmittance lens. However, in other embodiments, non-uniform thickness of switching material 2920 may be used if, for example, a variable transmittance lens with some darker regions and some lighter regions is desired. Substrate 2930 and substrate 2950 can be transparent or can be designed to block various wavelengths of light, or to have some base amount of tint already incorporated in them in order to provide a darker overall range and colour for the variable transmittance lens 2910. In addition, coatings such as scratch resistant coatings, anti-reflective coatings, and others can be applied to substrate 2930 and/or substrate 2950. Substrate 2930 and substrate 2950 can be curved or flat.

Figure 30:
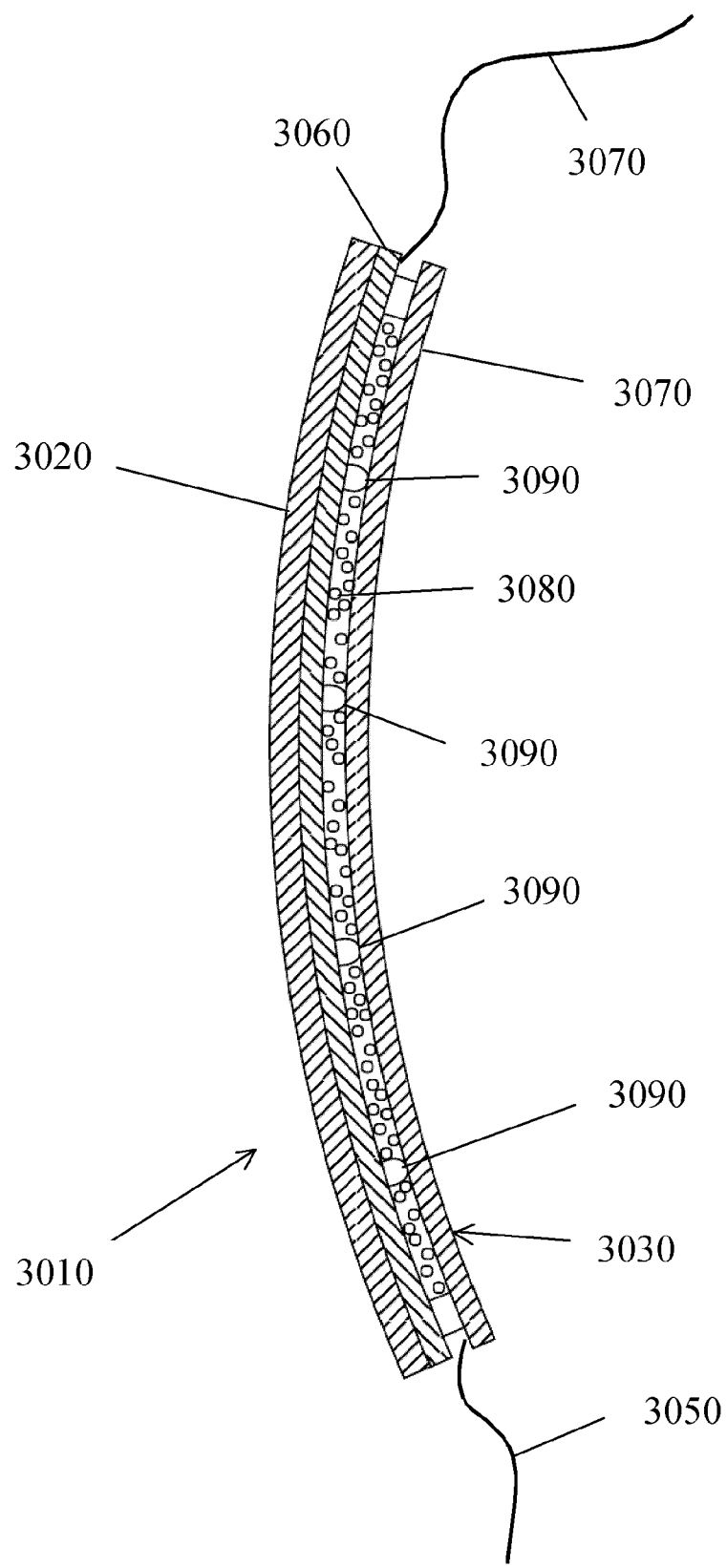
FIG. 30 is a schematic view of a variable transmittance lens according to an embodiment of the present invention.

In other embodiments, the optical filter of the invention is applied to the lens of an ophthalmic device. FIG. 30 shows one embodiment of a variable transmittance lens 3010 made using a flexible optical filter 3030 of the invention attached to a rigid ophthalmic lens substrate 3020. Rigid ophthalmic lens substrate 3020 can be made of plastic or glass or other material and can be a standard static transmission filter used in existing ophthalmic devices. In this embodiment, optical filter 3030 is laminated onto rigid ophthalmic lens substrate 3020 using a transparent adhesive. Lead 3040 is connected to flexible electrode 3060, and lead 3050 is connected to flexible electrode 3070. When the optical filter 3030 is exposed to UV light, switching material 3080 spontaneously darkens. When an electric charge is applied across lead 3050 and lead 3040, the optical filter lightens.

Figure 31:
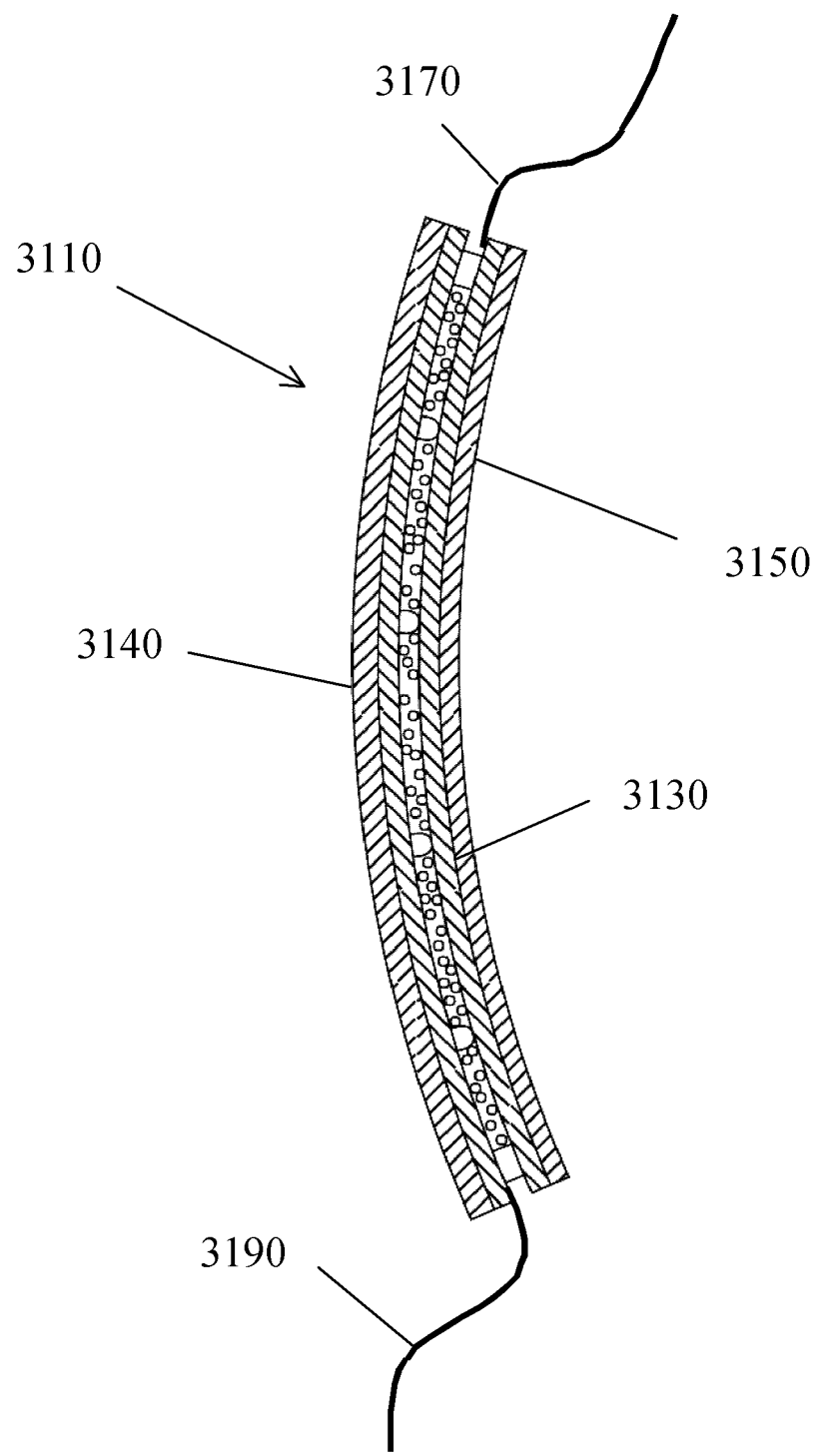
FIG. 31 is a schematic view of a variable transmittance lens according to an embodiment of the present invention.

In a further embodiment, and referring to FIG. 31, the optical filter 3130 is sandwiched between a rigid ophthalmic lens substrate 3150 and a rigid ophthalmic lens substrate 3140. Rigid ophthalmic lens substrate 3150 and rigid ophthalmic lens substrate 3140 can be made of glass or plastic or other transparent materials. In this embodiment, optical filter 3130 is laminated onto substrates 3150 and 3140 using transparent adhesive such as PVB. Lead 3170 and lead 3190 are connected to the optical filter 3130. When exposed to UV light, the optical filter 3130 darkens. When an electric charge is applied across lead 3170 and 3190, the optical filter lightens.

Figure 32:
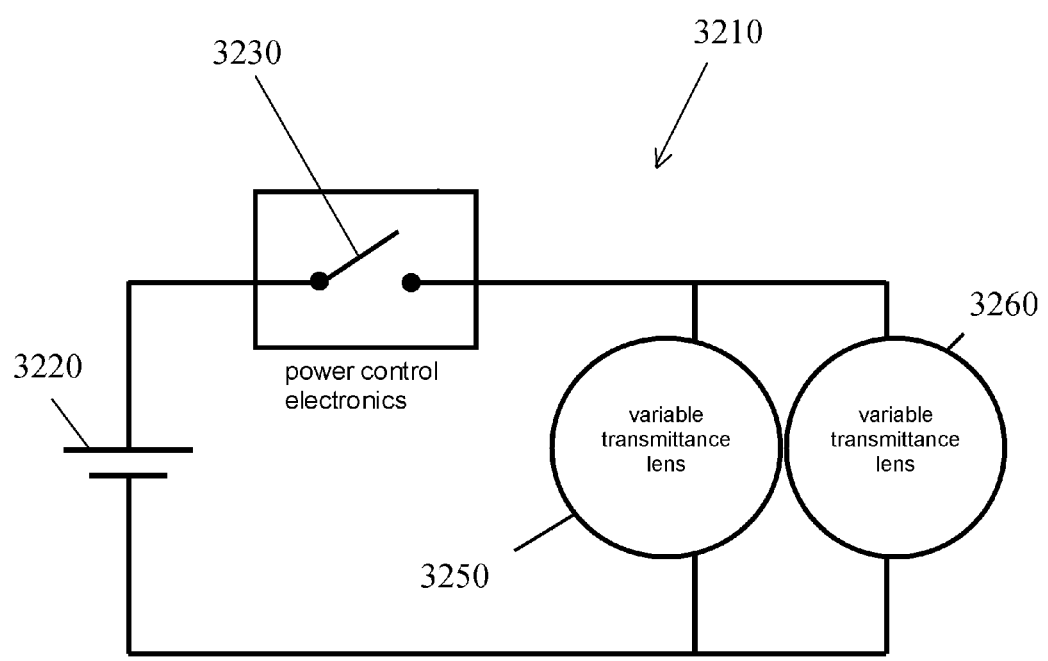
FIG. 32 is a schematic view of a control circuit for an ophthalmic device according to an embodiment of the present invention.

The ophthalmic device also comprises a power source that can be used for applying the electric charge across the variable transmittance lens. FIG. 32 shows a schematic diagram of one embodiment of a control circuit 3210 used to apply a voltage to variable transmittance lens 3250 and variable transmittance lens 3260 in order to cause them to go lighter. A power source 3220 supplies electric power to the circuit. In one embodiment, power source 3220 is a battery. The battery can be similar to batteries used in watches or hearing aids, and it can be a rechargeable or a non-rechargeable battery.

A switch 3230 is used to disconnect the power source from variable transmittance lens 3250 and 3260. Switch 3260 can be user activated, activated by control electronics 3240 automatically or in response to input from the user, or it can be activated by a sensor such as a light sensor. In one embodiment, power control electronics 3240 is a user-activated switch that directly passes the voltage from the power source straight to variable transmittance lens 3250 and variable transmittance lens 3260. The user-activated switch can be a normally-open push button, or some other type of switch. In this embodiment, the voltage of the power source 3220 would have to be matched to the voltage required by variable transmittance lens 3250 and variable transmittance lens 3260 to lighten. In one embodiment, the variable transmittance lens of the invention fades (goes lighter) with the application of approximately 1.4 volts. In other embodiments, depending on the switching material and the resistivity of the electrodes, the voltage range is between about 1 to 10 volts.

Control electronics 3240 can be used to control the voltage being applied to variable transmittance lens 3250 and 3260 as well as for controlling the time the voltage is applied for. In one embodiment, power control electronics 3240 includes a DC-DC converter for converting and/or regulating the voltage from the battery. In another embodiment, a DC-DC converter is used to step the voltage from a lithium ion battery from 3.7 volts down to a lower voltage.

In another embodiment, the power control electronics 3240 control switch 3230. In this embodiment, the power control electronics 3240 closes switch 3230 in response to user input or input from a sensor. A user could presses a button connected to a normally open momentary switch to provide an input signal to power control electronics 3240. The power control electronics 3240 would then close switch 3230 for a fixed period of time. The fixed period of time can be preset and built into the power control electronics by using a standard timing circuit familiar to those skilled in the art of electronic circuits. The fixed period of time would be preset to be the amount of time required for variable transmittance lens 3250 and 3260 lighten.

A light sensor can also be incorporated into the power control electronics to sense when it is bright outside. If it is bright outside and the user presses the button, the power control electronics maintain a voltage on variable transmittance lens 3250 and 3260 in order to maintain them in their light state. In this embodiment, the user returns the ophthalmic device to its normal auto-darkening state by pressing the button again, or by pressing a second button. In another embodiment, power control electronics can be used to apply a square wave signal to variable transmittance lens 3250 and 3260 in order to provide for faster lightening times and longer lifetimes.

Switch 3230 could also be a multi-state control device such as a potentiostat or a multi-position switch that would allow the user to select various different states to lighten the variable transmittance lens 3250 and 3260. In one embodiment, the user selects an intermediate state to indicate that a state part way between fully dark and fully light is desired. The power control electronics 3240 can then apply the voltage to variable transmittance lens 3250 and 3260 for an appropriate amount of time to achieve this intermediate state. Other methods of causing the variable transmittance filters to reach an intermediate state, such as applying a reduced amount of voltage, are also contemplated.

Power control electronics 3240 can also include a current sensor that can sense when the lightening process is completed in variable transmittance lens 3250 and 3260. When the power control electronics sense that the lightening process is completed, it will open switch 3230 in order to conserve power. Other examples of functions and features that can be built into the power control electronics are also contemplated.

Control electronics 3240 can also include electronic circuitry to apply a pulsed or alternating waveform to variable transmittance lens 3250 and 3260 instead of a constant DC voltage. The waveform can be in the form of a square wave, a sawtooth wave, a sinusoidal wave, or some other waveform. The amplitude of the wave can vary. In one embodiment, a square wave is applied to the electrodes of variable transmittance lens 750 and 760 by control electronics 740. The square wave ranges from an amplitude of about −2 Volts to about +2 Volts.

Figure 33:
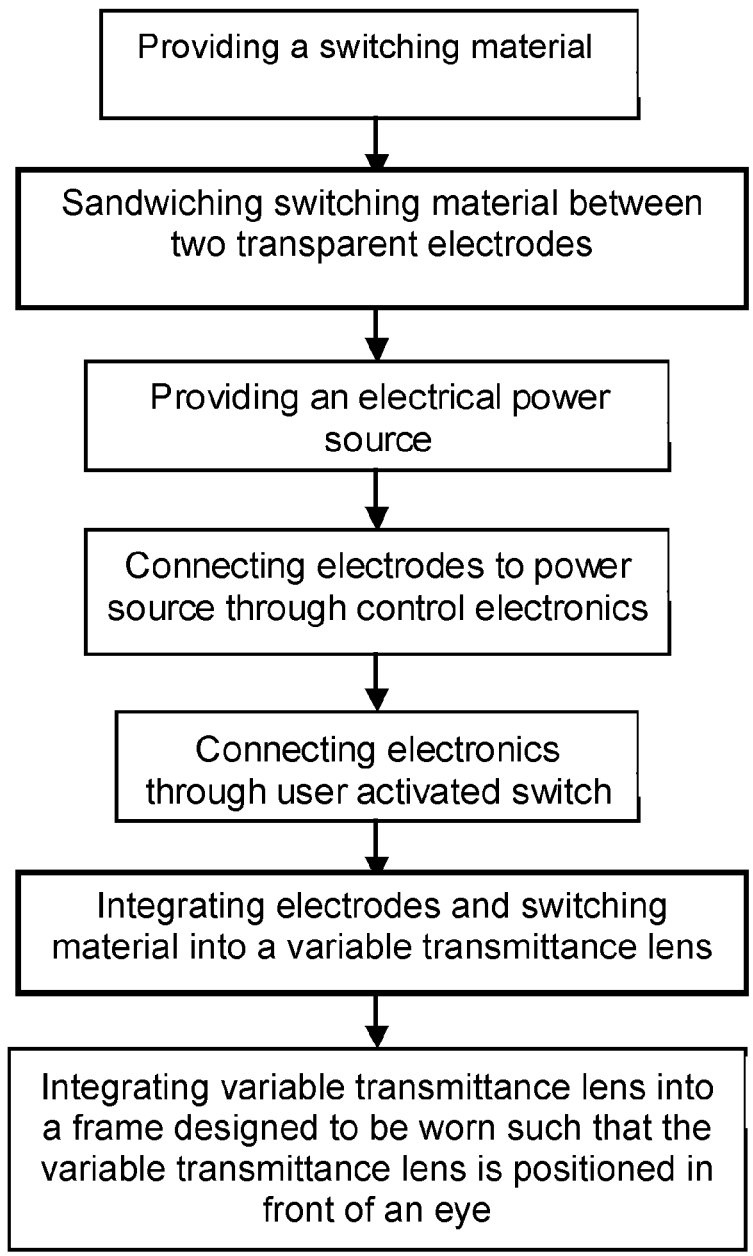
FIG. 33 is a flow chart showing an example of a method for fabricating an ophthalmic device according to an embodiment of the present invention.

FIG. 33 illustrates a process for manufacturing a variable transmittance lens in an ophthalmic device in accordance with one embodiment of the invention. The process comprises providing a switching material sandwiched between two transparent electrodes and integrating the sandwiched structure into a variable transmittance lens. The electrodes are then connected to an electric power source through control electronics. A user-activated switch is then connected to the control electronics. The variable transmittance lens, the control electronics, and the user-activated switch are integrated into a frame designed to be worn such that the variable transmittance lens is positioned in front of the eyes.

To gain a better understanding of the invention described herein, the following examples are set forth. It should be understood that these examples are for illustrative purposes only. Therefore, they should not limit the scope of this invention in any way.

EXAMPLES

Example 1

Preparation of Variable Transmittance Optical Filters

Method A:

An ITO coated PET substrate having a thickness of 7 mil (~178 microns) and a sheet resistance of 50 ohms/square (OC50, made by CP Films) is cut into two 15 cm×15 cm sheets. The substrate is prepared by cleaning with a Teknek tacky dust-removing roller and temporarily laminated to glass plates. Steel spacers are placed on the glass around the perimeter of the PET. These spacers act as hard stops, which set the gap for the final pressed device. A switching material, prepared as described below, is placed on the PET to completely fill the gap between the PET sheets when the device is pressed. The switching material is heated to 80-100° Celsius to facilitate dispensing; however, less heat is required for the actual pressing. The second piece of glass-backed PET is placed on top of the other. The PET sheets overlap such that there is some ITO coating exposed, to act as the external electrical contacts. The sandwich (glass-PET-switching material-PET-glass) is placed in the center of the press platens, which are heated to 45° C. Pressure greater than 160 psi is applied to the filter using a Carver hydraulic press, or nip rollers, for a time of at least 10 seconds to 1 minute and up to several hours. The time can vary but should be sufficient to allow the switching material layer to reach a uniform thickness. Warming up the formulation to about 40° C. allows the material to flow more readily and shortens the time required for a uniform thickness to be reached. After the pressure is released, the glass plates are separated, and the filter stack is removed. Any excess switching material is wiped off and conductive tape is applied to the exposed ITO. The total thickness of the optical filter is 16 mil (~406 microns). The thickness of the switching material layer is 2 mil (~51 microns).

Method B:

An ITO coated PET substrate is prepared as described above. A switching material comprising a low-boiling solvent (THF) is then coated onto the conductive side of one sheet of ITO-coated PET using a slot die, a knife coater, or another coating method conducive to roll-to-roll coating. The thickness of the coater is set such that the final coating once the low-boiling solvent is evaporated off is the desired thickness. For a final switching material thickness of about 50 microns, the initial wet coating is set to about 114 microns. The low-boiling solvent is evaporated from the switching material using blown air or heat or a combination of both. The second layer of ITO-coated PET is laminated on top of the coating with the conductive side down to form a sandwich structure. The laminated structure is cut to the desired size (if required) and electrical contacts are added. The total thickness of the optical filter is 16 mil (~406 microns). The thickness of the switching material layer is 2 mil (~51 microns).

Example 2

Preparation of the Switching Material

The switching material was formulated to demonstrate how the components of the formulation can be varied. These formulations can be readily adapted to a desired application by a worker skilled in the art, by replacing the listed ingredients with one or more other ingredients in accordance with the present invention.

2.1 Formulation for Switching Material #1

| Ingredient | % by Weight |
| --- | --- |
| PEGDMA 860 | 15% |
| triglyme | 75% |
| DAROCUR | 0.01% |
| lithium perchlorate | 1% |
| tris(4-bromophenyl)amine (TBPA) | 6% |
| chromophore: | 3% |
| TOTAL | 100% |

The chromophores that are used in Formulation #1 include:

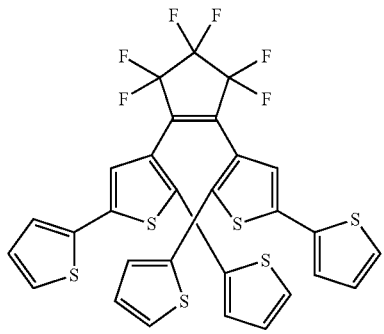 [SMILES: FC1(F)C(c2cc(-c3cccs3)sc2-c2cccs2)=C(c2cc(-c3cccs3)sc2-c2cccs2)C(F)(F)C1(F)F]

or a derivative thereof having different functional groups on the four peripheral thiophene rings; or

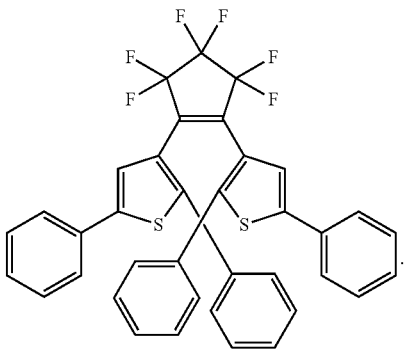 [SMILES: FC1(F)C(c2cc(-c3ccccc3)sc2-c2ccccc2)=C(c2cc(-c3ccccc3)sc2-c2ccccc2)C(F)(F)C1(F)F]

The PEGDMA, the triglyme, the lithium percholarate, and the tris(4-bromophenyl)amine are all available for example from Sigma-Aldrich of St. Louis Mo. DAROCUR is a photoinitiator available from CIBA Specialty Chemicals of Basel Switzerland, a division of BASF.

Formulation #1 is prepared by first dissolving the DAROCUR in the triglyme solvent at room temperature. The chromophore, the lithium percholorate, and the TBPA are then combined and added to the solvent and mixed. No heat is required. The PEGDMA is then added and the entire formulation is mixed until homogeneous.

2.2 Formulation for Switching Material #2

| Ingredient | Concentration |
| --- | --- |
| triglyme | 15% |
| chromophore | $2 \times 10^{-5}$M |

The chromophores that are used in Formulation #2 include:

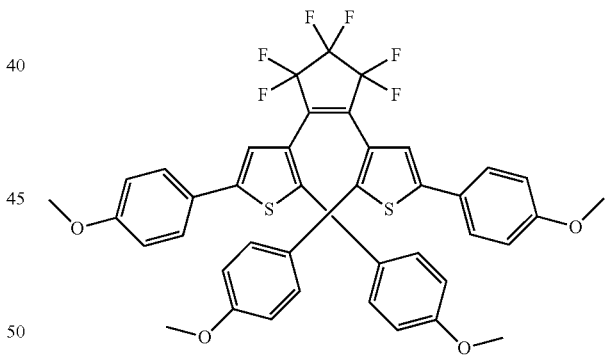

or a derivative thereof having different functional groups on the four benzene rings.

Formulation #2 is prepared by mixing the chromophore in the solvent.

A gelling agent, such as PVB B-90 and PMMA, can be added to the switching material formulation to increase viscosity. Exemplary formulations comprising a gelling agent are represented by the following Examples. These switching material formulations are in general prepared by first combining the chromophore, the supporting electrolyte, and the charge compensator (if present). This mixture is then added to the solvent or combination of solvents and mixed until homogeneous. Finally, the polymer component is added to gel the mixture, and the entire mixture is mixed and agitated, with gentle heat if necessary until the desired viscosity is obtained.

2.3 Formulation for Switching Material #3

| Ingredient | % by Weight |
| --- | --- |
| PMMA | 15% |
| triglyme | 74% |
| 1,4-dinitrobenzene | 1% |
| lithium perchlorate | 1% |
| tris(4-bromophenyl)amine (TBPA) | 6% |
| chromophore: | 3% |
| TOTAL | 100% |

The chromophores that are used in Formulation #3 include:

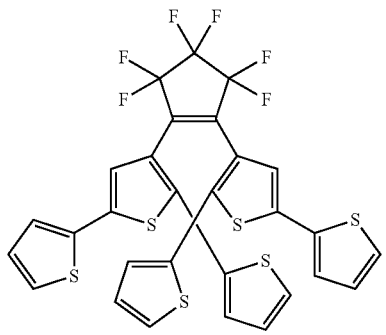 [SMILES: FC1(F)C(c2cc(-c3cccs3)sc2-c2cccs2)=C(c2cc(-c3cccs3)sc2-c2cccs2)C(F)(F)C1(F)F]

or a derivative thereof having various functional groups on the four peripheral thiophene rings; or

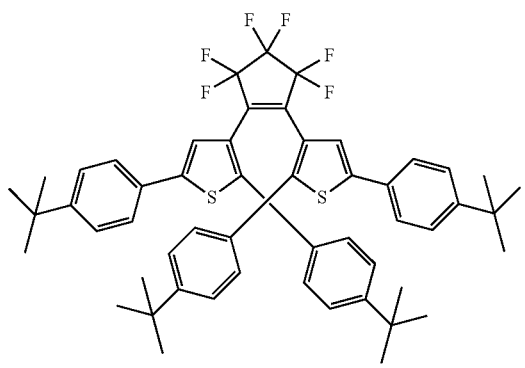

or a derivative thereof having various functional groups on the four benzene rings.

PMMA is a gelling agent and is available from Sigma-Aldrich of St. Louis, Mo. 1,4-Dinitrobenzene is a charge compensator, and is also available from Sigma-Aldrich.

2.4 Formulation for Switching Material #4

| Ingredient | % by Weight |
| --- | --- |
| PVB B-90 | 22% |
| triglyme | 72% |
| tetrabutylammonium hexafluorophosphate (TBAPF$_6$) | 1% |
| chromophore: | 5% |
| TOTAL | 100% |

The chromophores that are used in Formulation #4 include:

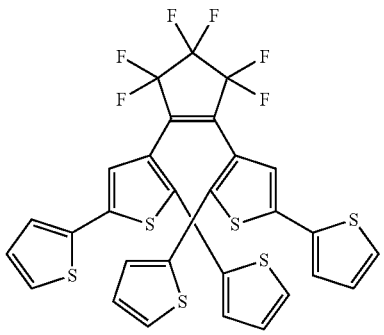 [SMILES: FC1(F)C(c2cc(-c3cccs3)sc2-c2cccs2)=C(c2cc(-c3cccs3)sc2-c2cccs2)C(F)(F)C1(F)F]

or a derivative thereof having various functional groups on the four peripheral thiophene rings; or

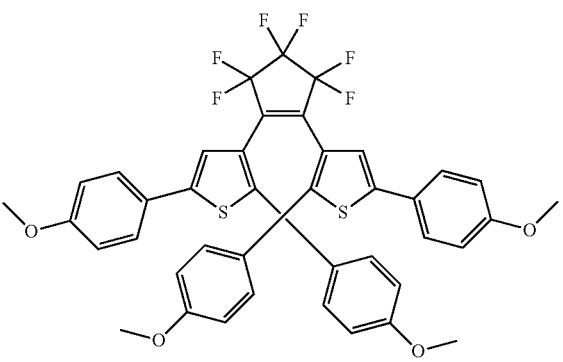

or a derivative thereof having different functional groups on the four benzene rings.

PVB B-90 is a gelling agent and is available from Butvar, a division of Solutia Inc. of St. Louis, Mo.

2.5 Formulation for Switching Material #5

| Ingredient | % by Weight |
| --- | --- |
| PVB B-90 | 24.9% |
| triglyme | 70.7% |
| tetrabutylammonium hexafluorophosphate (TBAPF$_6$) | 1% |
| chromophore | 3.4% |
| TOTAL | 100% |

The chromophores that are used in Formulation #5 include:

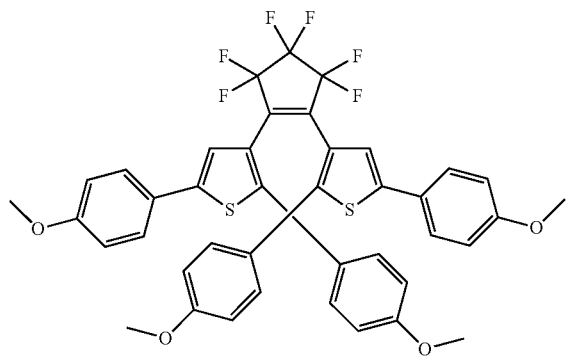

or a derivative thereof having different functional groups on the four benzene rings.

2.6 Formulation for Switching Material #6

| Ingredient | % by Weight |
|---|---|
| PVB B-90 | 25% |
| triglyme | 70.6% |
| tetrabutylammonium hexafluorophosphate (TBAPF$_6$) | 1% |
| chromophore | 3.4% |
| TOTAL | 100% |

The chromophores that are used in Formulation #6 include:

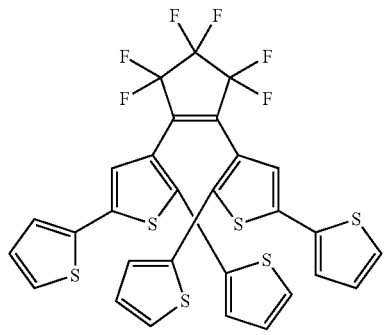 [SMILES: FC1(F)C(c2cc(-c3cccs3)sc2-c2cccs2)=C(c2cc(-c3cccs3)sc2-c2cccs2)C(F)(F)C1(F)F]

or a derivative thereof having various functional groups on the four peripheral thiophene rings; or

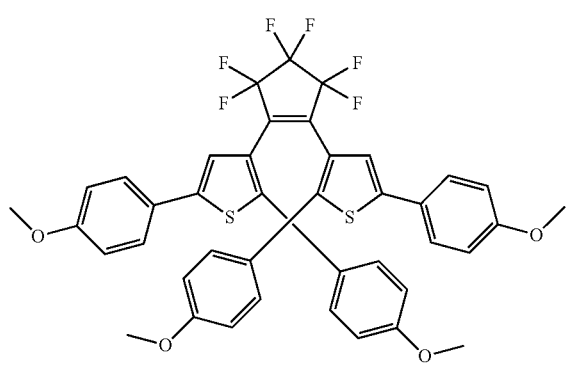

or a derivative thereof having different functional groups on the four benzene rings.

2.7 Formulation for Switching Material #7

The switching material is formulated to additionally comprise a second low-boiling solvent such as tetrahydrofuran (THF), available from Aldrich, to lower the viscosity of the formulation for coating. Once coated, the low-boiling solvent is substantially evaporated off, leaving the other components behind.

| Ingredient | % by Weight |
|---|---|
| PVB B-90 | 8.8% |
| triglyme | 28.8% |
| tetrabutylammonium hexafluorophosphate (TBAPF$_6$) | 0.4% |
| chromophore | 2% |
| THF | 60% |
| TOTAL | 100% |

The chromophores that are used in Formulation #7 include:

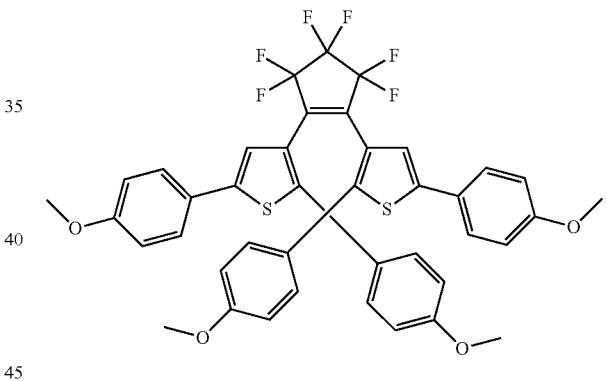

or a derivative thereof having different functional groups on the four benzene rings.

2.8 Formulation for Switching Material #8

| Ingredient | % by Weight |
|---|---|
| PMMA | 5% |
| triglyme | 93.5% |
| lithium perchlorate | 1% |
| chromophore | 0.5% |
| TOTAL | 100% |

The chromophores that are used in Formulation #8 include:

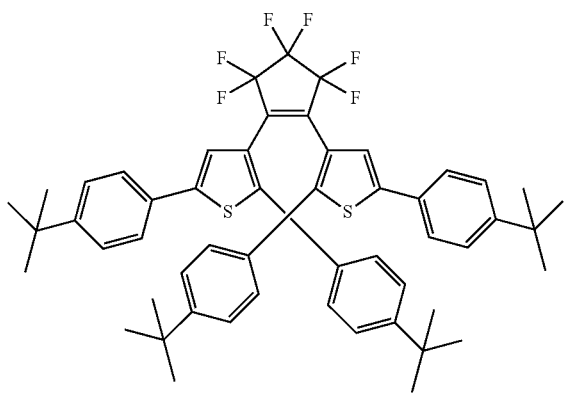 [SMILES: CC(C)(C)c1ccc(-c2cc(C3=C(c4cc(-c5ccc(C(C)(C)C)cc5)sc4-c4ccc(C(C)(C)C)cc4)C(F)(F)C(F)(F)C3(F)F)c(-c3ccc(C(C)(C)C)cc3)s2)cc1]

Example 3

Optical Properties of Switching Material

The optical properties of the switching material are tested with samples of the switching material.
VLT Spectrum The VLT spectrum of the switching material that had been prepared according to the formulation described in Example 2.3, was determined for its light and dark state. The procedure uses an Ocean Optics spectrometer to measure the % visible light transmittance of the sample, in its light and dark states, over an electromagnetic spectrum. The samples are prepared according to the method described in Example 2.

Figure 5:
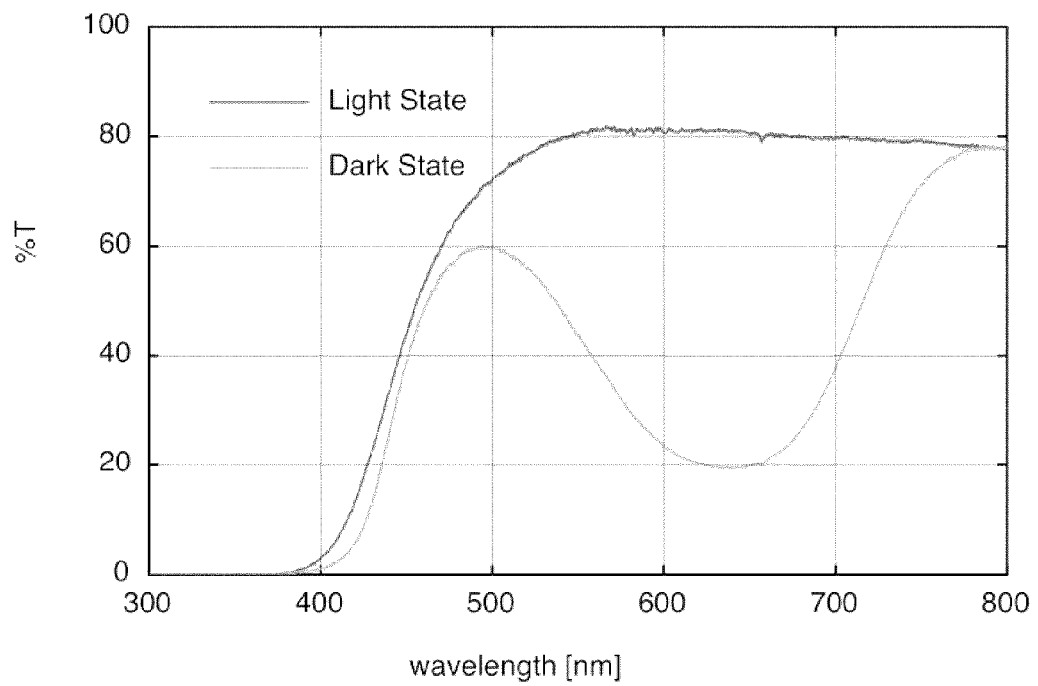
FIG. 5 is a graph of the transmission spectra of an optical filter according to an embodiment of the present invention.
Figure 34:
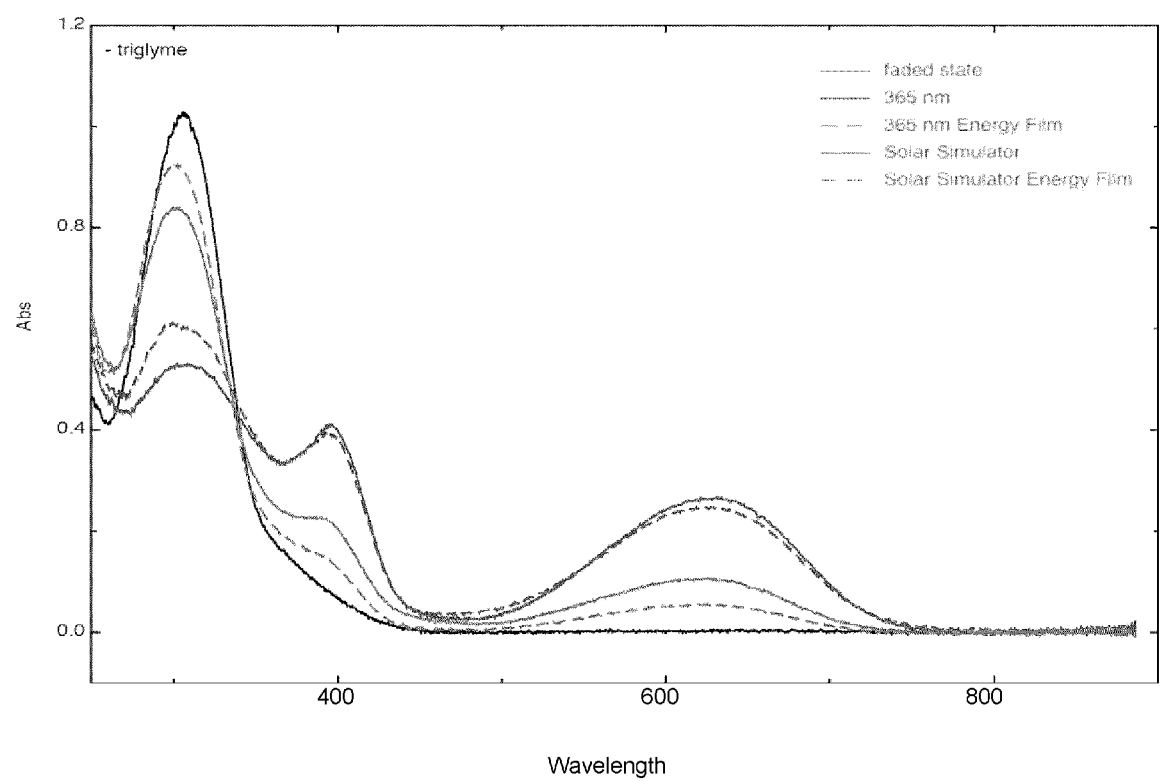
FIG. 34 is a graph showing the absorbance spectra of the switching material under various UV light intensities, according to an embodiment of the present invention.

As illustrated in FIG. 5, when the molecules are exposed to UV light, the switching material switches to its dark state resulting in a decrease in the percent transmittance of the material in the visible range between 400 and 750 nm. An electric charge of 2 Volts is then applied to the switching material sample for 3 minutes, causing the sample to revert to its light state. In the light state, more light is permitted to pass through the switching material resulting in an increase in percent transmittance in the range from 400 to 750 nm. The visible light transmittance in the light state is about 80%, and the visible light transmittance in the dark state is about 20%. This provides a contrast ratio of 4.
UV Sensitivity The sensitivity of the switching material to the intensity of UV light was analyzed. The switching material that had been prepared according to the formulation described in Example 2.2, was exposed to both UV light at 365 nm and solar radiation (using a solar simulator) with and without a UV blocking film made by Energy Film of Portland, Oreg. The Energy Film UV blocking film acts as a band-pass filter and effectively blocks the high intensity UV light (below about 365 nm). As illustrated in FIG. 34, depicting the absorbance spectra of the switching material under the various UV light intensities, the switching material maintains sensitivity to the low intensities of UV light (above about 365 nm) to darken.

Example 4

Visible Light Transmittance (VLT) Determination of the Optical Filter

The VLT of the optical filter prepared by the method described in Example 1 comprising the switching material that had been prepared according to the formulation described in Example 2.4 was measured using an Ocean Optics spectrometer. Optical filters exposed to 365 nm UV light for about 3 minutes had a VLT of 17%. The transmission increased after application of a charge of 2 Volts for about 3 minutes to 69%.

Example 5

Haze Determination of the Optical Filter

The clarity of the optical filter prepared by the method described in Example 1 comprising the switching material that had been prepared according to the formulation described in Example 2.4 was measured using a XL-211 Hazegard Hazemeter manufactured by BYK Gardner. The haze of the optical filter was measured to be 2%.

Example 6

Switching Speed Determination of the Optical Filter

Switching speed is determined by the amount of time it takes for the optical filter to go from the dark state to the light state, and vice versa. To transition from the light state to the dark state, the optical filter is exposed to 365 nm UV light for 3 minutes. To transition from the dark state to the light state, a charge of 2 Volts is applied to the filter for 3 minutes. Switching time from the light state to the dark state is measured as the time required to achieve 90% of the VLT of the dark state from the fully light state. Switching time from the dark state to the light state is measured as the time required to achieve 90% of the VLT of the light state, from the fully dark state.

The optical filter prepared by the method described in Example 1 comprising the switching material that had been prepared according to the formulation described in Example 2.4, and comprising a UV blocking film made by Energy Film of Portland Oreg., was tested. The switching speed of the optical filter is about 30 seconds from the light state to the dark state, and about 2 minutes for switching from the dark state to the light state. The switching speed of the optical filter prepared according to the formulation described in Example 2.1, measured to be about 35 seconds from the dark state to the light state and 2 minutes from the light state to the dark state. The switching speed of the optical filter prepared according to the formulation described in Example 2.7, measured to be about 3 minutes 20 seconds from the dark state to the light state and 12 seconds from the light state to the dark state.

The switching time for transitioning from the light state to the dark state can be different from the switching time for transitioning from the dark state to the light state.

Example 7

Photostability Determination of the Optical Filter

Photostability of the optical filter is determined by exposing the samples to UV light similar to the UV light in the solar spectrum. Samples are tested at regular intervals to determine degradation. When the contrast ratio has dropped to 50% of the original contrast ratio of the device (determined prior to testing), the device is considered to have failed.

The photostability of the optical filters is determined using a QUV accelerated weathering tester from Q-Labs. Photostability of the optical filter is also determined using an S16 accelerated testing instrument from Solar Light to test the photostability of the optical filter at higher power densities.

The photostability of the optical filter made according to the method described in Example 1 comprising the switching material that had been prepared according to the formulation described in Example 2.5 was tested on a QUV for 1300 hours at about 7.3 mW/cm$^2$ before 50% degradation was reached. The same optical filter was tested on a Solar Light unit at 135 mW/cm$^2$ for 540 hours before 50% degradation was reached.

Example 8

Cycling Durability Determination of the Optical Filter

Cycling durability is determined by exposing the optical filter to continuous UV light using a Spectroline transilluminator and applying a voltage to the optical filter at regular time intervals. First, the amount of time required to darken and lighten the optical filter is determined. This is then used to determine how much time the voltage should be turned on and off for in the automated test. Typically, the voltage "on" time is set to be the amount of time it takes for the optical filter to bleach to about 90% of its initial value. The voltage "off" time is set to be the amount of time it takes for the optical filter to darken to 90% of its original value. The cycling is then controlled by an automated cycling set-up using a PC, a LabJack instrument (available from LabJack Corporation of Lakewood Colo.). In the "off" state, the two electrodes are shorted together to dissipate the charge on the optical filter.

The cycling durability of the optical filter made according to the method described in Example 1 comprising the switching material prepared according to the formulation described in Example 2.6 and comprising a UV blocking film from Energy Film of Portland, Oreg., was tested. The optical filter was tested for 741 cycles before reaching the 50% degradation point. In an oxygen-free environment, the optical filter was tested for 1553 cycles before reaching the 50% degradation point.

Example 9

Sheet Resistance Determination of the Optical Filter

The operability of optical filters using substrates of different sheet resistances was tested. Optical filters were made according to the method described in Example 1 comprising the switching material that had been prepared according to the formulation described in Example 2.4 using substrates of 50 Ohms/square, 100 Ohms/square, and 300 Ohms/square. Optical filters were also made according to the method described in Example 1 comprising the switching material that had been prepared according to the formulation described in Example 2.8 using substrates of, 1,000 Ohms/square, and 100,000 Ohms/square. The optical filters were tested for the ability to transition between light and dark states. In all examples the optical filters were still able to lighten upon application of electricity.

Example 10

Required Voltage Determination of the Optical Filter

To determine the minimal voltage required to cause the optical filters to switch from the dark state to the light state, incrementally higher voltages are applied until the device begins to transition from the dark to the light state. In an optical filter made according to the method described in Example 1 comprising the switching material that had been prepared according to the formulation described in Example 2.4, fading from the dark to light state is observed at about 1.8 Volts. The transitioning is faster at about 2 Volts. Too high a voltage however is not desirable because other electrochemical reactions are introduced that can cause fouling of the electrodes. For example, transitioning in the optical filter is impacted when a voltage greater than about 2.5 volts is applied, and brown spots are observed if the optical filters are left at that potential for a longer period of time.

Example 11

Impact of Optical Filter on Electrical Consumption and $CO_2$ Emissions

The ability of a variable transmittance window of the present invention to provide significant energy and cost savings was determined. A building with variable transmittance IGUs was modelled using window and energy modelling software available from Lawrence Berkeley National Laboratories of Berkeley, Calif. The building modelled was a 400 square foot small office with a 0.9 wall-to-window ratio. The building was modelled in five U.S. cities (Miami, Los Angeles, New York, Houston, and Chicago). The variable transmittance smart window used for the model is an insulating glass unit with an optical filter laminated onto one of the panes, and a low emissivity coating on the inside of the exterior pane facing the sealed space. A variable transmittance window of this configuration was determined to achieve a solar heat gain coefficient (SHGC) of about 0.15 in the dark state, and about 0.32 in the light state. Using variable transmittance windows according to the present invention with the window in the dark state resulted in average electricity savings of 28%, according to the model. The electricity savings resulted from a reduced requirement for air conditioning due to the variable transmittance windows. $CO_2$ emissions were reduced from about 19% to about 25%, due mostly to the reduction in electricity usage.

Figure 16:
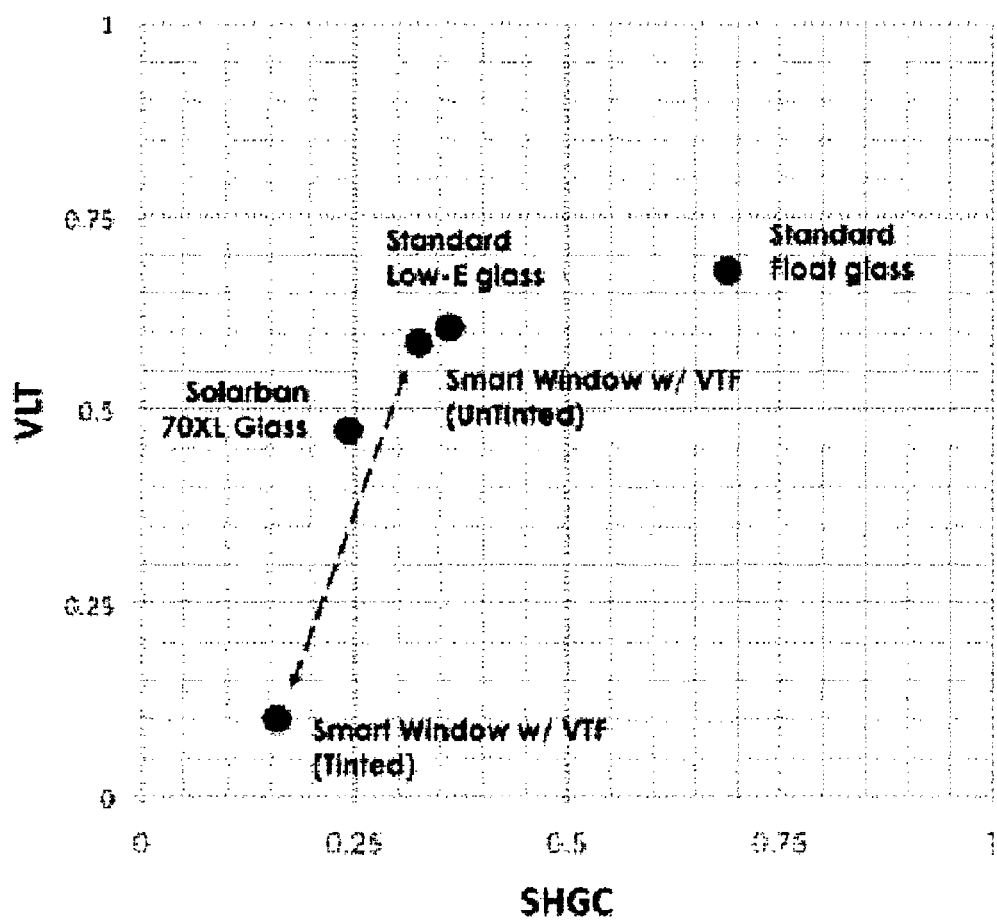
FIG. 16 is a graph showing the solar heat gain of a variable transmittance window in the light and dark states according to an embodiment of the present invention.

FIG. 16 illustrates the solar heat gain coefficients of a variable transmittance window in its dark and light state. As can be seen from the graph in FIG. 16, the variable transmittance window achieves a solar heat gain coefficient (SHGC) of about 0.15 with a corresponding percent visible light transmittance (VLT) of about 10% in the dark state. In the light state, the percent visible light transmittance of the variable transmittance window increases to about 60%, and the solar heat gain coefficient increases to 0.32. In the dark state, the variable transmittance window has a significantly lower solar heat gain coefficient than standard low-emissivity (Low-E) glass. Standard Low-E glass is shown on the graph for comparison purposes, as is a standard float glass (no coatings) and Solarban 70XL Glass from PPG Industries of Pittsburgh, Pa. The standard float glass has the highest (worst) solar heat gain coefficient while Solarban 70XL glass has the best SHGC of the non-dynamic glazings. The SHGC of an IGU using standard float glass is about 0.70. The SHGC of an IGU made using the Solarban 70XL glass is about 0.25. The graph shows that a SHGC of less than 0.25 can be achieved with variable transmittance smart windows and dynamic glazings. In this example, the variable transmittance window has a contrast ratio of about six.

Example 12

Intermediate States of the Optical Filter

A prototype device made using the formulation in Example 2.3 was tested for the ability to achieve intermediate states.

The device is first darkened under UV light (365 nm) although solar light can equally be used. A DC voltage of about 2 Volts is then applied to the device for a short period of time (e.g., about 10% of the total switching time) before being switched off. During the time the power is applied the VLT of the device increases, but did not go all the way to the light state. Once the voltage is switched off, the device remains in its intermediate dark state without the need for any further application of power. If the voltage is turned on again, the device continues to transition to its light state.

Example 13

Photostability of Chromophores in Switching Materials of the Optical Filter

The photostability of chromophores in various combinations of the switching material, are tested by exposing the combination to UV light similar to the UV light in the solar spectrum. Optical filters comprising the combination are tested at regular intervals to determine degradation. When the contrast ratio drops to 50% of the original contrast ratio of the combination (determined prior to testing), the combination is considered to have failed.

The photostability of an optical filter comprising the combination is determined using a QUV accelerated weathering tester from Q-Labs. Photostability of the optical filter is also determined using an S16 accelerated testing instrument from Solar Light to test the photostability of the combination at higher power densities.

Chromophores were tested in combination with various switching material components prepared according to Example 2 and the results are shown in Table 1 below. Referring to Table 1, the chromophores that were tested include the following:

Chromophore 1

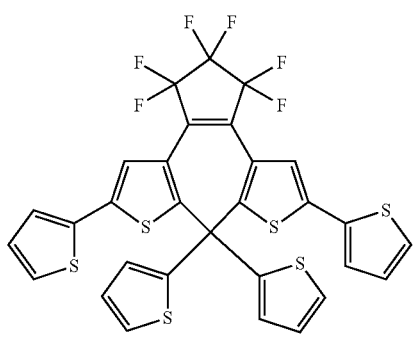

Chromophore 2

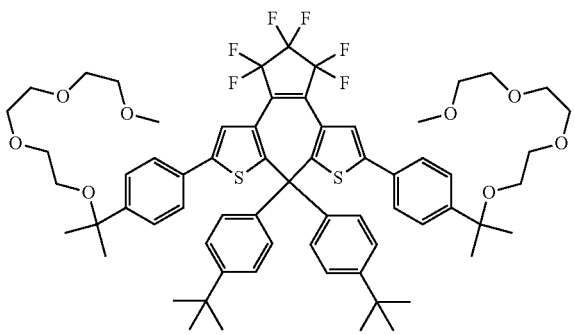

Chromophore 3

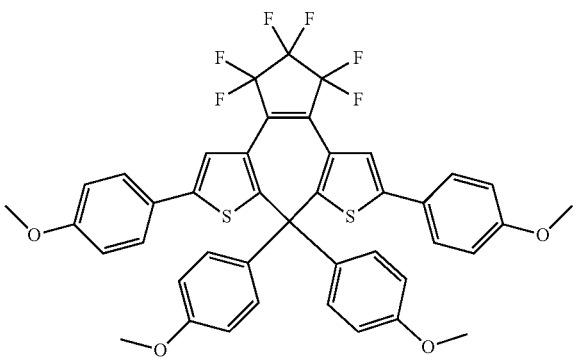

Chromophore 4

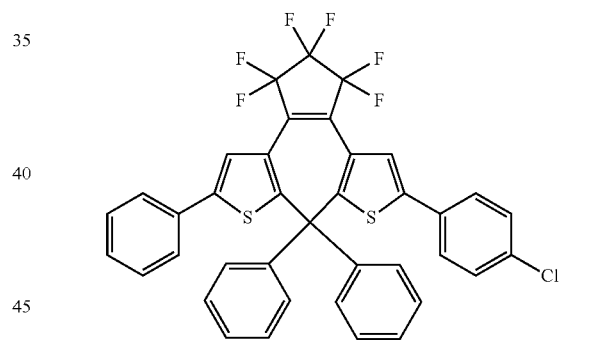

Each chromophore was capable of achieving 700 hours in at least one of the combinations of switching material before 50% degradation was reached.

TABLE 1

| Device Size | Device Thickness (µ) | Substrate | UV Blocker | UV Blocker Location | Chromophore | Polymer |
|---|---|---|---|---|---|---|
| 1.5 cm diam | 60 | OC50 | Energy Film | ext. | 1 | PVB (25) |
| 1.5 cm diam | 60 | Graphene | Energy Film | ext. | 1 | PVB (25) |
| 1.5 cm diam | 50 | OC50 | Energy Film | ext. | 1 | PVB (25) |
| 1.5 cm diam | 60 | OC50 | Energy Film | ext. | 2 | PVB (25) |
| 9 × 6 cm | 50 | OC50 | Energy Film | ext. | 3 | PVB (25) |
| 2.5 × 2.5 cm | 50 | OC50 | Energy Film | ext. | 2 | PVB (25) |
| 9 × 6 cm | 50 | OC50 | Energy Film | ext. | 3 | PVB (25) |
| 2.5 × 2.5 cm | 50.00 | OC50 | Energy Film | ext. | 2 | PVB (25) |
| 1.5 cm diam | 50.00 | OC50 | Energy Film | ext. | 3 | PVB (20.2) |
| 2.5 × 2.5 cm | 50.00 | OC50 | Energy Film | ext. | 2 | PVB (25) |
| 1.5 cm diam | 60 | OC50 | Energy Film | ext. | 1 | PVB (25) |

TABLE 1-continued

| | | | | | | |
|---|---|---|---|---|---|---|
| 1.5 cm diam | 50 | OC50 | Energy Film | ext. | 3 | PVB (20.2) |
| 3 × 5 cm | 50 | OC50 | Energy Film | ext. | 3 | PVB (25) |
| 9 × 6 cm | 50 | OC50 | Energy Film | ext. | 3 | PMMA (25) |
| 9 × 6 cm | 50 | OC50 | Energy Film | ext. | 3 | PEMA (25) |
| 9 × 6 cm | 50 | OC50 | Energy Film | ext. | 3 | PVB (25) |
| 1.5 cm diam | 60 | OC50 | Energy Film | ext. | 2 | PVB (25) |
| 9 × 6 cm | 50 | OC50 | Energy Film | ext. | 3 | PVB (25) |
| 9 × 6 cm | 50 | OC50 | Energy Film | ext. | 3 | PVB (24) |
| 9 × 6 cm | 50 | OC50 | Energy Film | ext. | 3 | PEMA (25) |
| 2.5 × 2.5 cm | 50 | OC50 | Energy Film | ext. | 2 | PVB (25) |
| 9 × 6 cm | 50 | OC50 | Energy Film | ext. | 3 | PMMA (25) |
| 3 × 5 cm | 50 | OC50 | Energy Film | ext. | 3 | PVB (25) |
| 3 × 5 cm | 50 | OC50 | Energy Film | ext. | 3 | PVB (25) |
| 3 × 5 cm | 50 | OC50 | Energy Film + Acetate | ext. in spectra | 3 | PVB (22) |
| 7.5 × 7.5 cm | 50 | OC50 | — | — | 3 | PVB (25) |
| 9 × 6 cm | 36 | OC50 | Energy Film | ext. | 3 | PVB (24) |
| 9 × 6 cm | 25 | OC50 | Energy Film | ext. | 3 | PVB (24) |
| 2.5 × 2.5 cm | 50 | OC50 | Energy Film | ext. | 2 | PVB (25) |
| 9 × 6 cm | 50 | OC50 | Energy Film | ext. | 3 | PMMA (25) |
| 9 × 6 cm | 50 | OC50 | Energy Film | ext. | 3 | PVB (25) |
| 5 × 7.5 cm | 50 | glass | Energy Film | ext. | 4 | PPMA (15) |

| Device Size | Solvent | Electrolyte | Additives | Method | Avg Int (mW/cm2) | Failure (hours) |
|---|---|---|---|---|---|---|
| 1.5 cm diam | Triglyme | | | SL | 120.0 | 438 |
| 1.5 cm diam | Triglyme | | | SL | 130.0 | 288 |
| 1.5 cm diam | Triglyme | | | SL | 110.0 | 255 |
| 1.5 cm diam | Triglyme | | | SL | 110.0 | 191 |
| 9 × 6 cm | Triglyme | | | QUV | 9.8 | 1537 |
| 2.5 × 2.5 cm | Triglyme | | | QUV | 9.8 | 1130 |
| 9 × 6 cm | Tetraglyme | TBABPF6 (1) | HALS A | QUV | 9.8 | 1073 |
| 2.5 × 2.5 cm | Triglyme | | | QUV | 9.80 | 1037 |
| 1.5 cm diam | Triglyme | TBABPF6 (1) | | SL | 95.00 | 104 |
| 2.5 × 2.5 cm | Triglyme | | | QUV | 9.80 | 901 |
| 1.5 cm diam | Triglyme | | | QUV | 9.8 | 865 |
| 1.5 cm diam | Triglyme | TBABPF6 (1) | | SL | 110.0 | 76 |
| 3 × 5 cm | Triglyme | | Prussian Blue | QUV | 9.8 | 837 |
| 9 × 6 cm | Triglyme | | | QUV | 9.8 | 801 |
| 9 × 6 cm | Triglyme | | | QUV | 9.8 | 794 |
| 9 × 6 cm | Triglyme | | | QUV | 9.8 | 787 |
| 1.5 cm diam | Triglyme | | | QUV | 9.8 | 772 |
| 9 × 6 cm | Tetraglyme | | | QUV | 9.8 | 636 |
| 9 × 6 cm | Triglyme | TBABPF6 (1) | | QUV | 9.8 | 608 |
| 9 × 6 cm | Tetraglyme | TBABPF6 (1) | | QUV | 9.8 | 586 |
| 2.5 × 2.5 cm | Triglyme | | | QUV | 9.8 | 572 |
| 9 × 6 cm | Tetraglyme | | | QUV | 9.8 | 543 |
| 3 × 5 cm | Tetraglyme | TBABPF6 (1) | 50 nm PB | QUV | 9.8 | 522 |
| 3 × 5 cm | Tetraglyme | TBABPF6 (1) | | QUV | 9.8 | 522 |
| 3 × 5 cm | Triglyme | TBABPF6 (1) | | Qsun | 5.6 | 688 |
| 7.5 × 7.5 cm | Triglyme | | Unencased demo | QUV | 9.8 | 386 |
| 9 × 6 cm | Triglyme | TBABPF6 (1) | | QUV | 9.8 | 358 |
| 9 × 6 cm | Triglyme | TBABPF6 (1) | | QUV | 9.8 | 293 |
| 2.5 × 2.5 cm | Triglyme | | | QUV | 9.8 | 136 |
| 9 × 6 cm | PC | | | QUV | 9.8 | 64 |
| 9 × 6 cm | GBL | | | QUV | 9.8 | 21 |
| 5 × 7.5 cm | Triglyme | | | QUV | 9.8 | 4564 |

The disclosure of all patents, publications, including published patent applications, and database entries referenced in this specification are specifically incorporated by reference in their entirety to the same extent as if each such individual patent, publication, and database entry were specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical filter capable of transitioning from a light state to a dark state on exposure to UV radiation and from a dark state to a light state with application of an electric voltage, comprising:
   a) a first and second substantially transparent substrate;
   b) a first and second electrode disposed on the surface of at least one of the substrates;
   c) a switching material disposed between the first and second substrates and in contact with the first and second electrodes, the switching material comprising one or more chromophores having both electrochromic and photochromic properties.

2. The optical filter of claim 1 further comprising an electrical connection means for electrically connecting the first electrode and the second electrode to a source of electric voltage.

3. The optical filter of claim 1, wherein the switching material is a solution, a solution thickened with a polymer, or a gel.

4. The optical filter of claim 1, wherein transitioning is controllable by application of the electric voltage, which optionally lightens the optical filter during UV exposure.

5. The optical filter of claim 1, wherein the optical filter is capable of achieving a visible light transmittance of about 50% or greater in the light state.

6. The optical filter of claim 1 wherein the optical filter is capable of achieving a visible light transmittance of about 30% or less in the dark state.

7. The optical filter of claim 1 wherein the optical filter is capable of achieving a contrast ratio of greater than about 2.

8. The optical filter of claim 1 wherein the VLT in the dark state does not substantially change with temperature.

9. The optical filter of claim 1, wherein the optical filter is capable of transitioning between the light state and the dark state at a rate of between about 1 second and 30 minutes.

10. The optical filter of claim 1 wherein the optical filter is capable of transitioning from the dark state to the light state with application of at least 0.1 Volts.

11. The optical filter of claim 1 wherein the optical filter is capable of transitioning from the light state to the dark state with exposure to UV radiation at wavelengths above about 365 nm.

12. The optical filter of claim 1, wherein the one or more chromophores is selected from the group of compounds consisting of diarylethenes, dithienylcyclopentenes and fulgides.

13. The optical filter of claim 1, wherein the chromophores has the general structure of Formula (I):

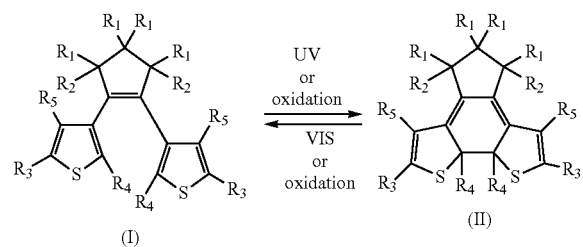

wherein:
$R_1$ is independently H or a halogen;
$R_2$ is independently H, a halogen, or both $R_2$ when taken together form CH=CH, or when in polymeric form $R_2$ is CH=CH and forms part of the polymer backbone;
$R_3$ is independently alkyl, aryl, substituted aryl, H, a halogen, or $CO_ZY$ (Y=H, Na, alkyl, aryl);
$R_4$ is aryl or substituted aryl; and
$R_5$ is independently H, alkyl or aryl.

14. The optical filter of claim 1, wherein the optical filter further comprising a UV light blocker capable of blocking UV light at wavelengths of less than 365 nm.

15. An optical device comprising an optical filter according to claim 1 wherein the device is a window or an ophthalmic device.

16. A method for preparing an optical filter capable of transitioning from a light state to a dark state on exposure to UV radiation and from a dark state to a light state with application of an electric voltage, comprising the step of:
a) disposing a layer of a switching material between a first and second substantially transparent substrate wherein a first and second electrode is disposed on a surface of at least one of the substrates such that the switching material is in contact with each electrode.

17. The method of claim 16, further comprising a step of providing an electrical connecting means for connecting the electrodes to a source of electric voltage.

18. The method of claim 16, further comprising a step of curing the switching material to increase the viscosity of the switching material.

19. The optical filter of any one of claims 1 to 14, wherein said optical filter has a visible light transmittance of less than about 20% in said dark state.

20. The optical filter of any one of claims 1 to 14, wherein said optical filter has a visible light transmittance of less than about 15% in said dark state.

21. The optical filter of any one of claims 1 to 14, wherein said optical filter has a visible light transmittance of less than about 10% in said dark state.

22. The optical filter of any one of claims 1 to 14, wherein said optical filter has a visible light transmittance of less than about 5% in said dark state.

23. The optical filter of any one of claims 1 to 14, wherein said optical filter has a visible light transmittance of between about 1% and about 40% in the dark state.

24. The optical filter of any one of claims 1 to 14, wherein said optical filter has a visible light transmittance of between about 2% and about 20% in the dark state.

25. The optical filter of any one of claims 1 to 15, wherein said optical filter has a visible light transmittance of between about 5% and about 15% in the dark state.

26. The optical filter of any one of claims 1 to 14, wherein said optical filter is capable of transitioning from said light state to said dark state with exposure to UV radiation at wavelengths above about 365 nm.

* * * * *